（12) United States Patent
Abedini et al.

(10) Patent No.: US 11,483,701 B2
(45) Date of Patent: Oct. 25, 2022

(54) SUPPORTING SPATIAL DIVISION MULTIPLEXING OPERATION IN INTEGRATED ACCESS AND BACKHAUL NETWORKS

(71) Applicant: QUALCOMM Incorporated, San Diego, CA (US)

(72) Inventors: Navid Abedini, Somerset, NJ (US); Jianghong Luo, Skillman, NJ (US); Andrzej Partyka, Bedminster, NJ (US); Luca Blessent, Whitehouse Station, NJ (US); Karl Georg Hampel, Hoboken, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/813,635

(22) Filed: Mar. 9, 2020

(65) Prior Publication Data

US 2020/0337056 A1    Oct. 22, 2020

Related U.S. Application Data

(60) Provisional application No. 62/836,506, filed on Apr. 19, 2019.

(51) Int. Cl.
*H04W 8/24*    (2009.01)
*H04B 17/336*    (2015.01)
(Continued)

(52) U.S. Cl.
CPC ............ *H04W 8/24* (2013.01); *H04B 7/0617* (2013.01); *H04B 7/0697* (2013.01);
(Continued)

(58) Field of Classification Search
CPC .... H04B 7/0697; H04B 7/155; H04B 17/336; H04W 8/24; H04W 24/10; H04W 72/0446; H04W 72/046; H04W 72/0493
(Continued)

(56) References Cited

U.S. PATENT DOCUMENTS 8,996,066 B1    3/2015 Lee et al.
2015/0065154 A1    3/2015 Van Phan et al.
(Continued)

FOREIGN PATENT DOCUMENTS

WO    WO2020033655    *  2/2020

OTHER PUBLICATIONS

R1-1804622, Dynamic resource allocation between backhaul and access links, 3GPP TSG RAN WG1 Meeting #92bis (Year: 2018).*
(Continued)

*Primary Examiner* — Harun Chowdhury
(74) *Attorney, Agent, or Firm* — Procopio, Cory, Hargreaves & Savitch

(57)    ABSTRACT

The systems and methods described herein support efficient SDM operation in IAB networks. A first node receives a semi-static resource allocation from a CU based on at least one multiplexing capability of the first node. The first node communicates with a second node based on the semi-static resource allocation. The first node also transmits a change request to the CU to modify the semi-static resource allocation, and the first node may communicate with the second node based on the modified semi-static resource allocation. The at least one multiplexing capability includes at least one of SDM or FDM, including full duplex or half duplex. The at least one multiplexing capability is also with respect to one or more transmission direction combinations of the first node.

55 Claims, 27 Drawing Sheets

(51) Int. Cl.
  *H04B 7/06* (2006.01)
  *H04W 72/04* (2009.01)
  *H04W 24/10* (2009.01)

(52) U.S. Cl.
  CPC .......... *H04B 17/336* (2015.01); *H04W 24/10* (2013.01); *H04W 72/046* (2013.01); *H04W 72/0493* (2013.01)

(58) Field of Classification Search
  USPC .......................................... 370/252, 328–330
  See application file for complete search history.

(56) References Cited

U.S. PATENT DOCUMENTS

| | | | |
|---|---|---|---|
| 2018/0049219 | A1 | 2/2018 | Gupta et al. |
| 2019/0014533 | A1 | 1/2019 | Abedini et al. |
| 2019/0021084 | A1 | 1/2019 | Stirling-Gallacher et al. |
| 2019/0349079 | A1* | 11/2019 | Novlan ............ H04W 72/0446 |
| 2020/0107383 | A1 | 4/2020 | Novlan et al. |
| 2020/0145997 | A1 | 5/2020 | Luo et al. |
| 2020/0146025 | A1* | 5/2020 | Choi ...................... H04B 7/155 |
| 2020/0146099 | A1 | 5/2020 | Abedini et al. |
| 2020/0170010 | A1 | 5/2020 | Luo et al. |
| 2020/0229181 | A1* | 7/2020 | Qi ..................... H04W 72/0446 |
| 2020/0336890 | A1 | 10/2020 | Abedini et al. |
| 2020/0337047 | A1 | 10/2020 | Abedini et al. |
| 2020/0337048 | A1 | 10/2020 | Abedini et al. |
| 2020/0337057 | A1 | 10/2020 | Abedini et al. |
| 2020/0351874 | A1 | 11/2020 | Luo et al. |

OTHER PUBLICATIONS

Ericsson: "IAB Resource Configuration and Assignment", 3GPP Draft, 3GPP TSG-RAN WG1 Meeting #96, R1-1903226, 3rd Generation Partnership Project (3GPP), vol. RAN WG1, No. Athens, Greece, Mar. 25, 2019-Mar. 1, 2019, Feb. 18, 2019 (Feb. 18, 2019), XP051600921, 6 Pages, Retrieved from the Internet: URL: http://www.3gpp.org/ftp/tsg%5Fran/WG1%5FRL1/TSGR1%5F96/Docs/R1%2D1903226%2Ezip, [retrieved on Feb. 18, 2019], Section 1, Section 2.1, Section 2.2.1-Section 2.2.2.

Ericsson: "Resource Allocation and Scheduling of IAB Networks", 3GPP Draft, 3GPP TSG-RAN WG1 Meeting #94bis, R1-1811513, 3rd Generation Partnership Project (3GPP), vol. RAN WG1, No. Chengdu, China; Oct. 8, 2018-Oct. 12, 2018, Sep. 28, 2018, XP051518915, 11 pages, Retrieved from the Internet: URL:http://www.3gpp.org/ftp/tsg%5Fran/WG1%5FRL1/TSGR1%5F94b/Docs/R1%2D1811513%2Ezip [retrieved on Sep. 28, 2018] 2 Resource coordination limitations.

Huawei, et al., "Unified Resource Configuration to Support TDM/FDM/SDM in IAB", 3GPP Draft, 3GPP TSG RAN Meeting #82, RP-182600, 3rd Generation Partnership Project (3GPP), Mobile Competence Centre, 650, Route Des Lucioles, F-06921 Sophia-Antipolis Cedex, France, vol. TSG RAN, No. Sorrento, Italy, Dec. 10, 2018-Dec. 13, 2018, Dec. 9, 2018 (Dec. 9, 2018), XP051553239, 6 Pages, Retrieved from the Internet: URL: http://www.3gpp.org/ftp/Meetings%5F3GPP%5FSYNC/RAN/DOCS/RP%2D182600%2Ezip, [retrieved on Dec. 9, 2018], the whole document.

International Search Report and Written Opinion—PCT/US2020/021897—ISAEPO—dated Jun. 9, 2020.

Qualcomm Incorporated: "IAB Resource Management Framework", 3GPP Draft, 3GPP TSG RAN WG1 Meeting #96, R1-1902992 7.2.3.2 Resource Management Framework, 3rd Generation Partnership Project (3GPP), vol. RAN WG1, No. Athens, Greece, Feb. 25, 2019-Mar. 1, 2019, Feb. 16, 2019 (Feb. 16, 2019), XP051600689, 8 Pages, Retrieved from the Internet: URL: http://www.3gpp.org/ftp/tsg%5Fran/WG1%5FRL1/TSGR1%5F96/Docs/R1%2D1902992%2Ezip, [retrieved on Feb. 16, 2019], Section 2, figure 1, Section 3.

Qualcomm Incorporated: "IAB Resource Partitioning for Architecture Group 1", 3GPP Draft, 3GPP TSG RAN WG2 Meeting #102, R2-1808006 IAB Resource Partitioning for Architecture Group 1, 3RD Generation Partnership Project (3GPP), vol. RAN WG2, No. Busan, South Korea, May 21, 2018-May 25, 2018, May 20, 2018 (May 20, 2018), XP051444329, 3 Pages, Retrieved from the Internet: URL: http://www.3gpp.org/ftp/Meetings%5F3GPP%5FSYNC/RAN2/Docs/ [retrieved on May 20, 2018], p. 2, figure 2, figures 1, 2, sections 1, 2.

* cited by examiner

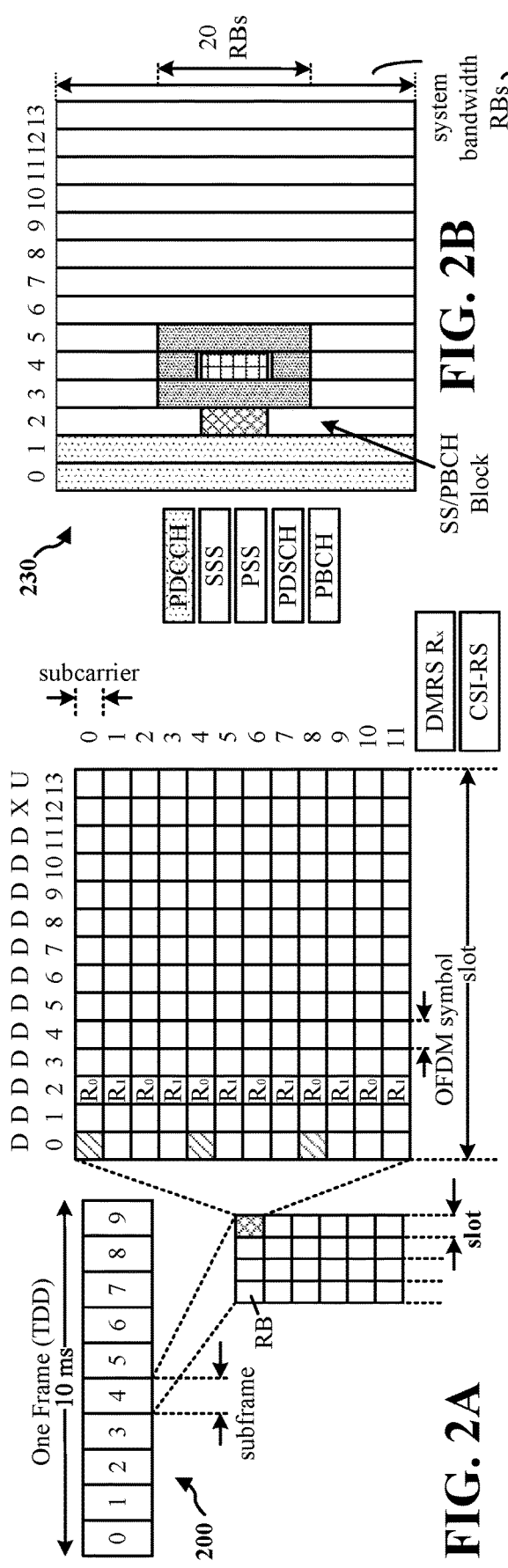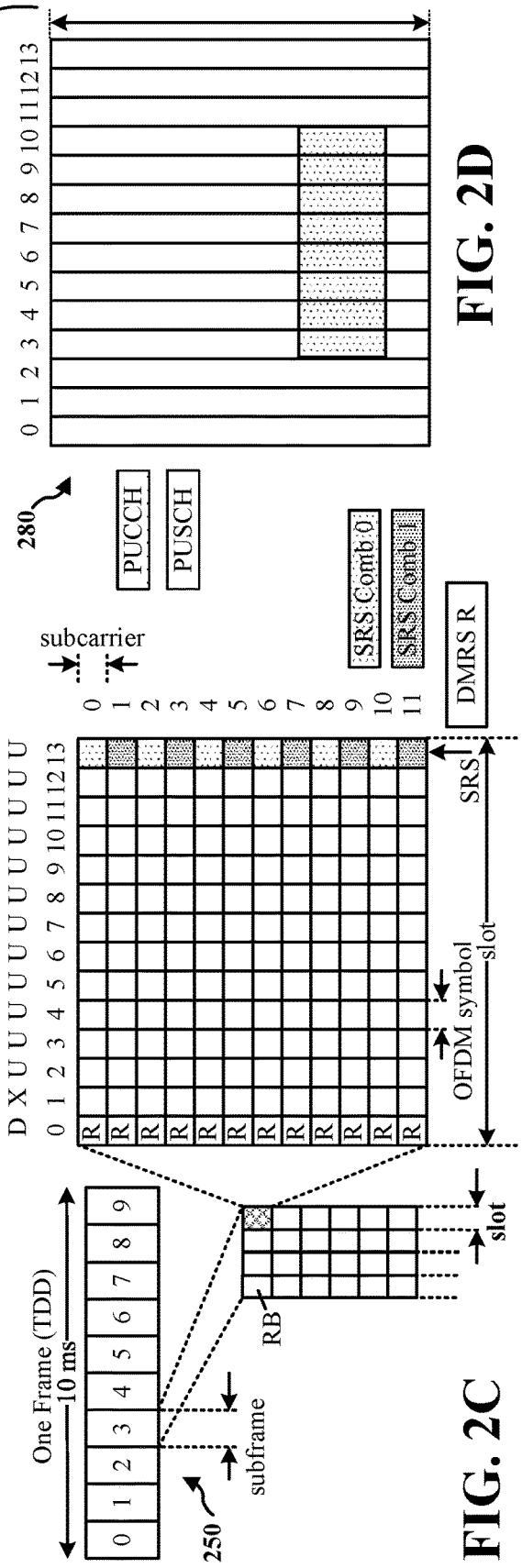

SUPPORTING SPATIAL DIVISION MULTIPLEXING OPERATION IN INTEGRATED ACCESS AND BACKHAUL NETWORKS

CROSS REFERENCE TO RELATED APPLICATION(S)

This application claims the benefit of U.S. Provisional Application Ser. No. 62/836,506, entitled "SUPPORTING SPATIAL DIVISION MULTIPLEXING OPERATION IN INTEGRATED ACCESS AND BACKHAUL NETWORKS" and filed on Apr. 19, 2019, which is expressly incorporated by reference herein in its entirety.

BACKGROUND

Technical Field

The present disclosure relates generally to communication systems, and more particularly, to a wireless communication system between an integrated access and backhaul (IAB) node or user equipment (UE) and a central unit (CU).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first node. The apparatus transmits a report to a central unit (CU), where the report includes at least one multiplexing capability of the first node or includes at least one multiplexing capability condition for the at least one multiplexing capability of the first node. The apparatus receives a semi-static resource allocation from the CU based on the at least one multiplexing capability, and communicates with a second node based on the semi-static resource allocation. The at least one multiplexing capability comprises at least one of Spatial Division Multiplexing (SDM) or Frequency Division Multiplexing (FDM), and the SDM includes at least one of SDM Full Duplex (SDM FD) or SDM Half-Duplex (SDM HD). The at least one multiplexing capability is also with respect to one or more transmission direction combinations of the first node.

In an aspect of the disclosure, a method, a computer-readable medium, and an apparatus are provided. The apparatus may be a CU. The apparatus receives a report from a first node, where the report includes at least one multiplexing capability of the first node or includes at least one multiplexing capability condition for the at least one multiplexing capability of the first node. The apparatus transmits to the first node a semi-static resource allocation based on the at least one multiplexing capability for communication of the first node with a second node, where the at least one multiplexing capability comprises at least one of SDM or FDM, and where the SDM includes at least one of SDM FD or SDM HD. The at least one multiplexing capability is also with respect to one or more transmission direction combinations of the first node.

In an aspect of the disclosure, a method, a computer-readable medium, and an apparatus are provided. The apparatus may be a first node. The apparatus receives a semi-static resource allocation from a CU based on at least one multiplexing capability of the first node. The apparatus also receives, from the CU, one or more resource conditions for using allocated resources of the semi-static resource allocation, and communicates with a second node based on the semi-static resource allocation and the one or more resource conditions. The at least one multiplexing capability comprises at least one of Spatial Division Multiplexing (SDM) or Frequency Division Multiplexing (FDM), and the SDM includes at least one of SDM Full Duplex (SDM FD) or SDM Half-Duplex (SDM HD). The at least one multiplexing capability is also with respect to one or more transmission direction combinations of the first node.

In an aspect of the disclosure, a method, a computer-readable medium, and an apparatus are provided. The apparatus may be a CU. The apparatus transmits to a first node a semi-static resource allocation based on at least one multiplexing capability of the first node for communication of the first node with a second node. The apparatus also transmits, to the first node, one or more resource conditions for using allocated resources of the semi-static resource allocation, where the communication of the first node with the second node is based on the one or more resource conditions. The at least one multiplexing capability comprises at least one of SDM or FDM, and the SDM includes at least one of SDM FD or SDM HD. The at least one multiplexing capability is also with respect to one or more transmission direction combinations of the first node.

In an aspect of the disclosure, a method, a computer-readable medium, and an apparatus are provided. The apparatus may be a first node. The apparatus receives a semi-static resource allocation from a CU based on at least one multiplexing capability of the first node. The apparatus communicates with a second node based on the semi-static resource allocation. The apparatus also transmits a change request to the CU to modify the semi-static resource allocation. The at least one multiplexing capability comprises at least one of Spatial Division Multiplexing (SDM) or Frequency Division Multiplexing (FDM), and the SDM includes at least one of SDM Full Duplex (SDM FD) or SDM Half-Duplex (SDM HD). The at least one multiplexing capability is also with respect to one or more transmission direction combinations of the first node.

In an aspect of the disclosure, a method, a computer-readable medium, and an apparatus are provided. The apparatus may be a CU. The apparatus transmits to a first node a semi-static resource allocation based on at least one multiplexing capability of the first node for communication of the first node with a second node. The apparatus also receives a change request from the first node to modify the semi-static resource allocation. The at least one multiplexing capability comprises at least one of SDM or FDM, and the SDM includes at least one of SDM FD or SDM HD. The at least one multiplexing capability is also with respect to one or more transmission direction combinations of the first node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
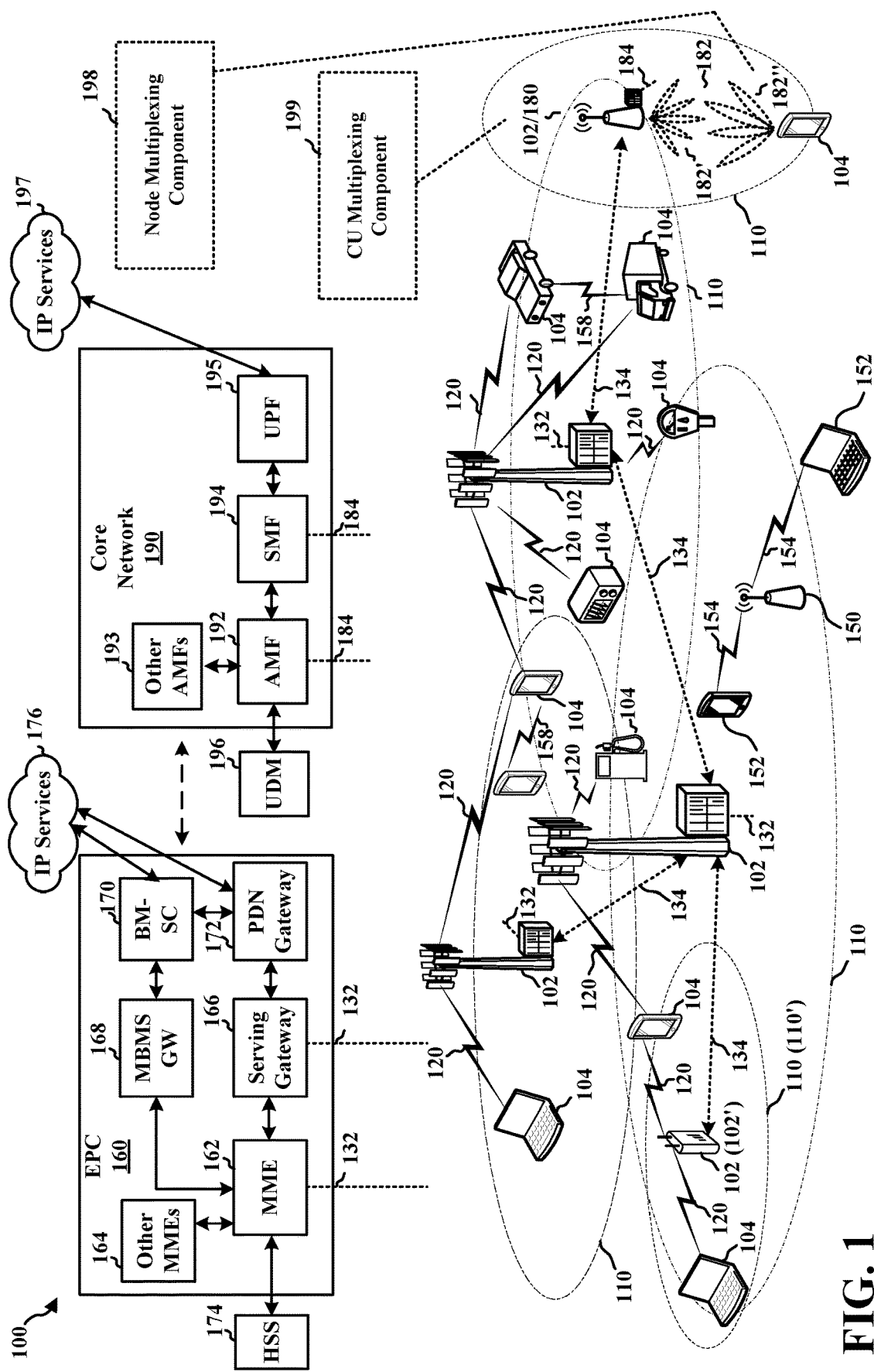
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first node (e.g. an IAB node or the UE 104) may include a node multiplexing component 198 that is configured to transmit a report to a CU, where the report includes at least one multiplexing capability of the first node or includes at least one multiplexing capability condition for the at least one multiplexing capability of the first node; receive a semi-static resource allocation from the CU based on the at least one multiplexing capability; and communicate with a second node based on the semi-static resource allocation. The node multiplexing component 198 may also be configured to receive, from the CU, one or more resource conditions for using allocated resources of the semi-static resource allocation, and to communicate with the second node further based on the one or more resource conditions. The node multiplexing component 198 may further be configured to transmit a change request to the CU to modify the semi-static resource allocation. The at least one multiplexing capability may comprise at least one of SDM or FDM, and the SDM may include at least one of SDM FD or SDM HD. The at least one multiplexing capability may be with respect to one or more transmission direction combinations of the first node.

Referring again to FIG. 1, in other aspects, a CU (e.g. an IAB node or the base station 102/180) may include a CU multiplexing component 199 that is configured to receive a report from a first node, where the report includes at least one multiplexing capability of the first node or includes at least one multiplexing capability condition for the at least one multiplexing capability of the first node; and transmit to the first node a semi-static resource allocation based on the at least one multiplexing capability for communication of the first node with a second node. The CU multiplexing component 199 may also be configured to transmit, to the first node, one or more resource conditions for using allocated resources of the semi-static resource allocation, where the communication of the first node with the second node is based on the one or more resource conditions. The CU multiplexing component 199 may further be configured to receive a change request from the first node to modify the semi-static resource allocation. The at least one multiplexing capability may comprise at least one of SDM or FDM, and the SDM may include at least one of SDM FD or SDM HD. The at least one multiplexing capability may be with respect to one or more transmission direction combinations of the first node.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
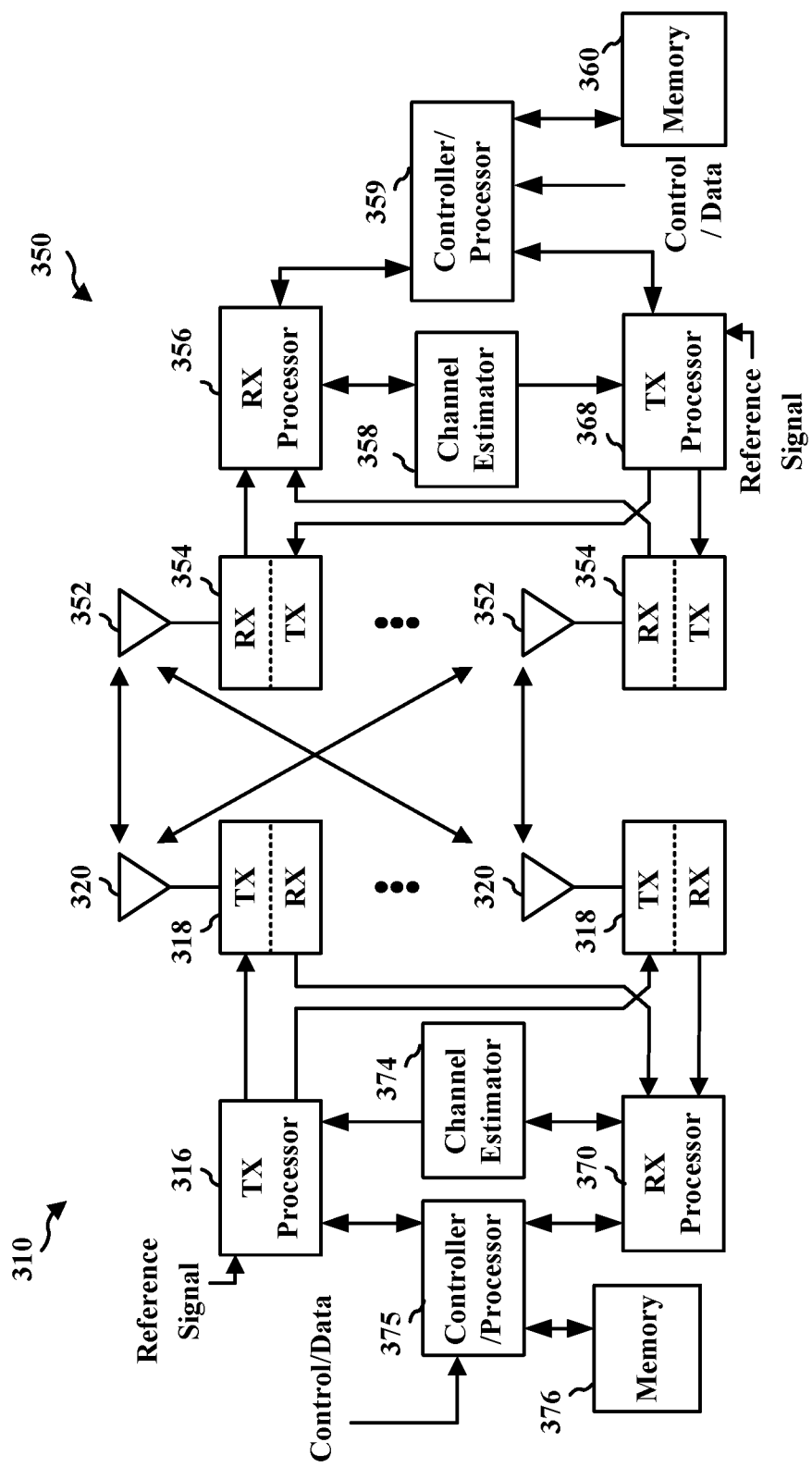
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with node multiplexing component 198 of FIG. 1.

At least one of the TX processor 316, the RX processor 370, and the controller/processor 375 may be configured to perform aspects in connection with CU multiplexing component 199 of FIG. 1.

An IAB node may be part of a topological framework of parent and child nodes. For example, an JAB node may include a parent JAB node and one or more child JAB nodes. Each JAB node may also include two logical components: a mobile terminal (MT) and a distributed unit (DU). The MT of an JAB node may act as a UE for a parent node, for example, by communicating with the parent node over a backhaul (BH) link (e.g. receiving downlink transmissions from the parent node and sending uplink transmissions to the parent node). The DU of an JAB node may act as a base station (e.g. a gNB, an access point, etc.) for one or more child nodes, for example, by communicating with the child node(s) over an access link (e.g. receiving uplink transmissions from the child node(s) and sending downlink transmissions to the parent node(s)).

IAB nodes may generally have half-duplex (HD) capability. Under HD, an JAB node may not transmit data at the same time and frequency that it receives data. For instance, a MT of the JAB node may not transmit uplink communications to a parent node on a BH link at the same time and frequency that it receives uplink communications from a child node on an access link. To address the HD constraints of these JAB nodes, JAB communication may use time division multiplexing (TDM). For example, in TDM, the JAB nodes may receive and transmit data using orthogonal (e.g. non-overlapping) resources in the time domain.

However, spatial division multiplexing (SDM) and frequency division multiplexing (FDM) may be more efficiently used for JAB communication in millimeter wave (mmW) frequencies (e.g. FR2 band or above 6 GHz). SDM may be more efficient than TDM in mmW communications since data transmissions are typically beamformed through the use of an antenna array at each JAB node. The beamforming allows for reception of data from and transmission of data to other nodes over different beams or orthogonal spatial resources. For example, using SDM, an IAB node that is HD capable may receive data from parent and child nodes over multiple beams in a set of time domain resources or slots. Moreover, various JAB nodes may have full duplex (FD) capability, which allow the JAB nodes to receive data from and transmit data to parent and child nodes over one or more links (e.g. BH or access links) at the same time. Additionally to SDM, JAB nodes may use FDM to receive data from and transmit data to parent and child nodes over different beams over orthogonally separated resources in frequency. As a result, JAB nodes may communicate with more spatial efficiency and capacity using SDM (with HD or FD capability) or FDM than when using TDM in mmW frequencies with multiple beams.

Figure 4:
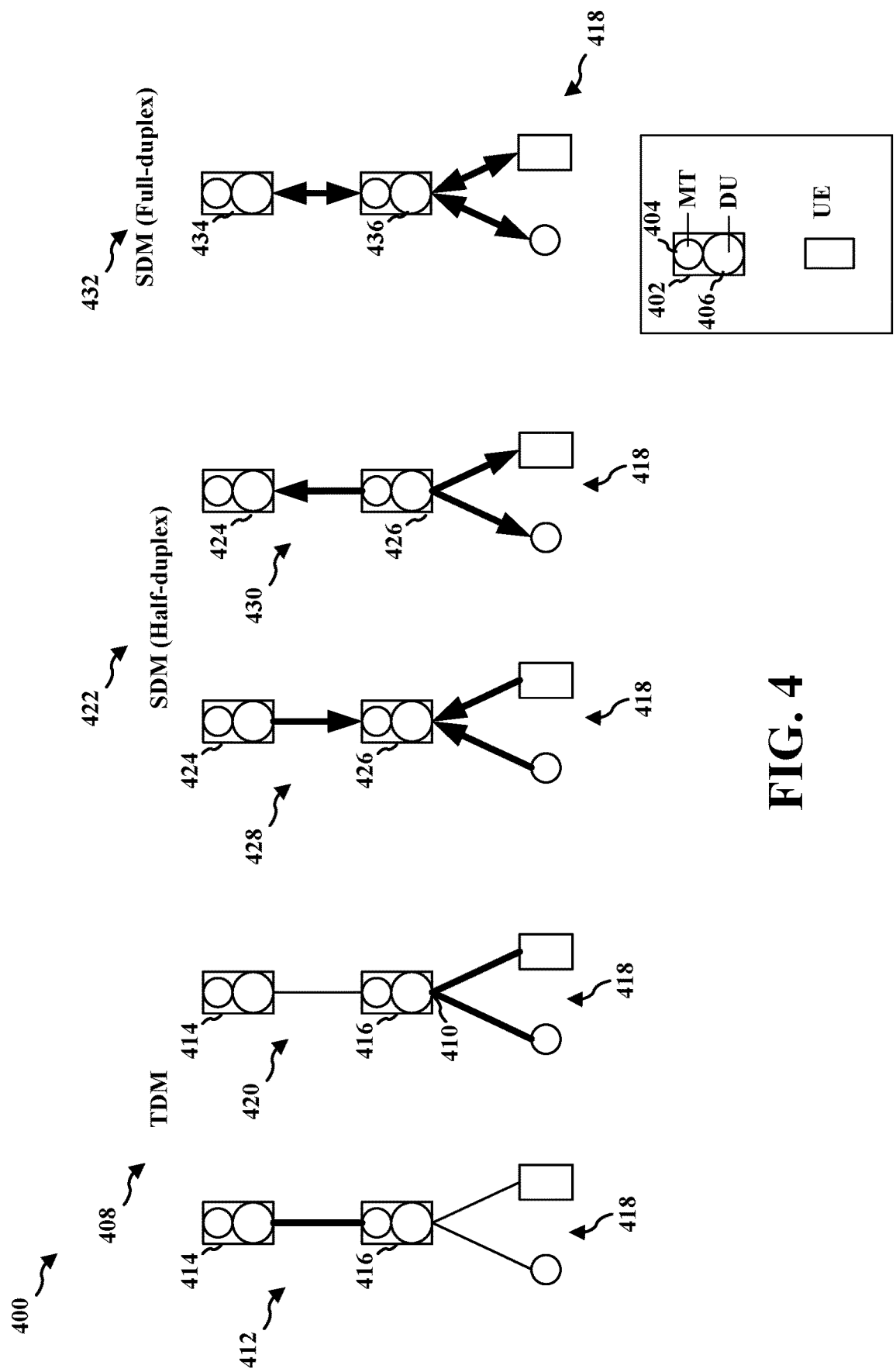
FIG. 4 is a diagram illustrating various examples of IAB node communication.

FIG. 4 is a diagram illustrating various examples 408, 422, 432 of communication between JAB nodes 402 (e.g. JAB nodes 414, 416, 424, 426, 434, 436) using TDM, SDM HD (with each JAB node having HD constraints), and SDM FD (with each node having FD capability), respectively. Each JAB node 402 may include a MT 404 and a DU 406. Each IAB node 416, 426, 436 may also include a parent BH link to a parent node (e.g. to IAB node 414, 424, 434) and a child link to one or more child nodes 418 (which may be other JAB nodes or UEs 408), thereby forming a topological structure as illustrated.

In one aspect, JAB nodes 414, 416 may communicate using TDM as illustrated in example 408. In one example of TDM, the communications over a parent BH link and child-links may be time division multiplexed where active transmissions or receptions are indicated by thicker lines between different nodes and only one link is being used to communicate at a time. A link may be made to multiple child nodes 418, e.g., as illustrated by link 410, or to a single child node 418. For instance, example 412 illustrates an active parent-BH-link with an active connection between parent IAB node 414 and child IAB node 416. For the active parent-BH-link with the active connection between the parent IAB node 414 and the child JAB node 416, the DU 406 of the parent IAB node 414 and the MT 404 of the child JAB node 416 are in communication with each other. Similarly, example 420 illustrates an active child link with an active connection between the child JAB node 416 and the child nodes 418 of the child JAB node 416. For the active connection between the child JAB node 416 and the child nodes 418, the DU 406 of the child JAB node 416 is in communication with the child nodes 418.

In an aspect, TDM may be used when the JAB nodes operate under HD constraints. Accordingly, in these examples 412, 420, the JAB node 416 may not transmit data to the parent JAB node 414 and receive data from the child nodes 418 over the child link at the same time, since a half-duplex device cannot transmit and receive data on the same frequency at the same time. Thus, example 412 illustrates JAB node transmissions occurring over the parent BH link during a first time-resource and example 420 illustrates JAB node transmissions occurring over the child link during a second time-resource, where the first time-resource and the second time-resource are not overlapping in time. The links in diagram 412 and diagram 420 are thus orthogonal relative to each other.

In another aspect, more efficient resource utilization and improved performance compared to TDM may be realized using SDM (e.g. as illustrated at example 422 for HD and example 432 for FD) and FDM. For instance, example 428 illustrates an active reception (RX) link between a half-duplex child JAB node 426 and a parent JAB node 424 and an active RX link between the half-duplex child JAB node 426 and child nodes 418. Similarly, example 430 illustrates an active transmission (TX) link between a half-duplex child JAB node 426 and a parent JAB node 424 and an active TX link between the half-duplex child JAB node 426 and child nodes 418. The half-duplex child JAB node 426 may thus receive from or transmit data to both the parent JAB node 424 and the child nodes 418 by using SDM. Furthermore, example 432 illustrates an active TX/RX link between a full-duplex child node 436 and a parent JAB node 434 and an active TX/RX link between the full-duplex child JAB node 436 and child nodes 418. The full-duplex child JAB node 436 may thus receive from and transmit data to both the parent JAB node 434 and the child nodes 418 by using SDM. As illustrated, the arrows indicate transmission direction and the thicker lines indicate active transmissions. SDM may be a transmission technique that may be used in MIMO wireless communication and other communications technologies to transmit independently and separately encoded data signals through reuse of the spatial dimension.

The multiplexing modes SDM HD and SDM FD may be together referred to herein as SDM (e.g., for mmW frequencies) where an SDM enabled IAB node 426, 436 may support half-duplex (e.g. example 422) or full-duplex (e.g. example 432) communication. The SDM enabled IAB node 426, 436 may further support FDM. The SDM enabled IAB node 426, 436 may use beamforming to implement SDM. The SDM enabled IAB node 426, 436 may have multiple antenna arrays and/or multiple antennas to create multiple beams at the same time. Accordingly, at example 428, the SDM enabled IAB node 426 may use one beam that is spatially separated from other beams for an active RX link with the parent IAB node 424 and one or more other beams for an active RX link with the child nodes 418, as indicated by the wider lines and arrows. Similarly, at example 430, the SDM enabled IAB node 426 may use one beam that is spatially separated from other beams for an active TX link with the parent IAB node 434 and one or more other beams for an active TX link with the child nodes 418, as indicated by the wider lines and arrows. The transmissions may be spatially orthogonal to each other. For SDM full-duplex, as illustrated at example 432, the child IAB node 436 that is capable of SDM full duplex may be in two-way communication with both the parent IAB node 434 and the child nodes 418 as indicated by the thicker lines and arrows between the devices. Accordingly, the SDM FD may provide the most flexibility out of SDM FD, SDM HD, FDM, and TDM.

IAB nodes may also operate using single frequency full duplex (SFFD) communication. In SFFD, the IAB nodes may operate under FD using the same frequency resources for transmission and reception at a given time, similarly to SDM FD but using a single frequency. SFFD may be single-user or multi-user. In single-user SFFD, an IAB node may bi-directionally communicate (e.g. receive and transmit data) with a single node (e.g. a UE or other IAB node). In multi-user SFFD, an IAB node with FD capability may simultaneously communicate over multiple links to different nodes (e.g. receive data from one node and transmit data to another node). Multi-user SFFD may include FD-(DU|MT), FD-DU, FD-MT, or any combination of these scenarios. In FD-(DU|MT) an IAB node with FD capability simultaneously communicates over its BH link (e.g. receives data at its MT from a parent node) and child link (e.g. transmits data from its DU to a child node). In FD-DU, the DU of the IAB node has FD capability and communicates with multiple child nodes (e.g. an IAB node or a UE), while the MT is not engaged in any communication (e.g. the DU transmits data to a child node and receives data from another child node). In FD-MT, the DU is not active, while the MT is actively communicating using FD with multiple parent nodes (e.g. the MT receives data from a parent node and transmits data to another parent node). Any combination of the above scenarios is also possible in SFFD. Examples of SFFD are described below with respect to FIG. 5.

Figure 5:
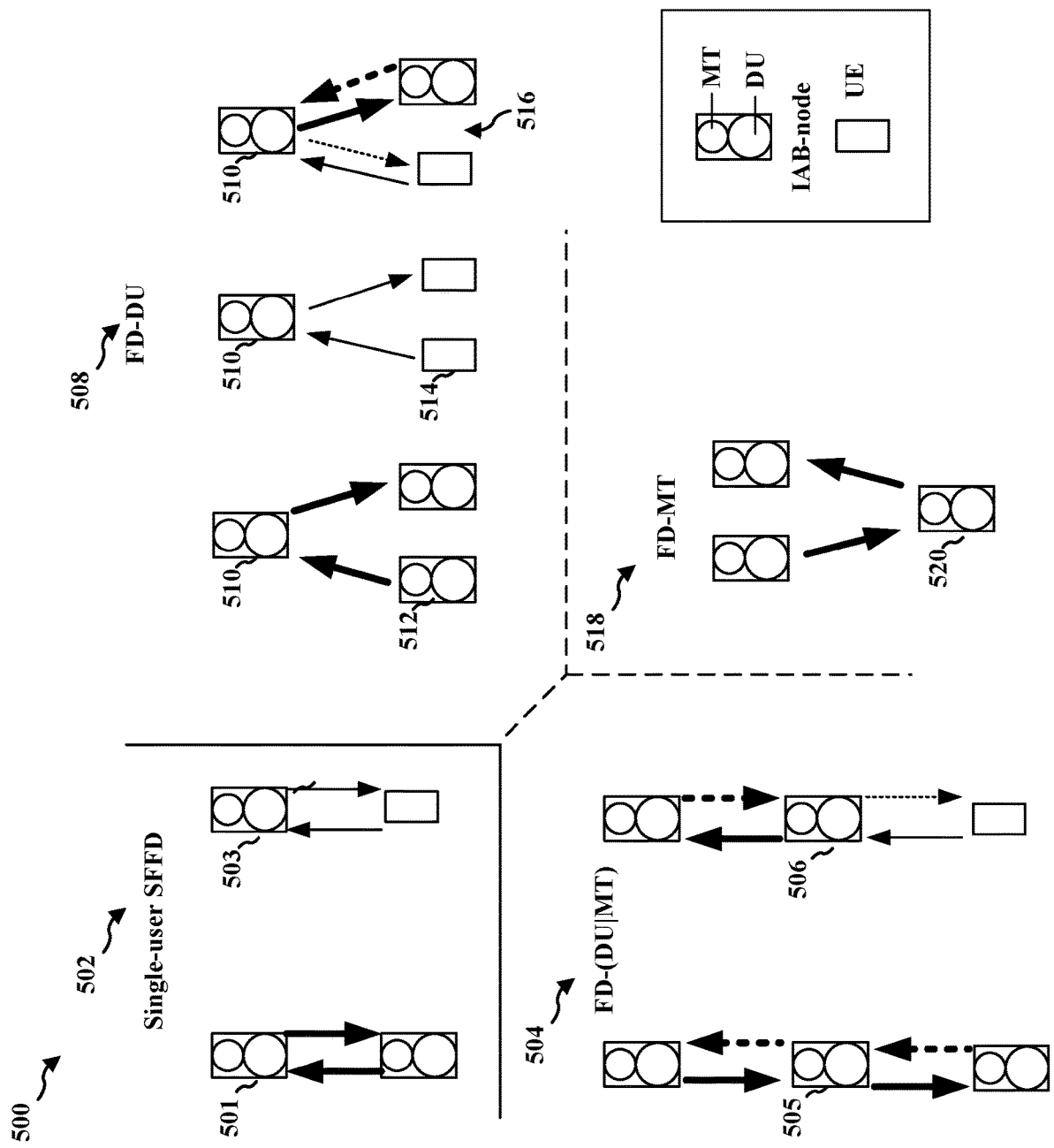
FIG. 5 is a diagram illustrating additional examples of IAB node communication.

FIG. 5 is a diagram 500 illustrating various SFFD scenarios. The SFFD scenarios may be combined. In a first SFFD scenario 502, a single-user SFFD may be used for IAB node communication. For example, the first SFFD scenario 502 may include an IAB specific scenario with an IAB node 501 communicating with another IAB node using single frequency full-duplex. In another example, the first SFFD scenario 502 may include a non-IAB specific scenario with an IAB node 503 communicating with a UE using single frequency full-duplex.

In a second SFFD scenario 504, full-duplex distributed unit/mobile terminal (FD-(DU|MT)) may be used for JAB node communication. For example, an IAB node 505 may communicate with a parent IAB node and a child JAB node using single frequency full-duplex over a parent BH link and a child BH link, respectively. For instance, a MT of IAB node 505 may receive data from a DU of a parent JAB node at the same time that a DU of JAB node 505 may transmit data to an MT of a child JAB node, and vice-versa. In another example, an JAB node 506 may communicate with a parent IAB node and a UE using SFFD. For instance, a MT of JAB node 506 may receive data from a DU of a parent IAB node at the same time that a DU of IAB node 506 may transmit data to a UE, and vice-versa. The second SFFD scenario thus provides SDM FD communication over a parent BH link and a child access link (e.g. with a UE).

In a third SFFD scenario 508, a full-duplex distributed unit (FD-DU) may be used for IAB node communication. As illustrated, three examples of the (FD-DU) scenario may be possible. In one example, an IAB node 510 with FD-DU may communicate with two IAB nodes 512 over two child links. In another example, the JAB node 510 may communicate with two UEs 514 over two child links. In a further example, the JAB node 510 may communicate with child nodes 516 (e.g. one JAB node and one UE) over different child links.

In a fourth SFFD scenario 518, a full-duplex mobile terminal (FD-MT) may be used for IAB node communication. An IAB node 520 with FD-MT may include a MT that has full duplex capability and thus be able to simultaneously communicate with two other parent IAB nodes. For instance, as illustrated in FIG. 5, the IAB node 520 may simultaneously transmit data to one parent IAB node and receive data from another parent IAB node.

The SDM capability of an IAB node (either HD or FD as illustrated in FIG. 4, including SFFD as illustrated in FIG. 5) may be unconditional or conditional. When an IAB node has conditional SDM capability, the IAB node may communicate using SDM subject to certain constraints or configurations. Various examples of these constraints or conditions are described below.

In one example, SDM capability may be beam-dependent, where an IAB node may be configured to use SDM on certain subsets of beams but not all beams. For instance, an IAB node may be configured with a set of beams 1, 2, and 3 for communication with other nodes. If beams 1 and 2 are sufficiently spatially separated for SDM (e.g. they are far enough apart to not interfere with each other), but beams 1 and 3 are not sufficiently spatially separated for SDM (e.g. they are too close together and may possibly interfere with each other), the IAB node may use SDM when communicating using beams 1 and 2 but not when using beams 1 and 3.

In another example, SDM capability may be link-budget (LB) dependent, where an IAB node may be configured to use SDM based on a target signal-to-noise (SNR) over a given link (e.g. a parent BH link or a child access link). For instance, use of SDM may result in lower SNR due to the presence of multiple data streams (which each may be subject to noise). Therefore, if a higher LB is required for a given link (e.g. the target SNR is high, such as at least 30 dB), the IAB node may not use SDM in order to allow the node to achieve the expected LB over that link. On the other hand, if a lower LB is sufficient for a given link, the IAB node may use SDM over that link.

In a further example, SDM capability may be link or beam-pair specific, where an IAB node may be configured to use SDM over specific pairs of beams or links (e.g. beams over a parent BH link and a child access link, or over two child links). For example, an IAB node may include pairs of links to multiple nodes (e.g. parent and child nodes, as illustrated in FIGS. 4 and 5), and the IAB node may communicate using SDM over a subset of the link pairs. For instance, an JAB node that includes one parent and two children may have multiple link pairs (e.g. one pair may include a parent BH link and a first child access link, another pair may include the parent BH link and a second child access link, and a further pair may include both child access links), and the JAB node may be configured to communicate using SDM over one or more, but not all, of the link pairs. As an example, the JAB node may be configured to multiplex receptions from the parent node and transmissions to the first child node, but may not multiplex transmissions to the parent and receptions from the second child node. Other examples of beam-pair/link constraints are possible.

In an additional example, SDM capability may be physical-channel specific, where the JAB node may communicate using SDM over certain physical channels but not others. For instance, a control channel may have lower LB requirements than a data channel, and thus the JAB node may communicate using SDM over the control channel but not over the data channel. Similarly, other physical channels may have different LB requirements and thus impact SDM capability of the JAB node.

Thus, an JAB node may have conditional SDM capability as described according to the various example conditions above. Alternatively, an JAB node may have unconditional SDM capability. When an JAB node has unconditional SDM capability, the JAB node may communicate with other nodes (e.g. parent nodes or child nodes) over respective links regardless of the beams being used for transmission or reception, link budget requirements, the links or beam pairs available to be multiplexed, the physical channels used to carry the communications, or other conditions. However, absolute, unconditional SDM capability may not be feasible in certain circumstances. For instance, beams generally require sufficient spatial separation to operate properly, or large link budgets may be expected over a particular channel, thereby imposing constraints on SDM. Accordingly, an JAB node with unconditional SDM capability may effectively be constrained to communicate using SDM based on its topology with respect to other nodes. For instance, in a topological structure where an JAB node has a parent node and one child node, the JAB node may assume that the parent node and child node are sufficiently separated. Therefore, the JAB node may be configured to communicate using SDM in this topological structure, but not in other topological structures where sufficient separation may not be assumed (e.g. where the IAB node includes several child nodes that may be close together). Additionally, a parent IAB node (or a CU) may signal a child IAB node as having conditional or unconditional SDM capability based on one or more bits, e.g. one bit indicating whether conditional or unconditional, and other bits indicating, if conditional, the applied constraints (e.g. the examples described above).

Figure 6:
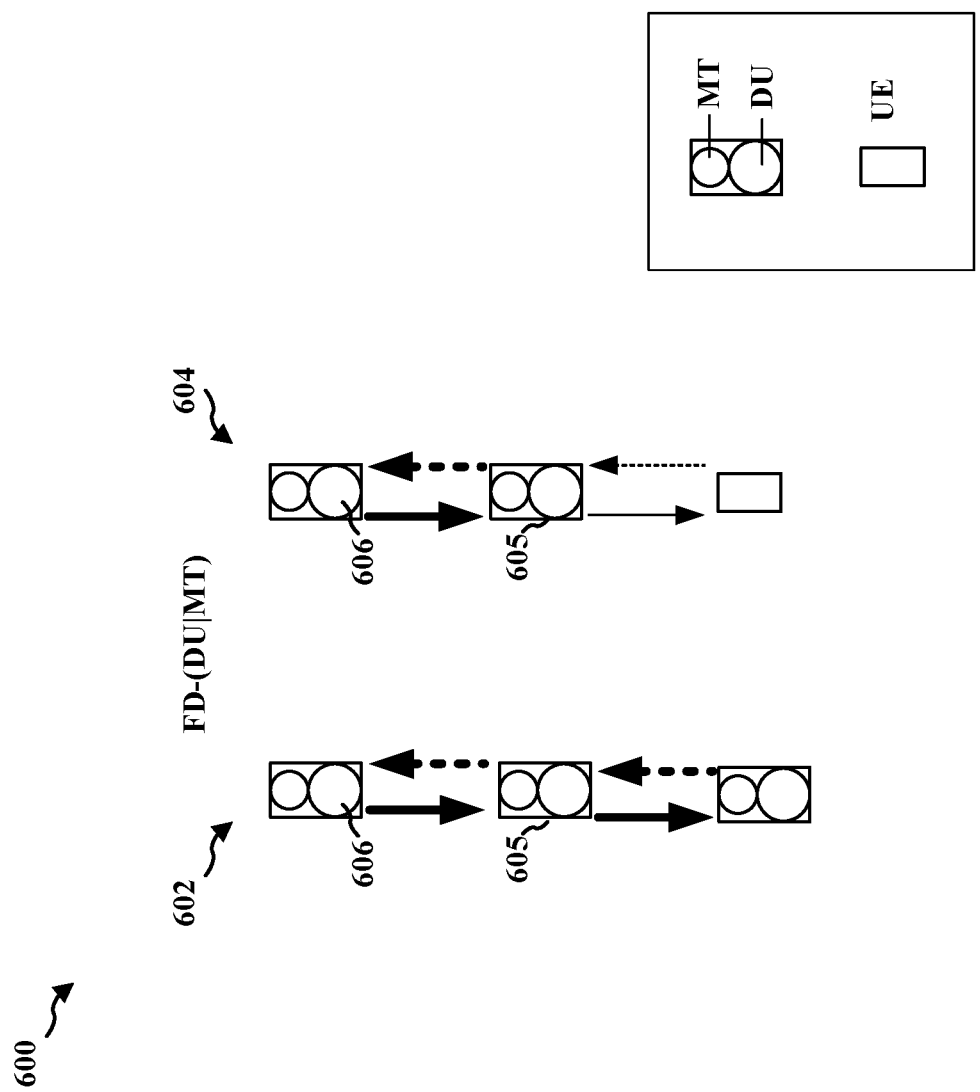
FIG. 6 is a diagram illustrating another example of IAB node communication.

FIG. 6 is a diagram 600 illustrating SDM (half-duplex or full-duplex) resource management. The SDM(FD/HD) capability of a node may be conditional. For example, the SDM(FD/HD) capability of a node may be feasible only for some configurations. For instance, the SDM(FD/HD) capability of a node may depend on link budget (i.e. be LB-dependent). For example, SDM may not be used when a particular SNR cannot be met while using SDM. Accordingly, links that may require a high SNR, e.g., 30 dB, may not be capable of SDM in some instances, while also achieving the required link budget.

The SDM(FD/HD) capability being LB-dependent may lead to (link/beam-pair)-specific and/or physical-channel-specific capabilities. For example, some channels may be capable of SDM and other channels may not be capable of SDM due to LB requirements. For example, a control channel may be capable of SDM, while a data channel may not be capable of SDM. Alternatively, a control channel may not be capable of SDM, while a data channel may be capable of SDM.

In another aspect, SDM capability may be beam dependent. For example, beam 1 of an IAB node and beam 3 of the IAB node may be full-duplex capable, while beam 2 of the IAB node may not be full-duplex capable. In the examples 602, 604 illustrated in diagram 600, a MT's communication (e.g., over a parent BH link) may be SDM (FD/HD) only with a subset of a DU's communications. For instance, in one example 602, with three IAB nodes 605, a parent BH link and a child access link may be provided. In another example 604, with two IAB nodes 605 and a UE, a parent BH link and a child access link may similarly be provided. In these examples, SDM FD may only be provided for some configurations (e.g. beams), as indicated by the dotted lines for some of the transmissions.

In other cases, a node may have unconditional SDM capability. Accordingly, such a node may be capable of SDM for all possible cases. For instance, the node may not be SDM restricted due to link budget, antenna/beam configurations, or other factors. For example, SDM(FD/HD) may be performed using any set of beams and may achieve any link-budget (LB). Some devices may not be capable of absolutely unconditional SDM, however, but may be constrained based on topological structure. For one example scenario, unconditional SDM may be the case when, e.g., the MT and DU have separate components, each having different spatial coverages. Where the MT and DU of an IAB node may have separate components each having different spatial coverages, such configuration may lead to unconditional capability of SDM(HD/FD) for the device's BH and child links.

IAB nodes may be in communication with a central unit (CU). The CU resides at an IAB donor node, which is the node at the head (or root) of the topology of IAB nodes. The CU may include a wired backhaul link (e.g. a fiber connection) to the core network (e.g. core network 190 in FIG. 1). The CU interfaces with the various IAB nodes, e.g., to provide resources for wireless communication between various parent and child nodes. For example, referring to the examples of FIG. 6, the parent IAB nodes of IAB nodes 605 may each be an IAB donor 606 that is connected to a core network through a wired connection (e.g. fiber cable). The CU may be located at the IAB donor 606. The IAB donor may be at the head of a chain or tree of other IAB nodes and/or UEs, as illustrated for example in FIG. 6.

The IAB nodes may coordinate with the CU to enable the CU to more efficiently operate the network and semi-statically allocate and manage resources for the IAB nodes. For example, with some coordination or full coordination between an IAB-node and the CU, more efficient SDM(FD/HD) operation and better resource utilization of IAB nodes may be achieved. Furthermore, local coordination between a child IAB-node and a parent IAB node, which is separate from coordination between the child IAB-node and the CU (typically located multiple hops away), may also allow for more efficient SDM(FD/HD) operation and better resource utilization.

Figure 7:
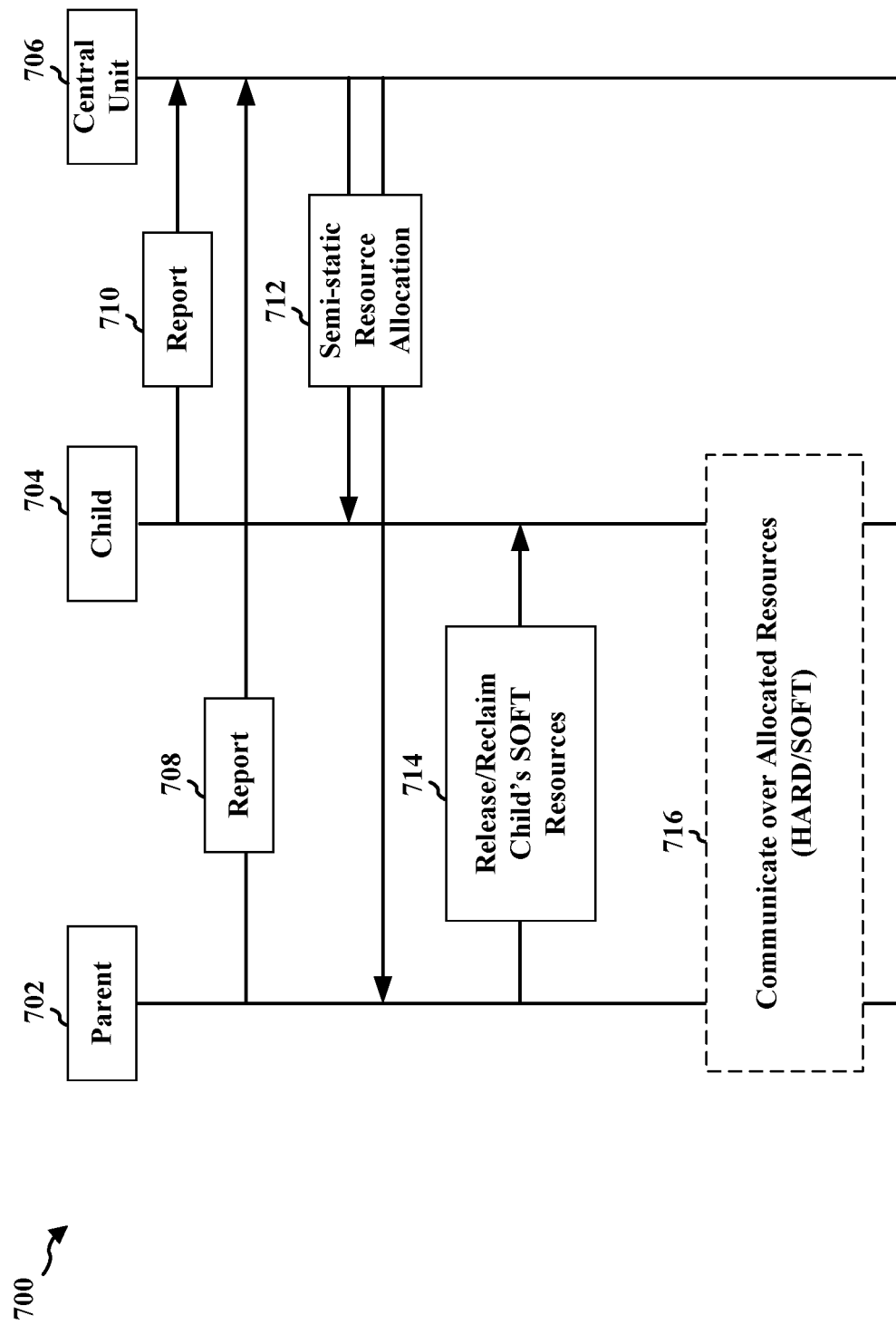
FIG. 7 is a call flow diagram illustrating an example of wireless communication between a parent node, a child node, and a CU.

FIG. 7 is a diagram 700 illustrating an example of an IAB resource management framework. Optional aspects are illustrated in dashed lines. The diagram 700 includes a parent node 702, a child node 704, and a CU 706. The parent node 702 may correspond to parent IAB node 414, 424, 434 of FIG. 4 (and/or IAB nodes 501, 503, 505, 506, 510, 605 of FIGS. 5 and 6), for example, and the child node 704 may correspond to child IAB node 416, 426, 436 of FIG. 4 (and/or IAB nodes 505, 506, 512, 520, 605 of FIGS. 5 and 6), for example. The CU 706 may correspond to the CU in IAB donor 606 of FIG. 6, for example. The parent node 702 and the child node 704 may be connected to the CU 706. The connection between the parent node 702, the child node 704, and the CU 706 may be over the air (OTA). Furthermore, the connection may be over one or more hops.

The CU 706 may be the decision maker for the system that includes the parent node 702 and the child node 704. The parent node 702 may transmit a report 708 to the CU 706. Similarly, the child node 704 may transmit a report 710 to the CU 706. The report 708, 710 may be received by the CU directly or indirectly over multiple hops, as discussed. Reports 708, 710 may include one or more of beam/channel quality measurements (e.g. performed by parent node 702, child node 704, or children of child node 704), cross-link interference (CLI) measurements (e.g. performed by parent node 702, by child node 704, or by children of child node 704), radio resource management (RRM) measurements (e.g. for discovering new neighboring nodes to parent node 702 and/or child node 704), and/or traffic or load information.

Based on the report 708 and/or 710, the CU 706 may transmit a semi-static resource allocation 712 to the parent node 702 and/or child node 704. For example, where TDM is used for IAB node communication as described above in example 408 of FIG. 4, the semi-static resource allocation 712 may include information related to the allocation of time-domain resources, e.g., a set of time domain resources to be used for TDM.

The information related to the allocation of time-domain resources may include information on hard resources, soft resources, and/or resources that are not-available. Not-available resources may be those which the CU 706 indicates the parent node 702 may not use to communicate with child node 704. Accordingly, these resources may not be available for TDM, nor for a given frequency at a particular time. If a resource is configured as not available, the DU of the parent node or the child node cannot assume it can use the resource.

A hard resource may be a resource that the CU 706 indicates is available for a parent node 702 to communicate with a child node 704, or for the child node to communicate with its own children, with no conditions (e.g. the allocated resources may be flexible for use by parent node and/or child node). In the case of hard DU resources, the DU of the parent node or the child node can assume it can use the resource regardless of the MT's configuration. However, exceptions may arise for specific signals/channels to be transmitted or received by the MT in the same resource (e.g. SS/PBCH blocks, SI reception, RACH).

A soft resource may be a resource that could be used by an JAB node (e.g. child node 704), and/or could become available for that JAB node to use, based on a decision of the parent node 702. For instance, the soft resource may be released (and later reclaimed) by the parent node 702 during local coordination between the parent node and the child node 704 (e.g. some interaction or signaling). As an example, if the CU 706 allocates slot N as available for child node 704 as a soft resource, the child node 704 may not use that resource to communicate with its children at slot N unless the parent node releases that resource to the child.

In the case of soft DU resources, if the soft resource is indicated as available, the DU of the parent node or the child node can assume it can use the resource. Alternatively, if the soft resource is not indicated as available, the DU cannot assume it can use the resource. The use of soft resources may at least correspond to transmission/reception of specific signals and channels (e.g. PDSCH/PUSCH) at the DU. For example, soft resources may be used for cell-specific signals (e.g. SS/PBCH blocks, SI reception, RACH) signals and channels which may potentially be transmitted or received at the DU. Additionally, the availability of soft resources at the parent node or child node may be explicitly or implicitly indicated. For example, in case of implicit indication of DU soft resource availability, the JAB node may know that the DU resource can be used without impacting the MT's ability to transmit/receive according to its configuration and scheduling based on indirect means. Moreover, explicit indication that a resource is available may be based on DCI indication.

The information related to the allocation of time-domain resources may also include information on allowed uses of the resources, such as a transmission direction of the resources. For instance, the CU 706 may indicate a hard or soft resource as available only for downlink (DL) communications, available only for uplink (UL) communications, or with flexible availability, all of which may respectively be indicated as D/U/F. Flexible availability may indicate that the resources are available for both DL and for UL, based on a decision of an JAB node. Accordingly, using the resources, interaction and signaling may occur between the parent node 702 and the child node 704. The resources may be used for communications from the parent node 702 to the child node 704, from the child node 704 to the parent node 702, from the parent node 702 to other children, and/or from the child node 704 to other nodes, including children.

Accordingly, when the semi-static resource allocation 712 for child node 704 includes soft resources, at 714, the parent node 714 may release and/or reclaim the child node's 704 soft resources. For example, the child node's 704 soft resources may be released by the parent node 714 so that the child node's 704 soft resources may be used by the child node 704. Alternatively, the child node's 704 soft resources may be reclaimed (e.g., after previously being released to the child node 704) by the parent node 714 so that the child node's 704 soft resources may not be used by the child node 704.

At 716, the parent node 702, the child node 704, and other child nodes (not shown) may establish communication links over the allocated time domain resources (hard or soft resources). Accordingly, the parent node 702, the child node 704, and the other nodes may communicate over the established communication links in their topology based on the semi-static resource allocation 712.

Figure 8:
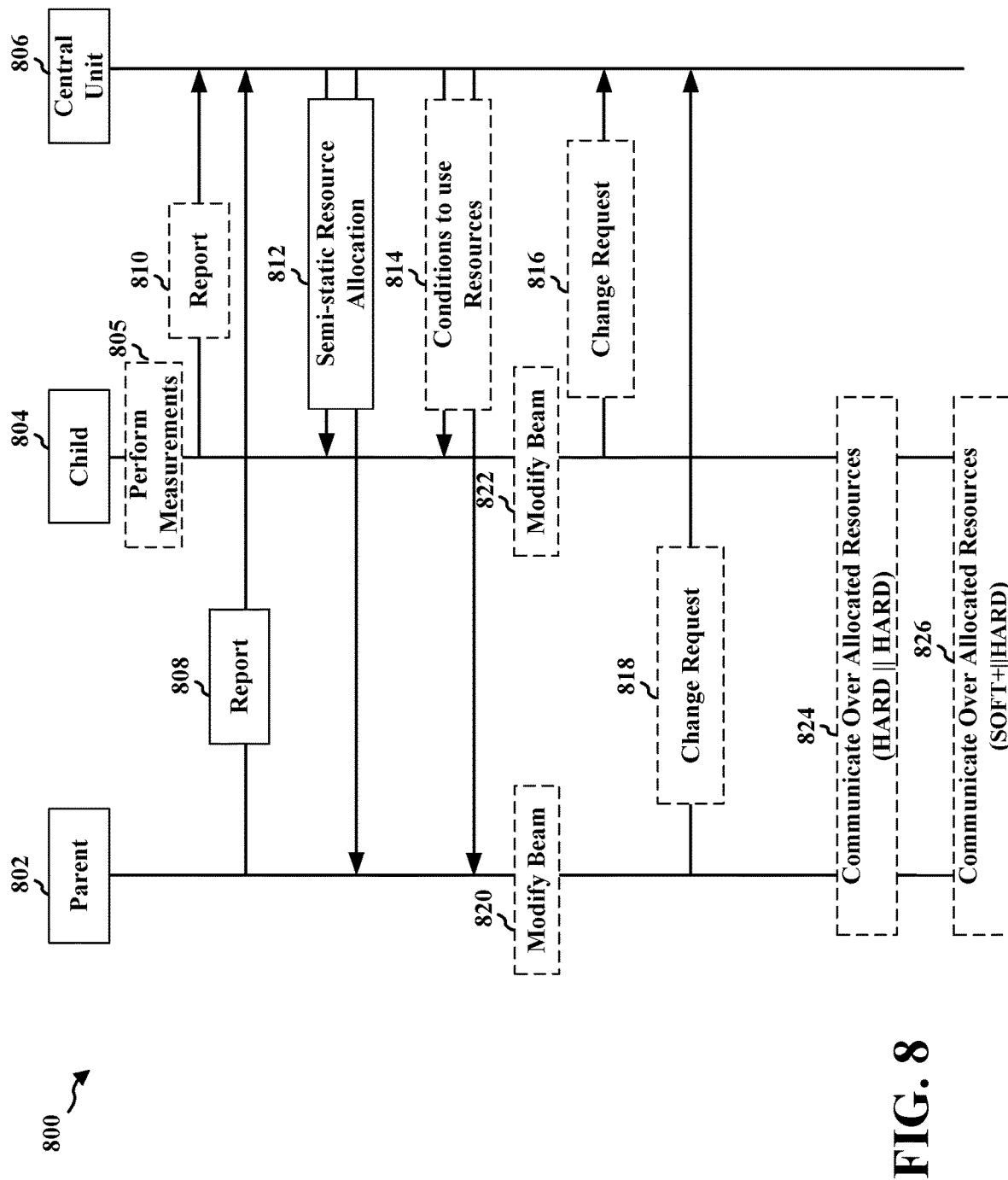
FIG. 8 is a call flow diagram illustrating another example of wireless communication between a parent node, a child node, and a CU.

FIG. 8 is a diagram 800 illustrating an example of CU-DU coordination for SDM full-duplex and SDM half-duplex operation. Optional aspects are illustrated in dashed lines. The diagram 800 includes a parent node 802, a child node 804, and a CU 806. Parent node 802, child node 804, and CU 806 may correspond to parent node 702, child node 704, and CU 706 of FIG. 7, respectively, for example. The parent node 802 and the child node 804 may be connected to the CU 806. The connections between the parent node 802, the child node 804, and the CU 806 may be OTA. Furthermore, the connections may be over one or more hops.

At 805, to enable efficient SDM operation, the child node 804 may perform local interference measurements. In one example, for SDM (FD) operation, the child node may measure self-interference between its own transmission and reception beams. In a device, such as the child node 804, a transmission of a signal by the child node 804 over a transmission (Tx) beam may collide with a received signal by the child node 804 over a reception (Rx) beam. Such self-interference may prevent the child node from effectively performing SDM with full-duplex capability. Accordingly, the child node 804 may measure self-interference for different combinations of TX/RX beams.

In an aspect, self-interference may include clutter echo. For example, a transmission from the child node 804 may be reflected off of an object and be received by the child node 804. Such clutter echo may interfere with signals that the child node 804 is attempting to receive and process. Accordingly, when performing self-interference measurements, the child node may consider the reflected signals that may cause interference. For instance, as a part of the local measurements, the child node 804 may modify its corresponding TX/RX beanforming configuration (e.g. to implement beam nulling on beams with self-interference). Thus, the child node may determine not to use beams with measured self-interference for SDM (FD).

In another example, for SDM (HD) operation, the child node 804 may measure cross-beam interference, in which a transmission (or reception) over one beam of the child node may interfere with a transmission (or reception) over another beam of the child node. For example, the child node 804 may receive data from parent node 802 over beam 1 (the parent BH link) and simultaneously receive data from its own child nodes over beam 2 (the child link). Accordingly, while receiving from the parent node 802 on beam 1, the child node 804 may check the received power on beam 2. If the received power on beam 2 indicates cross-beam interference from the reception on beam 1, the child node may determine not to use these beams for SDM (HD). In another example, if the child node receives data from its own children over beam 1 and simultaneously receives data from parent node 802 over beam 2, then while scheduling and receiving over the child-link using beam 1, the child node 904 may measure received power on beam 2 and similarly determine not to use these beams for SDM (HD) if cross-beam interference is identified.

As in the example of FIG. 7, the parent node 802 may transmit a report 808 to the CU 806. Moreover, after performing the local interference measurements at 805, the child node 804 may similarly transmit a report 810 to the CU 806. The report 808, 810 may be received by the CU 806 directly or indirectly over multiple hops, as discussed. One or more of the reports 808, 810 may include one or more of beam/channel quality measurements, cross-link interference (CLI) measurements, radio resource management (RRM) measurements, and/or traffic/load report, as described above with respect to FIG. 7.

Additionally, the report 810 from the child node 804 to the CU 806 (directly or indirectly transmitted to the CU, e.g. through parent node 802) may include the results of the local interference measurements. In one example, the report 810 may indicate to the CU the self-interference and cross-beam interference measurements. In another example, rather than sharing a full measurement report with the CU, the child node may determine from the measurement results whether it has FD or HD capability for SDM and whether the SDM capability is unconditional or conditional (with conditions as described above), and indicate that capability or conditions to the CU. Moreover, if the SDM capability is conditional, the report 810 to the CU may include the SDM FD or SDM HD conditions of the child node (e.g. beams that may be used for SDM, link budget requirements, the links or beam pairs available for SDM, and/or the physical channels available for SDM). When the CU 806 receives the report 810 from the child node 804, the CU may transmit to the parent node 802 an indication of the capability or conditions of the child node. The report 808 from the parent node 802 may similarly include SDM capability and/or conditions of the parent node, and the CU 806 may similarly transmit to the child node 804 an indication of the capability or conditions of the parent node.

For example, the report 808, 810 may include the SDM FD or SDM HD capability of a particular node. The report 808, 810 may indicate the multiplexing capability of the parent node or the child node for the case of no-TDM (e.g. SDM or FDM) between the IAB MT and the IAB DU of that node with respect to each transmission-direction combination (per MT component carrier (CC)/DU cell pair). For instance, the report may indicate SDM or FDM capability of the parent node or child node with respect to transmission-direction combinations including MT-TX/DU-TX (the MT transmits while the DU transmits), MT-TX/DU-RX (the MT transmits while the DU receives), MT-RX/DU-TX (the MT receives while the DU transmits), and MT-RX/DU-RX (the MT receives while the DU receives). Moreover, the report 810 from the child node 804 may indicate, to either the donor CU or the parent node 802, the multiplexing capability between MT and DU (TDM required, TDM not required) of an IAB node for any {MT CC, DU cell} pair. Furthermore, the report 808, 810 may indicate conditions such as which pairs of beams or pairs of links may be used for SDM. The report 810 may also indicate when there may be any limitation on the link-budget, such as a maximum TX power or a maximum RX power for a given link.

As in FIG. 7, the CU 806 may transmit a semi-static resource allocation 812 to the parent node 802 and/or child node 804. The semi-static resource allocation 812 may include information related to the allocation of time-domain resources. Thus, TDM, SDM half-duplex, and/or SDM full-duplex operation may be adopted over different sets of time-domain resources between parent and child nodes through the configuration of semi-static resource allocation 812. The information related to the allocation of time-domain resources may include information on hard resources, soft resources, and/or resources that are not-available. The information related to the allocation of time-domain resources may also include information on allowed uses of the resources, such as availability for DL, availability for UL, or flexible availability (D/U/F). The resources may be used for communications from the parent node 802 to the child node 804, from the child node 804 to the parent node 802, from the parent node 802 to other children, and/or from the child node 804 to other nodes, including children.

The CU 806 may also transmit conditions 814 to one or more of the parent node 802 and/or the child node 804 for use of the resources of semi-static resource allocation 812. For instance, the conditions may indicate that the resources are available for the parent node 802 and/or child node 804 to use SDM for a subset of beams, links, physical channels, etc. The conditions 814 may also include the conditions reported by the child node to the CU 806 (or indirectly to parent node 802) in report 810. The conditions 814 may be included in the semi-static resource allocation 812, or the conditions 814 may be transmitted separately from the semi-static resource allocation 812 as illustrated in FIG. 8.

The conditions 814 may provide additional control over how the resources in semi-static resource allocation 812 are used by the one or more of the parent node 802 and/or the child node 804. For example, the CU 806 may use the conditions 814 to indicate whether a set of allocated time-domain resources may be used unconditionally or not for SDM Full-duplex or Half-duplex operation. Conditions 814 may include the directional conditions (D/U/F) described above, as well as additional conditions for conditional use. For example, in a case of conditional use, the CU 806 may further indicate as conditions 814 various constraints such as those on modulation coding scheme (MCS, e.g. the maximum MCS used over the allocated resources), transmit (Tx) power (e.g. the maximum Tx power that may be used), receive (Rx) power (e.g. the maximum Rx power that may be used), TX/RX beam(s) that may be used (e.g. the subset of beams or beam pairs/links that may be used), frequency-domain resources (e.g. the limited RBs that may be used over an indicated set of time domain resources in the semi-static resource allocation), reference signal configuration/resources (e.g. the specific tones or resources that DMRS or another reference signal may be transmitted), and timing reference (e.g. the Tx/Rx timing to be used for alignment with other simultaneous communications).

Accordingly, the conditions 814 may set on one or more of the MCS, transmit power, receive power, TX/RX beam, frequency-domain resources, reference signal configuration/resources, timing reference, or other conditions for the parent node 802 and/or the child node 804. For example, the MCS may be used to indicate a cap for the MCS. In an aspect, the transmit power or receive power may be capped. In an aspect, the TX/RX beam used may be limited. In an aspect, the frequency-domain resources may be limited to a given sets of RBs. In an aspect, a particular reference signal configuration/resources may need to be adopted. In an aspect, timing reference may be used to adjust receive timing, e.g., to align on other communications.

In an aspect, the conditions 814 to use the resources may identify the expected behavior of the parent node 802 regarding the resources. For example, when resources are labeled as hard for both the parent node 802 and the child node 804, this indicates that the resources may be used by either the parent node 802 or the child node 804 without limitation. Accordingly, in some cases scheduling conflicts may occur because both the parent node 802 and the child node 804 have a same set of resources indicated as hard resources. For instance, if the child node 804 has HD capability and determines to transmit to its own child nodes using its hard resources at the same time the parent node 802 determines to transmit to child node 804 using its hard resources, a collision may occur. Accordingly, determinations (e.g. conflict resolutions) may be made about whether the parent node 802 should yield using these resources to the child node 804 and/or whether the parent node 802 may use these resources subject to certain constraints (e.g. complying with the schedule of the child's node).

For example, inter-IAB node conflict resolution may be supported by one or more of the following options: the parent node is aware of all of the DU resource configurations (D/U/F/hard [H]/soft [S]/not-available [NA]) of its child IAB node DUs, or the parent node may be aware of a subset of the DU resource configurations (D/U/F/H/S/NA) of its child IAB node DUs. The indication of the child DU resources at the parent node may be via explicit means (e.g. F1-AP signaling) or implicit means (e.g. based on child MT configuration). Thus, if parent node 802 is made aware of child node 804's resource configurations or is aware of a subset of these resource configurations (via explicit signaling, such as in semi-static resource allocation 812, or based on the child node's MT configuration), the parent node may prevent conflicts by yielding hard resources centrally and semi-statically controlled by the CU 806 (since the parent node may not expect the child's MT to be available for communication within these resources), or by releasing/reclaiming soft resources locally and dynamically controlled by the parent node's DU. Alternatively, to prevent such conflicts and avoid conflict resolution, the semi-static resource allocation 812 may include orthogonal resources for the parent node and child node to use over TDM, thereby addressing half duplex constraints of child nodes.

However, if a child node has SDM (half-duplex or full duplex) capability, the child node may be able to communicate with the parent and/or its own children at the same time, and the above conflict resolution rules may be moot. Therefore, to provide more efficient operation than TDM, the semi-static resource allocation may include a same set of resources for both the parent node 802 and the child node 804 for communicating using SDM. For example, a parent node 802/child node 804 pair having a hard/hard (HARD∥HARD) resource allocation (e.g., a hard resource allocation to both a parent node and a child node) may not cause a conflict when the child node has HD or FD capability and communicates with the parent node using SDM. Thus, for more efficient operation, conflict resolution may be unnecessary in such cases where a conflict may not occur for a device with SDM half-duplex or full-duplex capability.

Accordingly, the semi-static resource allocation 812 and/or conditions 814 may identify an expected behavior of the parent node 802 as an alternative to the aforementioned conflict resolution rules. For example, if the resource allocation for a same set of resources is (HARD∥HARD), rather than yielding the resources to the child node 804 as described above, the conditions 814 may indicate to the parent node 802 an expected behavior not to yield the resources for use by its children when the child node 804 has HD or FD capability (since the child node may simultaneously communicate with its own child nodes and parent node and no conflict will arise).

Similarly, the conditions to use resources may identify the expected behavior of parent node 802 regarding a child node's 804 soft resources, for example, whether the parent node may conditionally release the resources, e.g., whether the parent node may still use the released resources to communicate with the child in an SDM HD/FD manner. When resources are labeled soft, this indicates that the parent node 802 may use the resources until it releases them to the child node 804, after which the parent node may not generally use the resources to communicate with the child node. This prevents conflicts from occurring when the child node is TDM HD capable (e.g. when the child node is communicating over different resources than the parent node). However, although such conflicts may not occur during TDM, when the child node is SDM HD or FD capable, more efficient operation may occur using SDM. For example, no conflicts may arise when the parent node 802 communicates using released, soft resources with a child node 804 that is HD or FD capable, since the child node 804 may communicate with its own child nodes at the same time that it communicates with the parent node 802. Therefore, the conditions 814 may indicate to the parent node an expected behavior not to refrain from using released soft resources when communicating with the child node. Accordingly, the resources are conditionally released since the parent node may continue to use the released resources.

The conditions to use resources may also identify the expected behavior of the child node 804 regarding the child node's 804 soft resources, for example, the condition may identify whether the child may conditionally use the soft resources in SDM HD or FD manner when not explicitly banned by the parent node 802. When resources are labeled soft, this indicates that the resources may generally be used by the child node when released by the parent node, and that the resources may not generally be used by the child node when reclaimed by the parent node. As discussed above, this prevents conflicts from occurring when the child node is TDM HD capable; however, when the child node is SDM HD or FD capable, more efficient operation may occur using SDM since the child node 804 may communicate with its own child nodes at the same time that it communicates with the parent node 802. Therefore, the conditions 814 may indicate to the child node 804 an expected behavior not to refrain from using unreleased (or reclaimed) soft resources when communicating with its own child nodes. Accordingly, the child node 804 may conditionally use soft resources to communicate with its children even when the soft resources are not released or reclaimed, absent an explicit ban of child resource usage by the parent node 802. Communication between parent nodes 802 and child nodes 804 may thus allow conflict rules to be avoided based on capabilities of the parent nodes 802 and child nodes 804.

At any given time, a system configuration (e.g. the quality of the channel, mobility of the system, etc.) may change due to the dynamic nature of wireless communication systems. For example, the child node 804 and parent node 802 may drop some beams in favor of other beams for communication, or link budgets (e.g. target SNRs) may change over various parent or child links. For instance, at 820 and 822, respectively, the parent node and/or child node may modify their transmission or reception beams (e.g. based on local interference measurements performed at 805). Whenever such changes occur, the SDM capability of the child node and/or parent node may correspondingly also change. For example, even though SDM between two old beams may have been feasible, SDM between two new beams may not be feasible. As a result, the semi-static resource allocation 812 may no longer be efficient for SDM operation in such cases, and a new semi-static resource allocation may be configured. Alternatively, the reverse may be true; for example, even though SDM between two old beams was not feasible, SDM between two new beams may now be feasible. As a result, a more efficient semi-static resource allocation 812 may be configured to enable SDM operation in such cases.

To report such changes to the CU 806 and request a new semi-static resource allocation accordingly, the child node 804 may send a change request 816 to the CU 806. Similarly, the parent node 802 may send a change request 818 to the CU 806. The change requests 816, 818 may indicate a new configuration of the parent or child node (e.g. changed beams, link budget, etc.). For instance, the change requests 816, 818 may indicate that one or more beams (or beam pairs) over a parent BH link and/or child access link has changed, or that a link budget over one or more physical channels has changed. The change requests 816, 818 may also request the CU 806 to provide a new resource allocation (RA) based on the new configuration. For example, the change request may request the CU to provide a new RA which may enable SDM (FD/HD) operation over the new beams or links of the parent or child node indicated in the change request, or to provide a new RA that may account for changes in beams or link budget indicated in the change request when SDM(FD/HD) between two current links is no longer feasible. Thus, resources may be re-allocated by the CU in response to change requests 816 and/or 818.

Thus, based on the coordination between the parent node 802, child node 804, and CU 806 discussed above, the parent node and child node may communicate using the semi-static resource allocations 812 not only based on TDM but also more efficiently using SDM (HD or FD). For example, at 824, FD communication may occur between parent node 802 and child node 804 over a (HARD∥HARD) link, e.g. when a time-domain resource is configured as hard for both a parent node and a child node by the CU 806. If the child node 804 has the capability of SDM full-duplex under specified conditions (e.g. conditions 814), once the conditions are met, both the parent node and the child node may use the hard resources for communication simultaneously in an SDM full-duplex manner. In another example, at 826, FD communication may occur over a (Soft+∥Hard) link. For example, the CU 806 may configure a time-domain resource as soft for the parent node and as hard for the child node. Furthermore, the soft resource at the parent node may be indicated "soft+", in which the soft resource is available for the parent node when released by the parent node's own parent node (e.g., a "grand-parent" node). Thus, the soft resource when released by a grandparent node may be used in the same way as a hard resource by the parent node. In this case, the parent and child nodes may have (Soft+∥Hard) resource alignment, which may be similar to the (Hard-∥Hard) resource alignment in the above example.

Figure 9:
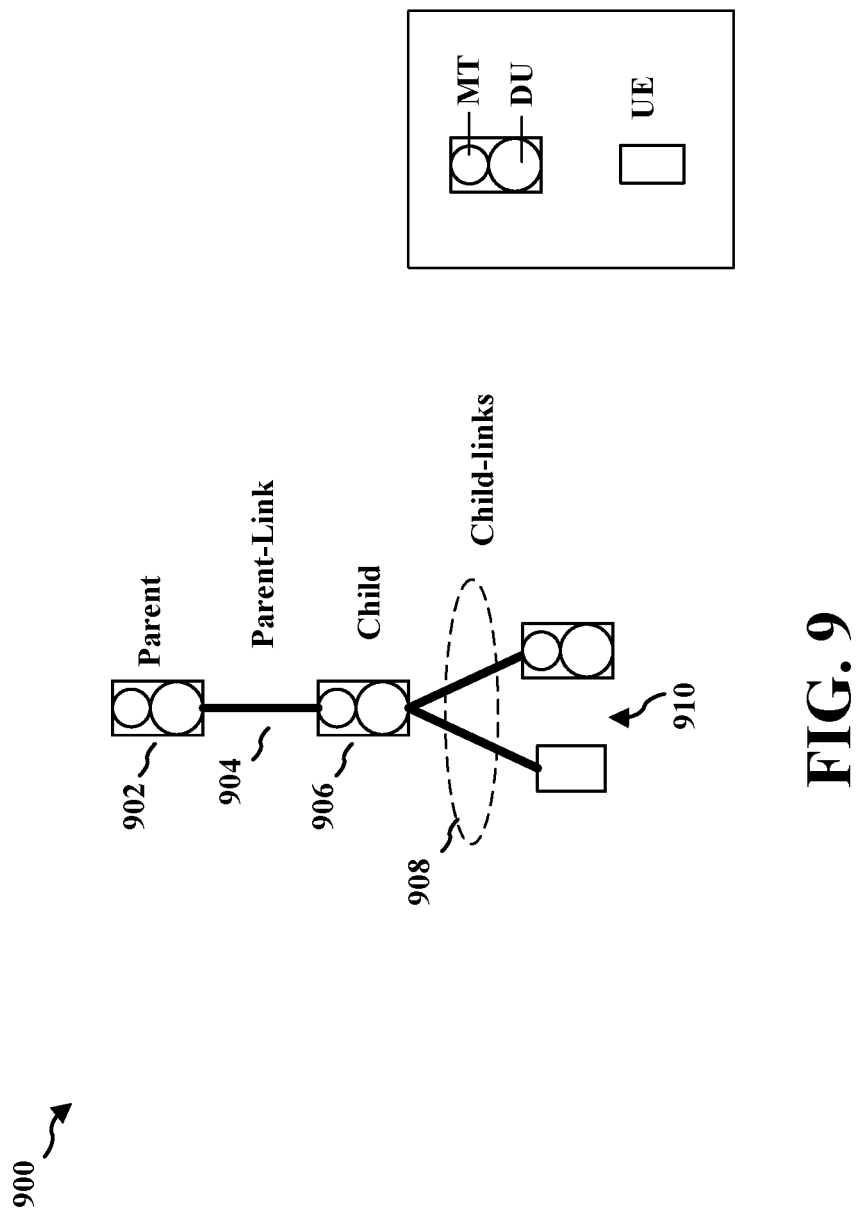
FIG. 9 is a diagram illustrating a further example of IAB node communication.

FIG. 9 is a diagram 900 illustrating an example of full-duplex operation with CU-DU coordination based on the aspects described above with respect to FIG. 8. The diagram includes a parent node 902 (e.g. parent node 802), a parent-link 904, a child node 906 (e.g. child node 804), child-links 908, and connected devices 910 (e.g. IAB nodes and/or UEs). In one example of coordination between the child node 906 and a CU (e.g. CU 806), for FD over hard resources, the CU may become aware of child-links 908 that may use FD with a parent-link 904. For example, the child node 906 and/or parent node 902 may send a report (e.g. report 808, 810 of FIG. 8) indicating child links 908 are SDM FD capable with parent link 904. While this example assumes that the report indicates all child links 908 are SDM FD capable with parent link 904, the report may alternatively indicate that a subset of child links may be SDM FD capable (e.g. one or more of the child links 908). Based on the report(s), in this example, the CU may allocate hard resources to both the parent node 902 and the child node 906 (e.g. in semi-static resource allocation 812 of FIG. 8). Moreover, the CU may schedule various RRC-configured/cell-specific communications (e.g., CORESET, system information, RACH information, synchronization signals, etc.) within these hard resources when the child node 906 has FD capability. Accordingly, the child node 906 may use FD with SDM to communicate with both the devices 910 and the parent node 902.

In one aspect, the CU may provide an expected behavior to the parent node 902. For example, the expected behavior may indicate to the parent node 902 not to yield within these resources to the child node 906, as discussed above, since the child node 906 has FD capability. In a first aspect, the parent node 902 may not coordinate with the child node 906 to determine the resource configuration of the child node's 906 DU (e.g. as having FD capability), and therefore the parent node 902 may blindly attempt to use the resources when communicating with the child node 906 (without additional signaling for expected parent behavior). Alternatively, in a second aspect, the parent node 902 may coordinate with the child node to determine the resource configuration of the child node's 906 DU (e.g. as having FD capability), and the CU may notify the parent node 906 an expected behavior not to yield to the child node 906 on the resources (or a subset of the resources).

Alternatively, in another aspect, there may not be coordination between the child node 906 and the CU. For example, in some cases the child node may not provide a report to the CU including its FD capability or conditions (e.g., report 810), and thus the CU may not be able to coordinate efficiently, determine the FD capability of the child node and/or provide efficient resource allocation to the child node. Therefore, the CU may assume in such cases that the child node has HD capability, and may thus attempt to guarantee performance by allocating some exclusively hard resources (e.g. non-orthogonal resources) to the child links 908 for TDM usage to prevent conflicts and degraded performance.

In a further aspect, the CU may allocate hard resources to both the parent node 902 and the child node 906 for opportunistic FD communication in a case when no coordination between the child node 906 and the parent node 902 is available. Moreover, the CU may allocate hard resources to both the parent node 902 and the child node 906 for efficient FD in a case when local coordination between the child node and the parent node is available.

In an additional aspect, the CU may allocate soft resources to the child node 906. In such case, when the CU is aware or partially aware of the FD capability of the child node 906 (e.g. based on a report by the parent node 902 or the child node 906), the CU may more efficiently allocate soft resources for the child node to communicate with its children over the child-links 908. There may also be local coordination between the child node 906 and the parent node 902 (e.g., the child node may request the parent node 902 to conditionally release some soft resources to enable FD communication of the child node 906).

Figure 10:
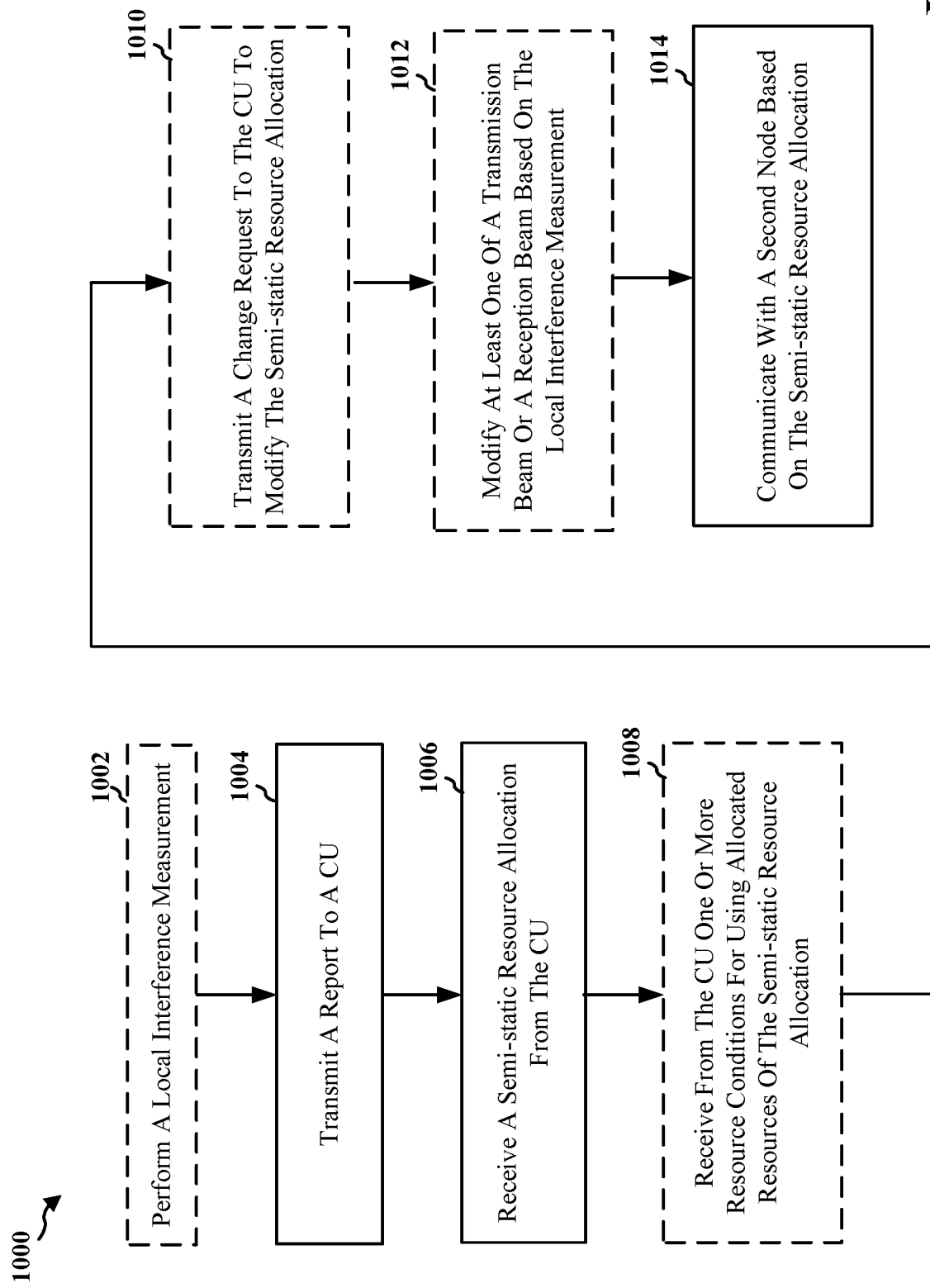
FIG. 10 is a flowchart of a method of wireless communication at a first node.

FIG. 10 is a flowchart 1000 of a method of wireless communication. The method may be performed by a first node, such as an JAB node or UE (e.g., the UE 104, 350, 514, the JAB node 402, 414, 416, 424, 426, 434, 436, 501, 503, 506, 506, 510, 512, 516, 520, 605, 902, 906, the parent node 702, 802, the child node 704, 804; the apparatus 1102/1102'; the processing system 1214, which may include the memory 360 and which may be the entire JAB node or UE 350 or a component of the JAB node or UE 350, such as the TX processor 368, the RX processor 356, and/or the controller/processor 359). The first node may communicate with a second node, such as another JAB node or UE. For example, the first node may be the parent node 702, 802, and the second node may be the child node 704, 804. Alternatively, the first node may be the child node 704, 804, and the second node may be the parent node 702, 802. Optional aspects are illustrated in dashed lines. The method allows the first node to perform more efficient communication with the second node based on a multiplexing capability of the first node using, e.g., SDM.

At 1002, the first node may perform a local interference measurement of one or more beams for communicating with the second node. For example, 1002 may be performed by interference measurement component 1108. For instance, referring to FIG. 8, a child node 804 may perform a local interference measurement 805. For example, the child node 804 may perform one or more of a self-interference measurement or a cross-beam interference measurement. Performing an interference measurement may include receiving a signal and determining the interference measurement based on the received signal.

At 1004, the first node transmits a report to a CU, where the report includes at least one multiplexing capability of the first node or includes at least one multiplexing capability condition for the at least one multiplexing capability of the first node. For example, 1004 may be performed by transmission report component 1112. The at least one multiplexing capability comprises at least one of SDM or FDM, and the SDM includes at least one of SDM FD or SDM HD. For instance, referring to FIG. 8, the parent node 802 or the child node 804 may respectively transmit a report 808, 810 including a SDM FD or HD capability or conditions to a central unit 806. The report may be transmitted by a child node, a parent node, or both a child node and a parent node. In an aspect, reports transmitted by a child node may be optional.

The report may also include the local interference measurement. One or more of the reports may include, but are not limited to beam/channel quality measurements, CLI measurements, RRM measurements, traffic/load report, SDM FD or SDM HD capability and SDM FD or SDM HD conditions, e.g. what pairs of beams or pairs of links may be transmitted using an SDM associated with them, and when there may be any limitation on the link-budget (e.g., max TX or RX power). One or more of the reports may include a report of SI or cross-beam interference measurements.

The at least one multiplexing capability is also with respect to one or more transmission direction combinations of the first node. For example, the first node may include a MT and a DU, and the one or more transmission direction combinations may comprise at least one of MT transmission and DU transmission, MT transmission and DU reception, MT reception and DU transmission, or MT reception and DU reception. For instance, referring to FIG. 8, the report 808, 810 may indicate SDM or FDM capability of the parent node or child node with respect to transmission-direction combinations including MT-TX/DU-TX (the MT transmits while the DU transmits), MT-TX/DU-RX (the MT transmits while the DU receives), MT-RX/DU-TX (the MT receives while the DU transmits), and MT-RX/DU-RX (the MT receives while the DU receives).

In one example, the at least one multiplexing capability may be for SDM FD, and the one or more beams may comprise a transmission beam and a reception beam of the first node. For instance, referring to FIG. 8, for SDM (FD) operation, the child node 804 may measure self-interference for different combinations of TX/RX beams.

In another example, the at least one multiplexing capability may be for SDM HD, and the one or more beams may comprise a plurality of transmission beams of the first node or a plurality of reception beams of the first node. For instance, referring to FIG. 8, for SDM (HD) operation, the child node 804 may measure cross-beam interference, in which a transmission (or reception) over one beam of the child node may interfere with a transmission (or reception) over another beam of the child node.

The at least one multiplexing capability condition may comprise at least one of: one or more beams to be used for SDM; or a link budget of the first node. For example, referring to FIG. 8, if the SDM capability is conditional, the report 810 to the CU may include the SDM FD or SDM HD conditions of the child node (e.g. beams that may be used for SDM, link budget requirements, the links or beam pairs available for SDM, and/or the physical channels available for SDM).

At 1006, the first node receives a semi-static resource allocation from the CU based on the at least one multiplexing capability. For example, 1006 may be performed by receive semi-static resource component 1114. For instance, referring to FIG. 8, the parent node 802 or the child node 804 may receive a semi-static resource allocation 812 from the central unit 806 for communicating with each other using SDM.

At 1008, the first node may receive, from the CU, one or more resource conditions for using allocated resources of the semi-static resource allocation. For example, 1008 may be performed by receive conditions component 1116. For instance, referring to FIG. 8, the parent node 802 or the child node 804 may receive conditions 814 for use of resources from the central unit 806. The conditions may be received by one or more nodes. The one or more nodes may be one or more child nodes and/or one or more parent nodes. At least one of the semi-static resource allocation or the conditions for use of resources may be based on the report.

The one or more resource conditions may indicate whether the allocated resources are conditional or unconditional for communicating with the second node. For instance, referring to FIG. 8, the conditions 814 may indicate whether a set of allocated time-domain resources may be used unconditionally or not for SDM Full-duplex or Half-duplex operation. Conditions 814 may include the directional conditions (D/U/F) described above, as well as additional conditions for conditional use. For example, in a case of conditional use, the CU 806 may further indicate as conditions 814 various constraints such as those on modulation coding scheme (MCS, e.g. the maximum MCS used over the allocated resources), transmit (Tx) power (e.g. the maximum Tx power that may be used), receive (Rx) power (e.g. the maximum Rx power that may be used), TX/RX beam(s) that may be used (e.g. the subset of beams or beam pairs/links that may be used), frequency-domain resources (e.g. the limited RBs that may be used over an indicated set of time domain resources in the semi-static resource allocation), reference signal configuration/resources (e.g. the specific tones or resources that DMRS or another reference signal may be transmitted), and timing reference (e.g. the Tx/Rx timing to be used for alignment with other simultaneous communications).

In one example, the first node may be a parent node and the second node may be a child node, and the one or more resource conditions may identify at least one expected behavior of the parent node with respect to the allocated resources for communicating with the child node. The allocated resources may comprise one of hard resources or soft resources. For instance, referring to FIG. 8, semi-static resource allocation 812 and/or conditions 814 may identify an expected behavior of the parent node 802 as an alternative to aforementioned conflict resolution rules. For example, if the resource allocation for a same set of resources is (HARD H HARD), the conditions 814 may indicate to the parent node 802 an expected behavior not to yield the resources for use by its children when the child node 804 has HD or FD capability. In another example, the conditions 814 may indicate to the parent node an expected behavior not to refrain from using released soft resources when communicating with the child node.

In another example, the first node may be a child node and the second node may be a parent node, and the one or more resource conditions may identify at least one expected behavior of the child node with respect to the allocated resources for communicating with the parent node. For instance, referring to FIG. 8, the conditions 814 may indicate to the child node 804 an expected behavior not to refrain from using unreleased (or reclaimed) soft resources when communicating with its own child nodes or the parent node 802.

At 1010, the first node may transmit a change request to the CU to modify the semi-static resource allocation, where the at least one multiplexing capability may be enabled based on the modified semi-static resource allocation. For example, 1010 may be performed by transmit change request component 1118. For instance, referring to FIG. 8, the parent node 802 or the child node 804 may respectively transmit a change request 816, 818 to the CU 806 to modify at least one of the semi-static resource allocation 812 or the conditions 814 for use of resources. In an aspect, the change request may include a request to enable or disable at least one of SDM FD or SDM HD.

At 1012, the first node may modify at least one of a transmission beam or a reception beam based on the local interference measurement. For example, 1012 may be performed by a modify beams component 1110. For instance, referring to FIG. 8, the parent node 802 or the child node 804 may modify, at 820 and 822 respectively, at least one of a transmit or a receive beam based on at least one of the semi-static resource allocation 812 or the conditions 814 for use of resources, where the semi-static resource allocation 812 or the conditions 814 may be indicated based on the report 810 sent to the CU 806 including the local interference measurement 805. For example, the parent node 802 or the child node 804 may modify beams by processing at least one of the semi-static resource allocation or the conditions for use of resources to determine a modification and implementing the modification to the at least one of a transmit or a receive beam.

Finally, at 1014, the first node communicates with a second node based on the semi-static resource allocation. The communication with the second node may also be based on the one or more resource conditions. For example, 1014 may be performed by establish FD component 1120. For instance, referring to FIG. 8, the parent node 802 or the child node 804 may establish a FD connection and communicate with each other at 824 or 826 using at least one of a hard resource or a soft resource based on at least one of the semi-static resource allocation 812 or the conditions 814 for use of resources received based on the report 810 to the CU 806.

Figure 11:
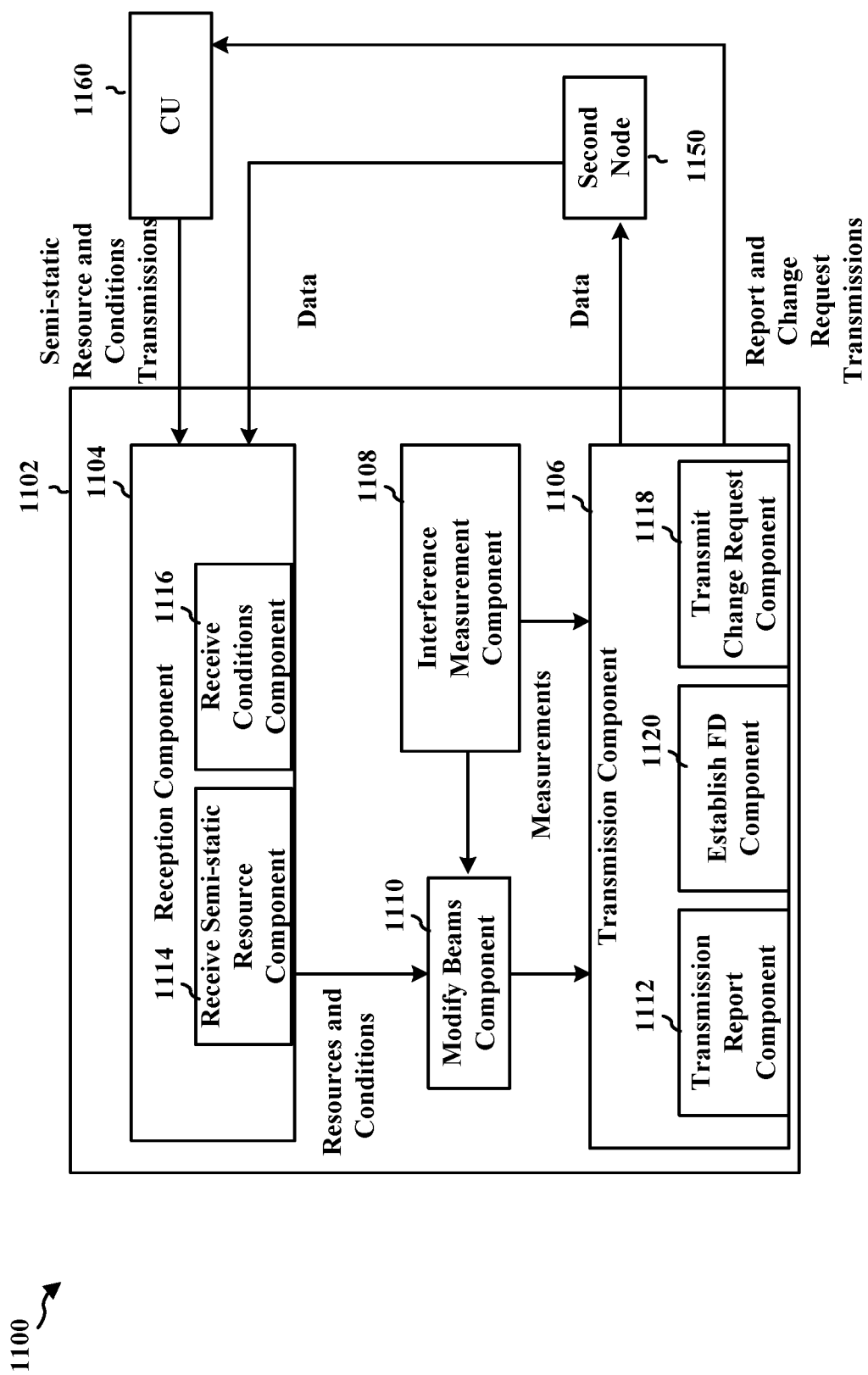
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a first node in communication with a second node 1150 and a CU 1160 (e.g. CU 806). The apparatus may be, e.g., parent node 802, and the second node may be, e.g., child node 804. Alternatively, the apparatus may be, e.g., child node 804, and the second node may be, e.g., parent node 802.

The apparatus 1102 includes a reception component 1104 that is configured to receives communications from the second node 1150 and CU 1160. For example, the reception component may receive semi-static resource allocations from the CU and data from the second node. The apparatus also includes a transmission component 1106 that is configured to transmit communications to the second node and CU. For example, the transmission component may transmit reports to the CU and data to the second node.

The apparatus 1102 may include an interference measurement component 1108 that is configured to perform a local interference measurement of one or more beams for communicating with the second node, e.g., as described in connection with 1002. The apparatus may include a modify beams component 1110 that is configured to modify at least one of a transmission beam or a reception beam based on the local interference measurement, e.g., as described in connection with 1012. The apparatus (e.g. the transmission component 1106) may include a transmission report component 1112 that is configured to transmit a report to the CU, where the report includes at least one multiplexing capability of the first node or includes at least one multiplexing capability condition for the at least one multiplexing capability of the first node, e.g., as described in connection with 1004. The apparatus (e.g. the reception component 1104) may include a receive semi-static resource component 1114 that is configured to receive a semi-static resource allocation from the CU based on the at least one multiplexing capability (included in the report from transmission report component 1112), e.g., as described in connection with 1006.

The apparatus 1102 (e.g. the reception component 1104) may include a receive conditions component 1116 that is configured to receive, from the CU 1160, one or more resource conditions for using allocated resources of the semi-static resource allocation, e.g., as described in connection with 1008. The apparatus (e.g. the transmission component 1106) may include a transmit change request component 1118 that is configured to transmit a change request to the CU to modify the semi-static resource allocation (received by receive conditions component 1116), e.g., as described in connection with 1010. The apparatus may include an establish FD component 1120 that is configured to communicate with the second node 1150 based on the semi-static resource allocation and on the one or more resource conditions (received by receive conditions component 1116), e.g., as described in connection with 1014.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
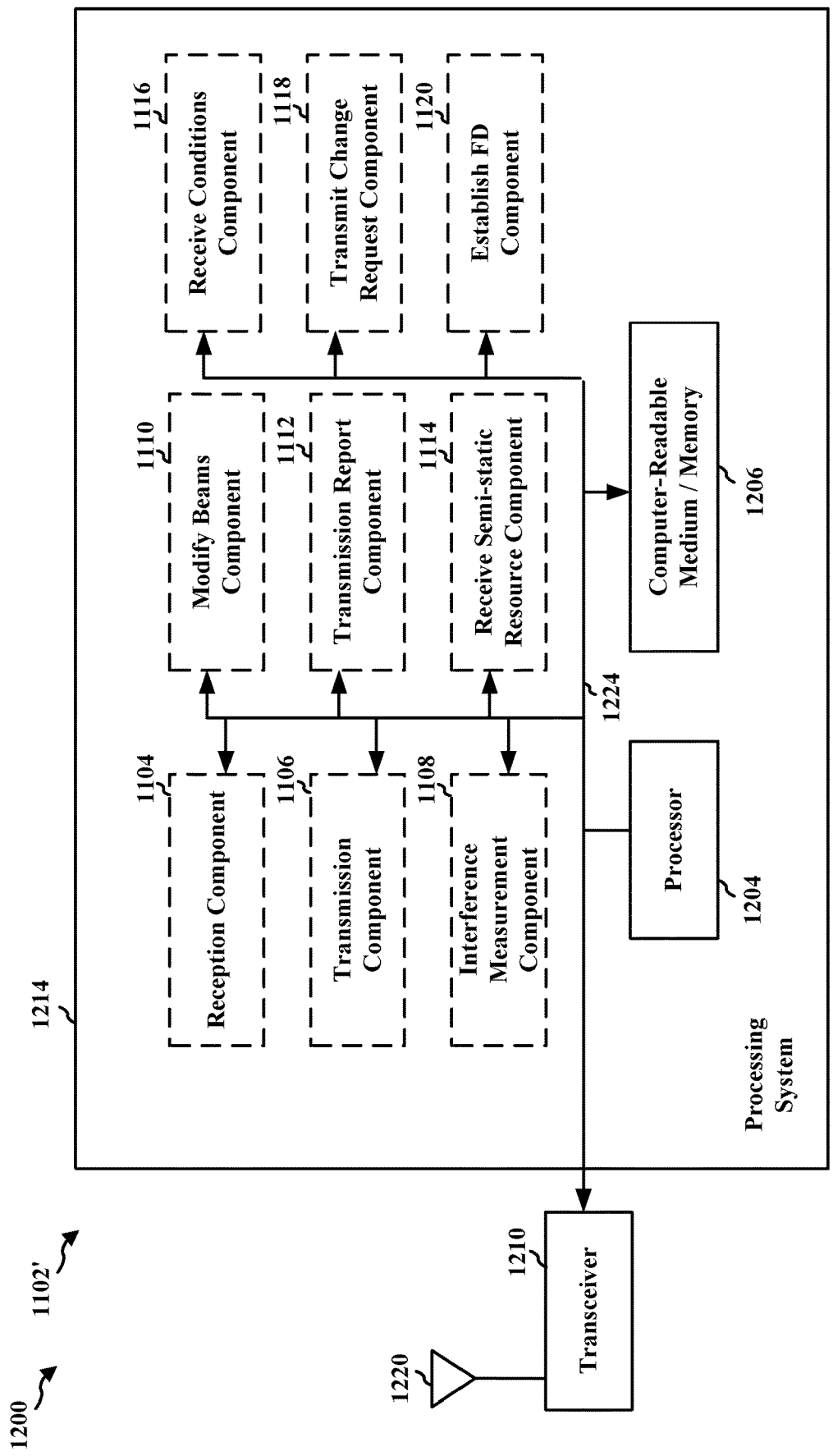
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120. The components may be software components running in the processor 1204, resident/stored in the computer readable medium/memory 1206, one or more hardware components coupled to the processor 1204, or some combination thereof. The processing system 1214 may be a component of an IAB node (e.g. IAB node 402) or the UE 350 and may include the memory 360 and/or at least one of the TX processor 368, the RX processor 356, and the controller/processor 359. Alternatively, the processing system 1214 may be the entire IAB node or UE (e.g., see 350 of FIG. 3).

In one configuration, the apparatus 1102/1102' for wireless communication includes means for transmitting a report to a central unit (CU), wherein the report includes at least one multiplexing capability of the first node or includes at least one multiplexing capability condition for the at least one multiplexing capability of the first node; means for receiving a semi-static resource allocation from the CU based on the at least one multiplexing capability; and means for communicating with a second node based on the semi-static resource allocation; wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and wherein the at least one multiplexing capability is with respect to one or more transmission direction combinations of the first node.

In one configuration, the apparatus 1102/1102' may include means for performing a local interference measurement of one or more beams for communicating with the second node; and wherein the report includes the local interference measurement.

In one configuration, the apparatus 1102/1102' may include means for modifying at least one of the transmission beam or the reception beam based on the local interference measurement.

In one configuration, the apparatus 1102/1102' may include means for receiving, from the CU, one or more resource conditions for using allocated resources of the semi-static resource allocation; wherein the communicating with the second node is based on the one or more resource conditions.

In one configuration, the apparatus 1102/1102' may include means for transmitting a change request to the CU to modify the semi-static resource allocation; wherein the at least one multiplexing capability is enabled based on the modified semi-static resource allocation.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
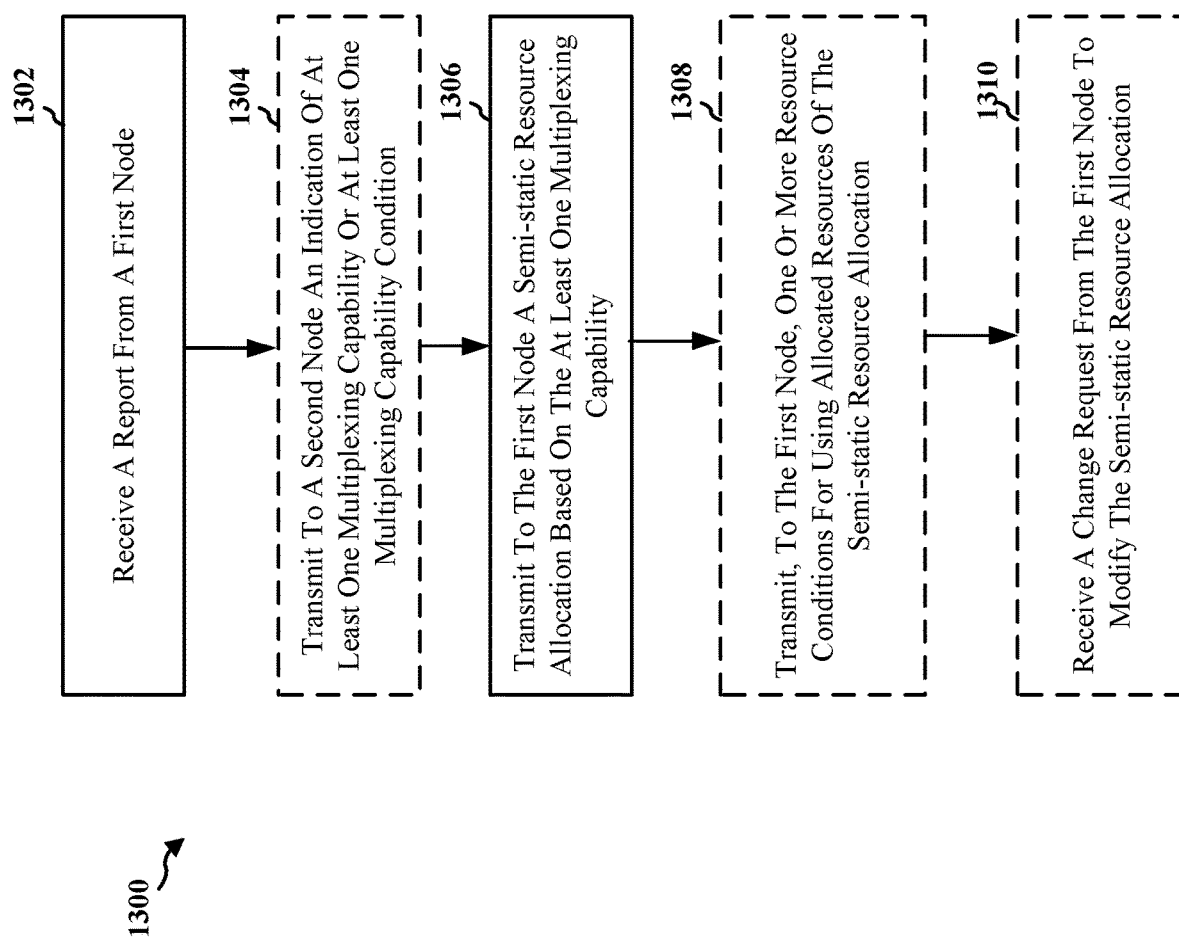
FIG. 13 is a flowchart of a method of wireless communication at a CU.

FIG. 13 is a flowchart 1300 of a method of wireless communication. The method may be performed by a central unit, such as an IAB node or base station (e.g., the base station 102/180, 310, the IAB node 402, 606, the central unit 706, 806; the apparatus 1402/1402'; the processing system 1514, which may include the memory 376 and which may be the entire central unit, IAB node or base station 310 or a component of the central unit, IAB node or base station 310, such as the TX processor 316, the RX processor 370, and/or the controller/processor 375). The central unit may communicate with a first node and a second node, such as an IAB node or UE. For example, the first node may be the parent node 702, 802, and the second node may be the child node 704, 804. Alternatively, the first node may be the child node 704, 804, and the second node may be the parent node 702, 802. Optional aspects are illustrated in dashed lines. The method allows the central unit to provide more efficient capability to the first node for communicating with the second node based on a multiplexing capability of the first node using, e.g., SDM.

At 1302, the central unit receives a report from a first node, where the report includes at least one multiplexing capability of the first node or includes at least one multiplexing capability condition for the at least one multiplexing capability of the first node. For example, 1302 may be performed by receive report component 1408. For instance, referring to FIG. 8, the central unit 806 may receive a report 808, 810 respectively from a parent node 802 or a child node 804. The report may be received from a child node, a parent node, or both a child node and a parent node. In an aspect, reports from a child node may be optional. One or more of the reports may include, but are not limited to, beam/channel quality measurements, CLI measurements, RRM measurements, traffic/load report, SDM FD or SDM HD capability and SDM FD or SDM HD conditions, e.g. what pairs of beams or pairs of links may be transmitted using SDM, and any limitation on the link-budget (e.g., max TX or RX power). One or more of the reports may include a report of SI or cross-beam interference measurements.

At 1304, the central unit may transmit to a second node an indication of the at least one multiplexing capability or the at least one multiplexing capability condition. For example, 1304 may be performed by capability indication component 1410. For instance, referring to FIG. 8, when the CU 806 receives the report 810 from the child node 804, the CU may transmit to the parent node 802 an indication of the capability or conditions of the child node. The report 808 from the parent node 802 may similarly include SDM capability and/or conditions of the parent node, and the CU 806 may similarly transmit to the child node 804 an indication of the capability or conditions of the parent node.

At 1306, the central unit transmits to the first node a semi-static resource allocation based on the at least one multiplexing capability for communication of the first node with a second node. The at least one multiplexing capability comprises at least one of SDM or FDM, and the SDM includes at least one of SDM FD or SDM HD. For example, 1306 may be performed by transmit semi-static resource component 1412. For instance, referring to FIG. 8, the central unit 806 may transmit a semi-static resource allocation 812 to one or more nodes including the parent node 802 or child node 804 to use for communicating using SDM. The one or more nodes may be one or more child nodes 804 and/or one or more parent nodes 802. The semi-static resources may include, but are not limited to allocation information for time-domain resources.

The at least one multiplexing capability is also with respect to one or more transmission direction combinations of the first node. For example, the first node may include a MT and a DU, and the one or more transmission direction combinations may comprise at least one of MT transmission and DU transmission, MT transmission and DU reception, MT reception and DU transmission, or MT reception and DU reception. For instance, referring to FIG. 8, the report 808, 810 may indicate SDM or FDM capability of the parent node or child node with respect to transmission-direction combinations including MT-TX/DU-TX (the MT transmits while the DU transmits), MT-TX/DU-RX (the MT transmits while the DU receives), MT-RX/DU-TX (the MT receives while the DU transmits), and MT-RX/DU-RX (the MT receives while the DU receives).

The at least one multiplexing capability condition may comprise at least one of: one or more beams to be used for SDM; or a link budget of the first node. For example, referring to FIG. 8, if the SDM capability is conditional, the report 810 to the CU may include the SDM FD or SDM HD conditions of the child node (e.g. beams that may be used for SDM, link budget requirements, the links or beam pairs available for SDM, and/or the physical channels available for SDM).

At 1308, the central unit may transmit, to the first node, one or more resource conditions for using allocated resources of the semi-static resource allocation. The communication of the first node with the second node may be based on the one or more resource conditions. For example, 1308 may be performed by transmit conditions component 1414. For instance, referring to FIG. 8, the central unit 806 may transmit conditions 814 for use of resources to one or more nodes. The one or more nodes may be one or more child nodes 804 and/or one or more parent nodes 802. At least one of the semi-static resource allocation 812 or the conditions 814 for use of resources may be based on the report 808, 810.

The one or more resource conditions may indicate whether the allocated resources are conditional or unconditional for communication of the first node with the second node. For instance, referring to FIG. 8, the conditions 814 may indicate whether a set of allocated time-domain resources may be used unconditionally or not for SDM Full-duplex or Half-duplex operation. Conditions 814 may include the directional conditions (D/U/F) described above, as well as additional conditions for conditional use. For example, in a case of conditional use, the CU 806 may further indicate as conditions 814 various constraints such as those on modulation coding scheme (MCS, e.g. the maximum MCS used over the allocated resources), transmit (Tx) power (e.g. the maximum Tx power that may be used), receive (Rx) power (e.g. the maximum Rx power that may be used), TX/RX beam(s) that may be used (e.g. the subset of beams or beam pairs/links that may be used), frequency-domain resources (e.g. the limited RBs that may be used over an indicated set of time domain resources in the semi-static resource allocation), reference signal configuration/resources (e.g. the specific tones or resources that DMRS or another reference signal may be transmitted), and timing reference (e.g. the Tx/Rx timing to be used for alignment with other simultaneous communications).

In one example, the first node may be a parent node and the second node may be a child node, and the one or more resource conditions may identify at least one expected behavior of the parent node with respect to the allocated resources for communicating with the child node. The allocated resources may comprise one of hard resources or soft resources. For instance, referring to FIG. 8, semi-static resource allocation 812 and/or conditions 814 may identify an expected behavior of the parent node 802 as an alternative to aforementioned conflict resolution rules. For example, if the resource allocation for a same set of resources is (HARD H HARD), the conditions 814 may indicate to the parent node 802 an expected behavior not to yield the resources for use by its children when the child node 804 has HD or FD capability. In another example, the conditions 814 may indicate to the parent node an expected behavior not to refrain from using released soft resources when communicating with the child node.

In another example, the first node may be a child node and the second node may be a parent node, and the one or more resource conditions may identify at least one expected behavior of the child node with respect to the allocated resources for communicating with the parent node. For instance, referring to FIG. 8, the conditions 814 may indicate to the child node 804 an expected behavior not to refrain from using unreleased (or reclaimed) soft resources when communicating with its own child nodes or the parent node 802.

Finally, at 1310, the central unit may receive a change request from the first node to modify the semi-static resource allocation. The at least one multiplexing capability may be enabled for the first node based on the modified semi-static resource allocation. For example, 1310 may be performed by receive change request component 1416. For instance, referring to FIG. 8, the central unit 806 may receive a change request 816, 818 respectively from the parent node 802 or child node 804 to modify at least one of the semi-static resource allocation 812 or the conditions 814 for use of resources. The change request may be received from a child node, a parent node, or both a child node and a parent node. In an aspect, the change request may include a request to enable or disable at least one of SDM FD or SDM HD.

Figure 14:
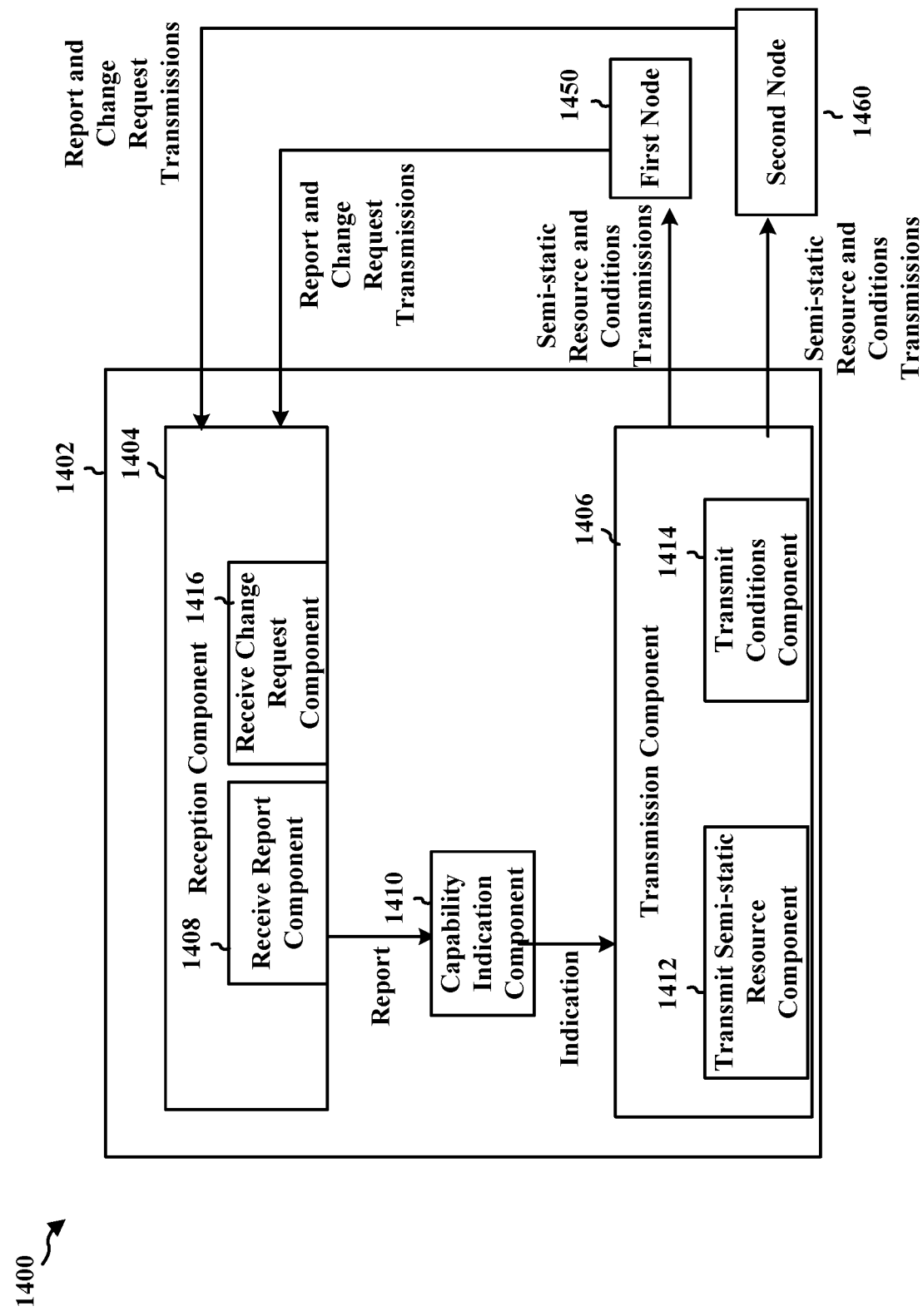
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a CU (e.g. CU 806) in communication with a first node 1450 and a second node 1460. The first node may be, e.g., parent node 802, and the second node may be, e.g., child node 804. Alternatively, the first may be, e.g., child node 804, and the second node may be, e.g., parent node 802.

The apparatus 1402 includes a reception component 1404 that is configured to receive communications from the first node 1450 and second node 1460. For example, the reception component may receive reports and change requests from the first node and the second node. The apparatus also includes a transmission component 1406 that is configured to transmit communications to the first node and the second node. For example, the transmission component may transmit semi-static resource allocations and resource conditions to the first node and the second node.

The apparatus 1402 (e.g. the reception component 1404) includes a receive report component 1408 that is configured to receive a report from a first node, where the report includes at least one multiplexing capability of the first node or includes at least one multiplexing capability condition for the at least one multiplexing capability of the first node, e.g., as described in connection with 1302. The apparatus may include a capability indication component 1410 that is configured to transmit to a second node an indication of the at least one multiplexing capability or the at least one multiplexing capability condition (based on the report from receive report component 1408), e.g., as described in connection with 1304. The apparatus includes a transmit semi-static resource component 1412 that is configured to transmit to the first node a semi-static resource allocation based on the at least one multiplexing capability for communication of the first node with a second node, e.g., as described in connection with 1306. The apparatus may include a transmit conditions component 1414 that is configured to transmit, to the first node, one or more resource conditions for using allocated resources of the semi-static resource allocation, e.g., as described in connection with 1308. The apparatus may include a receive change request component 1416 that is configured to receive a change request from the first node to modify the semi-static resource allocation, e.g., as described in connection with 1310.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
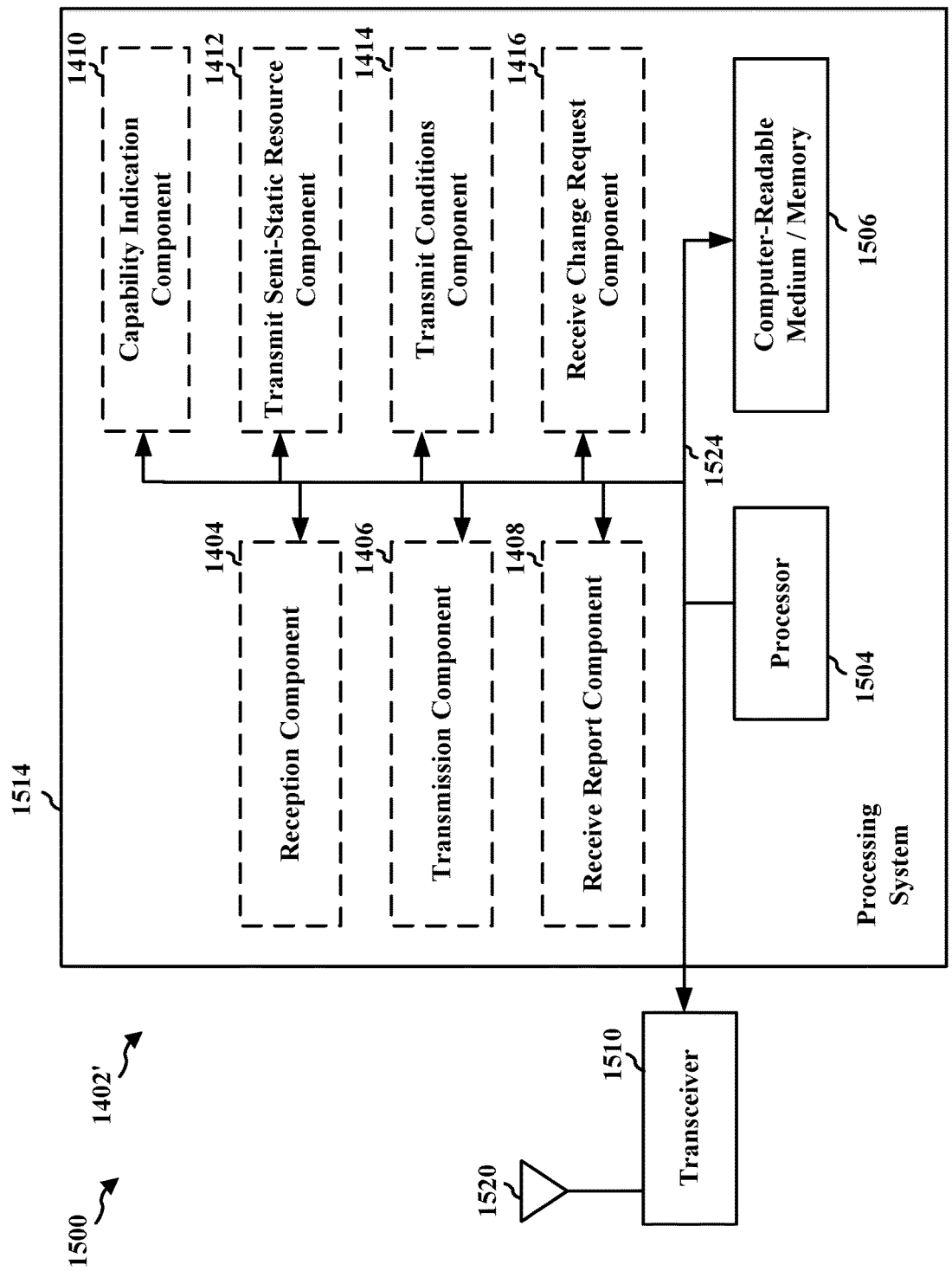
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416. The components may be software components running in the processor 1504, resident/stored in the computer readable medium/memory 1506, one or more hardware components coupled to the processor 1504, or some combination thereof. The processing system 1514 may be a component of a CU (e.g. CU 706, 806 of an IAB node 606) or the base station 310 and may include the memory 376 and/or at least one of the TX processor 316, the RX processor 370, and the controller/processor 375. Alternatively, the processing system 1514 may be the entire CU, IAB node, or base station (e.g., see 310 of FIG. 3).

In one configuration, the apparatus 1402/1402' for wireless communication includes means for receiving a report from a first node, wherein the report includes at least one multiplexing capability of the first node or includes at least one multiplexing capability condition for the at least one multiplexing capability of the first node; and means for transmitting to the first node a semi-static resource allocation based on the at least one multiplexing capability for communication of the first node with a second node; wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and wherein the at least one multiplexing capability is with respect to one or more transmission direction combinations of the first node.

In one configuration, the apparatus 1402/1402' may include means for transmitting to the second node an indication of the at least one multiplexing capability or the at least one multiplexing capability condition.

In one configuration, the apparatus 1402/1402' may include means for transmitting, to the first node, one or more resource conditions for using allocated resources of the semi-static resource allocation; wherein the communication of the first node with the second node is based on the one or more resource conditions.

In one configuration, the apparatus 1402/1402' may include means for receiving a change request from the first node to modify the semi-static resource allocation; wherein the at least one multiplexing capability is enabled for the first node based on the modified semi-static resource allocation.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
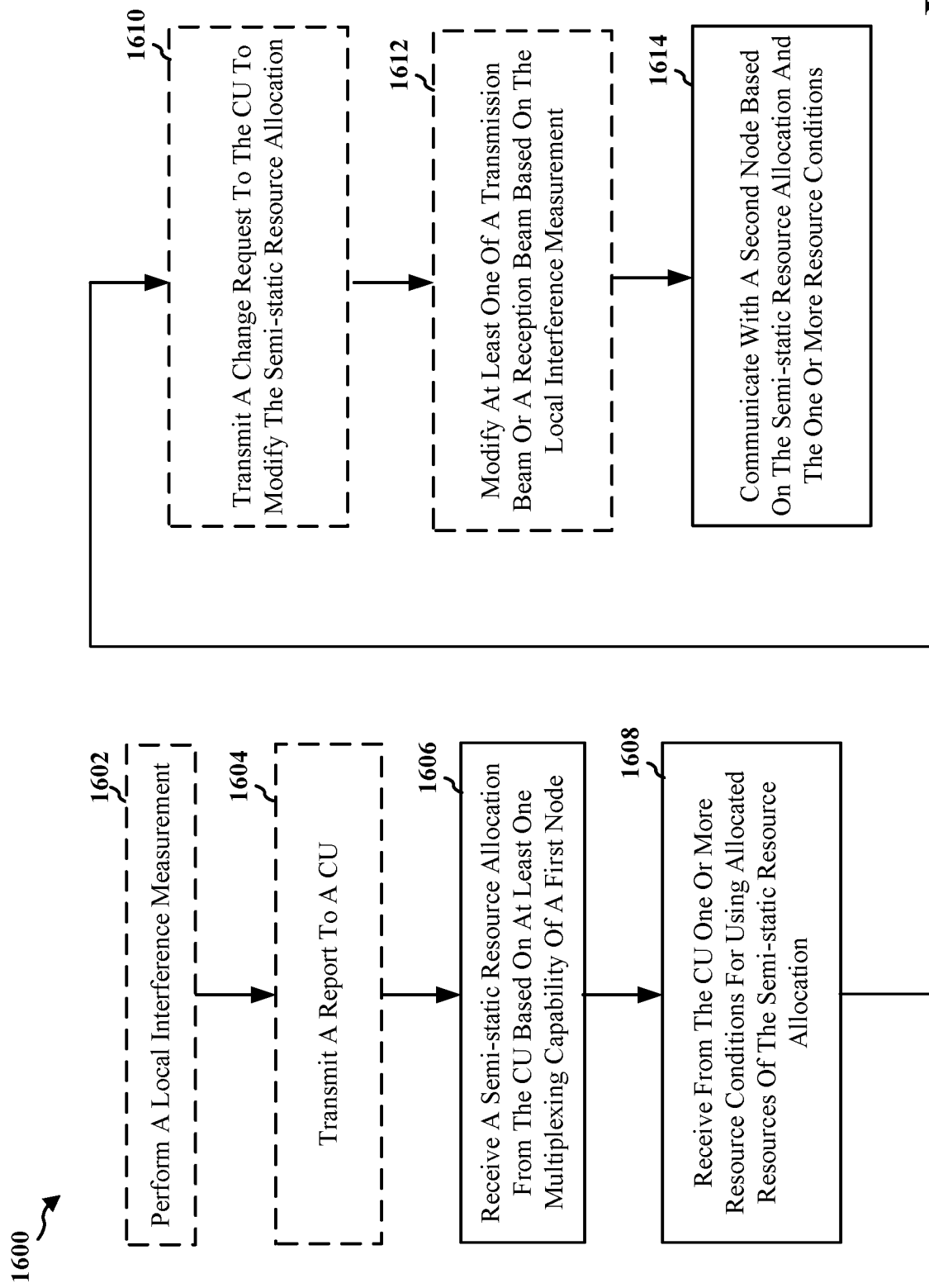
FIG. 16 is a flowchart of a method of wireless communication at a first node.

FIG. 16 is a flowchart 1600 of a method of wireless communication. The method may be performed by a first node, such as an JAB node or UE (e.g., the UE 104, 350, 514, the JAB node 402, 414, 416, 424, 426, 434, 436, 501, 503, 506, 506, 510, 512, 516, 520, 605, 902, 906, the parent node 702, 802, the child node 704, 804; the apparatus 1702/1702'; the processing system 1814, which may include the memory 360 and which may be the entire IAB node or UE 350 or a component of the IAB node or UE 350, such as the TX processor 368, the RX processor 356, and/or the controller/processor 359). The first node may communicate with a second node, such as another IAB node or UE. For example, the first node may be the parent node 702, 802, and the second node may be the child node 704, 804. Alternatively, the first node may be the child node 704, 804, and the second node may be the parent node 702, 802. Optional aspects are illustrated in dashed lines. The method allows the first node to perform more efficient communication with the second node based on a multiplexing capability of the first node using, e.g., SDM.

At 1602, the first node may perform a local interference measurement of one or more beams for communicating with the second node. For example, 1602 may be performed by interference measurement component 1708. For instance, referring to FIG. 8, a child node 804 may perform a local interference measurement 805. For example, the child node 804 may perform one or more of a self-interference measurement or a cross-beam interference measurement. Performing an interference measurement may include receiving a signal and determining the interference measurement based on the received signal.

At 1604, the first node may transmit a report to a CU, where the report includes at least one multiplexing capability of the first node or includes at least one multiplexing capability condition for the at least one multiplexing capability of the first node. For example, 1604 may be performed by transmission report component 1712. The at least one multiplexing capability comprises at least one of SDM or FDM, and the SDM includes at least one of SDM FD or SDM HD. For instance, referring to FIG. 8, the parent node 802 or the child node 804 may respectively transmit a report 808, 810 including a SDM FD or HD capability or conditions to a central unit 806. The report may be transmitted by a child node, a parent node, or both a child node and a parent node. In an aspect, reports transmitted by a child node may be optional.

The report may also include the local interference measurement. One or more of the reports may include, but are not limited to beam/channel quality measurements, CLI measurements, RRM measurements, traffic/load report, SDM FD or SDM HD capability and SDM FD or SDM HD conditions, e.g. what pairs of beams or pairs of links may be transmitted using an SDM associated with them, and when there may be any limitation on the link-budget (e.g., max TX or RX power). One or more of the reports may include a report of SI or cross-beam interference measurements.

The at least one multiplexing capability is also with respect to one or more transmission direction combinations of the first node. For example, the first node may include a MT and a DU, and the one or more transmission direction combinations may comprise at least one of MT transmission and DU transmission, MT transmission and DU reception, MT reception and DU transmission, or MT reception and DU reception. For instance, referring to FIG. 8, the report 808, 810 may indicate SDM or FDM capability of the parent node or child node with respect to transmission-direction combinations including MT-TX/DU-TX (the MT transmits while the DU transmits), MT-TX/DU-RX (the MT transmits while the DU receives), MT-RX/DU-TX (the MT receives while the DU transmits), and MT-RX/DU-RX (the MT receives while the DU receives).

In one example, the at least one multiplexing capability may be for SDM FD, and the one or more beams may comprise a transmission beam and a reception beam of the first node. For instance, referring to FIG. 8, for SDM (FD) operation, the child node 804 may measure self-interference for different combinations of TX/RX beams.

In another example, the at least one multiplexing capability may be for SDM HD, and the one or more beams may comprise a plurality of transmission beams of the first node or a plurality of reception beams of the first node. For instance, referring to FIG. 8, for SDM (HD) operation, the child node 804 may measure cross-beam interference, in which a transmission (or reception) over one beam of the child node may interfere with a transmission (or reception) over another beam of the child node.

The at least one multiplexing capability condition may comprise at least one of: one or more beams to be used for SDM; or a link budget of the first node. For example, referring to FIG. 8, if the SDM capability is conditional, the report 810 to the CU may include the SDM FD or SDM HD conditions of the child node (e.g. beams that may be used for SDM, link budget requirements, the links or beam pairs available for SDM, and/or the physical channels available for SDM).

At 1606, the first node receives a semi-static resource allocation from the CU based on the at least one multiplexing capability of the first node. For example, 1606 may be performed by receive semi-static resource component 1714. For instance, referring to FIG. 8, the parent node 802 or the child node 804 may receive a semi-static resource allocation 812 from the central unit 806 for communicating with each other using SDM.

At 1608, the first node receives, from the CU, one or more resource conditions for using allocated resources of the semi-static resource allocation. For example, 1608 may be performed by receive conditions component 1716. For instance, referring to FIG. 8, the parent node 802 or the child node 804 may receive conditions 814 for use of resources from the central unit 806. The conditions may be received by one or more nodes. The one or more nodes may be one or more child nodes and/or one or more parent nodes. At least one of the semi-static resource allocation or the conditions for use of resources may be based on the report.

The one or more resource conditions may indicate whether the allocated resources are conditional or unconditional for communicating with the second node. For instance, referring to FIG. 8, the conditions 814 may indicate whether a set of allocated time-domain resources may be used unconditionally or not for SDM Full-duplex or Half-duplex operation. Conditions 814 may include the directional conditions (D/U/F) described above, as well as additional conditions for conditional use. For example, in a case of conditional use, the CU 806 may further indicate as conditions 814 various constraints such as those on modulation coding scheme (MCS, e.g. the maximum MCS used over the allocated resources), transmit (Tx) power (e.g. the maximum Tx power that may be used), receive (Rx) power (e.g. the maximum Rx power that may be used), TX/RX beam(s) that may be used (e.g. the subset of beams or beam pairs/links that may be used), frequency-domain resources (e.g. the limited RBs that may be used over an indicated set of time domain resources in the semi-static resource allocation), reference signal configuration/resources (e.g. the specific tones or resources that DMRS or another reference signal may be transmitted), and timing reference (e.g. the Tx/Rx timing to be used for alignment with other simultaneous communications).

In one example, the first node may be a parent node and the second node may be a child node, and the one or more resource conditions may identify at least one expected behavior of the parent node with respect to the allocated resources for communicating with the child node. The allocated resources may comprise one of hard resources or soft resources. For instance, referring to FIG. 8, semi-static resource allocation 812 and/or conditions 814 may identify an expected behavior of the parent node 802 as an alternative to aforementioned conflict resolution rules. For example, if the resource allocation for a same set of resources is (HARD H HARD), the conditions 814 may indicate to the parent node 802 an expected behavior not to yield the resources for use by its children when the child node 804 has HD or FD capability. In another example, the conditions 814 may indicate to the parent node an expected behavior not to refrain from using released soft resources when communicating with the child node.

In another example, the first node may be a child node and the second node may be a parent node, and the one or more resource conditions may identify at least one expected behavior of the child node with respect to the allocated resources for communicating with the parent node. For instance, referring to FIG. 8, the conditions 814 may indicate to the child node 804 an expected behavior not to refrain from using unreleased (or reclaimed) soft resources when communicating with its own child nodes or the parent node 802.

At 1610, the first node may transmit a change request to the CU to modify the semi-static resource allocation, where the at least one multiplexing capability may be enabled based on the modified semi-static resource allocation. For example, 1610 may be performed by transmit change request component 1718. For instance, referring to FIG. 8, the parent node 802 or the child node 804 may respectively transmit a change request 816, 818 to the CU 806 to modify at least one of the semi-static resource allocation 812 or the conditions 814 for use of resources. In an aspect, the change request may include a request to enable or disable at least one of SDM FD or SDM HD.

At 1612, the first node may modify at least one of a transmission beam or a reception beam based on the local interference measurement. For example, 1612 may be performed by a modify beams component 1710. For instance, referring to FIG. 8, the parent node 802 or the child node 804 may modify, at 820 and 822 respectively, at least one of a transmit or a receive beam based on at least one of the semi-static resource allocation 812 or the conditions 814 for use of resources, where the semi-static resource allocation 812 or the conditions 814 may be indicated based on the report 810 sent to the CU 806 including the local interference measurement 805. For example, the parent node 802 or the child node 804 may modify beams by processing at least one of the semi-static resource allocation or the conditions for use of resources to determine a modification and implementing the modification to the at least one of a transmit or a receive beam.

Finally, at 1614, the first node communicates with a second node based on the semi-static resource allocation. The communication with the second node may also be based on the one or more resource conditions. For example, 1614 may be performed by establish FD component 1720. For instance, referring to FIG. 8, the parent node 802 or the child node 804 may establish a FD connection and communicate with each other at 824 or 826 using at least one of a hard resource or a soft resource based on at least one of the semi-static resource allocation 812 or the conditions 814 for use of resources received based on the report 810 to the CU 806.

Figure 17:
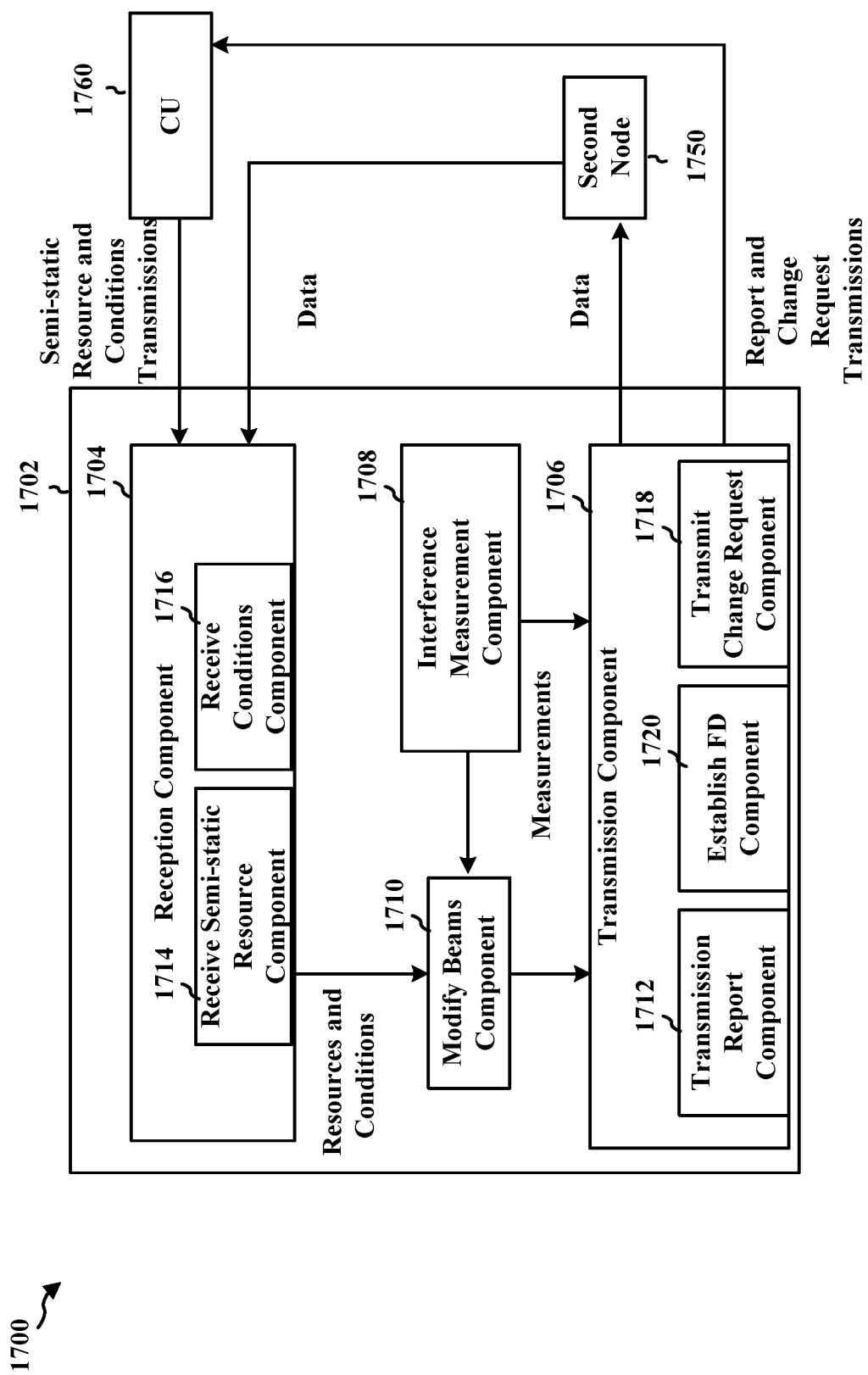
FIG. 17 is a conceptual data flow diagram illustrating the data flow between different means/components in an example apparatus.

FIG. 17 is a conceptual data flow diagram 1700 illustrating the data flow between different means/components in an example apparatus 1702. The apparatus may be a first node in communication with a second node 1750 and a CU 1760 (e.g. CU 806). The apparatus may be, e.g., parent node 802, and the second node may be, e.g., child node 804. Alternatively, the apparatus may be, e.g., child node 804, and the second node may be, e.g., parent node 802.

The apparatus 1702 includes a reception component 1704 that is configured to receive communications from the second node 1750 and CU 1760. For example, the reception component may receive semi-static resource allocations from the CU and data from the second node. The apparatus also includes a transmission component 1706 that is configured to transmit communications to the second node and CU. For example, the transmission component may transmit reports to the CU and data to the second node.

The apparatus 1702 may include an interference measurement component 1708 that is configured to perform a local interference measurement of one or more beams for communicating with the second node, e.g., as described in connection with 1602. The apparatus may include a modify beams component 1710 that is configured to modify at least one of a transmission beam or a reception beam based on the local interference measurement, e.g., as described in connection with 1612. The apparatus (e.g. the transmission component 1706) may include a transmission report component 1712 that is configured to transmit a report to the CU, where the report includes at least one multiplexing capability of the first node or includes at least one multiplexing capability condition for the at least one multiplexing capability of the first node, e.g., as described in connection with 1604. The apparatus (e.g. the reception component 1704) may include a receive semi-static resource component 1714 that is configured to receive a semi-static resource allocation from the CU based on the at least one multiplexing capability (e.g. included in the report from transmission report component 1112), e.g., as described in connection with 1606.

The apparatus 1702 (e.g. the reception component 1704) may include a receive conditions component 1716 that is configured to receive, from the CU 1760, one or more resource conditions for using allocated resources of the semi-static resource allocation, e.g., as described in connection with 1608. The apparatus (e.g. the transmission component 1706) may include a transmit change request component 1718 that is configured to transmit a change request to the CU to modify the semi-static resource allocation (received by receive conditions component 1716), e.g., as described in connection with 1610. The apparatus may include an establish FD component 1720 that is configured to communicate with the second node 1750 based on the semi-static resource allocation and on the one or more resource conditions (received by receive conditions component 1716), e.g., as described in connection with 1614.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
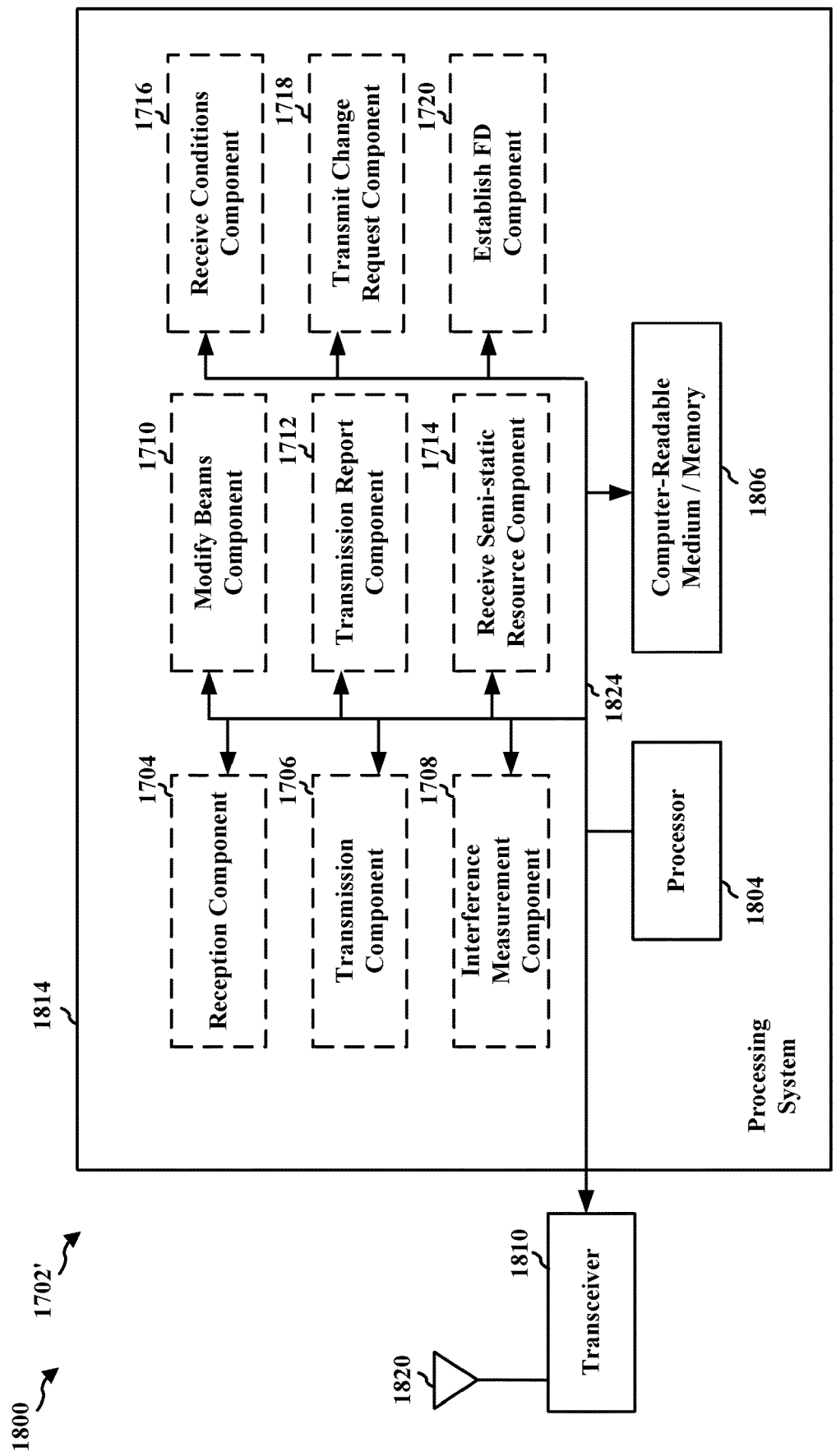
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, 1714, 1716, 1718, 1720 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712, 1714, 1716, 1718, 1720. The components may be software components running in the processor 1804, resident/stored in the computer readable medium/memory 1806, one or more hardware components coupled to the processor 1804, or some combination thereof. The processing system 1814 may be a component of an IAB node (e.g. IAB node 402) or the UE 350 and may include the memory 360 and/or at least one of the TX processor 368, the RX processor 356, and the controller/processor 359. Alternatively, the processing system 1814 may be the entire IAB node or UE (e.g., see 350 of FIG. 3).

In one configuration, the apparatus 1702/1702' for wireless communication includes means for receiving a semi-static resource allocation from a central unit (CU) based on at least one multiplexing capability of the first node; means for receiving, from the CU, one or more resource conditions for using allocated resources of the semi-static resource allocation; and means for communicating with a second node based on the semi-static resource allocation and the one or more resource conditions; wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and wherein the at least one multiplexing capability is with respect to one or more transmission direction combinations of the first node.

In one configuration, the apparatus 1702/1702' may include means for performing a local interference measurement of one or more beams for communicating with the second node; and wherein the report includes the local interference measurement.

In one configuration, the apparatus 1702/1702' may include means for modifying at least one of the transmission beam or the reception beam based on the local interference measurement.

In one configuration, the apparatus 1702/1702' may include means for transmitting a report to the CU, wherein the report may include the at least one multiplexing capability of the first node or may include at least one multiplexing capability condition for the at least one multiplexing capability of the first node, and wherein the semi-static resource allocation is received based on the report.

In one configuration, the apparatus 1702/1702' may include means for transmitting a change request to the CU to modify the semi-static resource allocation; wherein the at least one multiplexing capability is enabled based on the modified semi-static resource allocation.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 19:
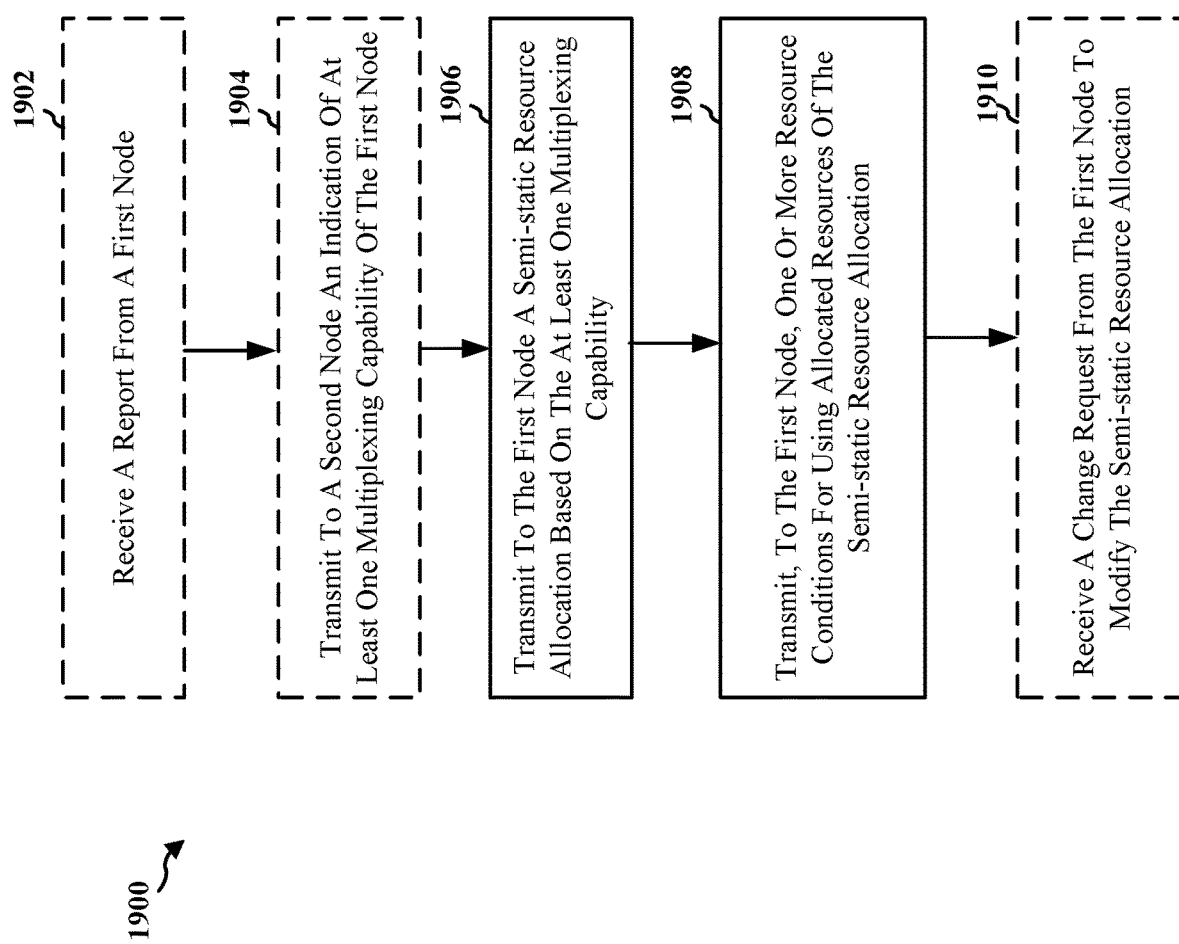
FIG. 19 is a flowchart of a method of wireless communication at a CU.

FIG. 19 is a flowchart 1900 of a method of wireless communication. The method may be performed by a central unit, such as an IAB node or base station (e.g., the base station 102/180, 310, the IAB node 402, 606, the central unit 706, 806; the apparatus 2002/2002'; the processing system 2114, which may include the memory 376 and which may be the entire central unit, IAB node or base station 310 or a component of the central unit, IAB node or base station 310, such as the TX processor 316, the RX processor 370, and/or the controller/processor 375). The central unit may communicate with a first node and a second node, such as an IAB node or UE. For example, the first node may be the parent node 702, 802, and the second node may be the child node 704, 804. Alternatively, the first node may be the child node 704, 804, and the second node may be the parent node 702, 802. Optional aspects are illustrated in dashed lines. The method allows the central unit to provide more efficient capability to the first node for communicating with the second node based on a multiplexing capability of the first node using, e.g., SDM.

At 1902, the central unit may receive a report from a first node, where the report includes at least one multiplexing capability of the first node or includes at least one multiplexing capability condition for the at least one multiplexing capability of the first node. For example, 1902 may be performed by receive report component 2008. For instance, referring to FIG. 8, the central unit 806 may receive a report 808, 810 respectively from a parent node 802 or a child node 804. The report may be received from a child node, a parent node, or both a child node and a parent node. In an aspect, reports from a child node may be optional. One or more of the reports may include, but are not limited to, beam/channel quality measurements, CLI measurements, RRM measurements, traffic/load report, SDM FD or SDM HD capability and SDM FD or SDM HD conditions, e.g. what pairs of beams or pairs of links may be transmitted using SDM, and any limitation on the link-budget (e.g., max TX or RX power). One or more of the reports may include a report of SI or cross-beam interference measurements.

At 1904, the central unit may transmit to a second node an indication of the at least one multiplexing capability or the at least one multiplexing capability condition. For example, 1904 may be performed by capability indication component 2010. For instance, referring to FIG. 8, when the CU 806 receives the report 810 from the child node 804, the CU may transmit to the parent node 802 an indication of the capability or conditions of the child node. The report 808 from the parent node 802 may similarly include SDM capability and/or conditions of the parent node, and the CU 806 may similarly transmit to the child node 804 an indication of the capability or conditions of the parent node.

At 1906, the central unit transmits to the first node a semi-static resource allocation based on at least one multiplexing capability of the first node for communication of the first node with a second node. The semi-static resource allocation may be transmitted based on the report received at 1902. The at least one multiplexing capability comprises at least one of SDM or FDM, and the SDM includes at least one of SDM FD or SDM HD. For example, 1906 may be performed by transmit semi-static resource component 2012. For instance, referring to FIG. 8, the central unit 806 may transmit a semi-static resource allocation 812 to one or more nodes including the parent node 802 or child node 804 to use for communicating using SDM in response to receiving report 808 and/or 810. The one or more nodes may be one or more child nodes 804 and/or one or more parent nodes 802. The semi-static resources may include, but are not limited to allocation information for time-domain resources.

The at least one multiplexing capability is also with respect to one or more transmission direction combinations of the first node. For example, the first node may include a MT and a DU, and the one or more transmission direction combinations may comprise at least one of MT transmission and DU transmission, MT transmission and DU reception, MT reception and DU transmission, or MT reception and DU reception. For instance, referring to FIG. 8, the report 808, 810 may indicate SDM or FDM capability of the parent node or child node with respect to transmission-direction combinations including MT-TX/DU-TX (the MT transmits while the DU transmits), MT-TX/DU-RX (the MT transmits while the DU receives), MT-RX/DU-TX (the MT receives while the DU transmits), and MT-RX/DU-RX (the MT receives while the DU receives).

The at least one multiplexing capability condition may comprise at least one of: one or more beams to be used for SDM; or a link budget of the first node. For example, referring to FIG. 8, if the SDM capability is conditional, the report 810 to the CU may include the SDM FD or SDM HD conditions of the child node (e.g. beams that may be used for SDM, link budget requirements, the links or beam pairs available for SDM, and/or the physical channels available for SDM).

At 1908, the central unit transmits, to the first node, one or more resource conditions for using allocated resources of the semi-static resource allocation. The communication of the first node with the second node is based on the one or more resource conditions. For example, 1908 may be performed by transmit conditions component 2014. For instance, referring to FIG. 8, the central unit 806 may transmit conditions 814 for use of resources to one or more nodes. The one or more nodes may be one or more child nodes 804 and/or one or more parent nodes 802. At least one of the semi-static resource allocation 812 or the conditions 814 for use of resources may be based on the report 808, 810.

The one or more resource conditions may indicate whether the allocated resources are conditional or unconditional for communication of the first node with the second node. For instance, referring to FIG. 8, the conditions 814 may indicate whether a set of allocated time-domain resources may be used unconditionally or not for SDM Full-duplex or Half-duplex operation. Conditions 814 may include the directional conditions (D/U/F) described above, as well as additional conditions for conditional use. For example, in a case of conditional use, the CU 806 may further indicate as conditions 814 various constraints such as those on modulation coding scheme (MCS, e.g. the maximum MCS used over the allocated resources), transmit (Tx) power (e.g. the maximum Tx power that may be used), receive (Rx) power (e.g. the maximum Rx power that may be used), TX/RX beam(s) that may be used (e.g. the subset of beams or beam pairs/links that may be used), frequency-domain resources (e.g. the limited RBs that may be used over an indicated set of time domain resources in the semi-static resource allocation), reference signal configuration/resources (e.g. the specific tones or resources that DMRS or another reference signal may be transmitted), and timing reference (e.g. the Tx/Rx timing to be used for alignment with other simultaneous communications).

In one example, the first node may be a parent node and the second node may be a child node, and the one or more resource conditions may identify at least one expected behavior of the parent node with respect to the allocated resources for communicating with the child node. The allocated resources may comprise one of hard resources or soft resources. For instance, referring to FIG. 8, semi-static resource allocation 812 and/or conditions 814 may identify an expected behavior of the parent node 802 as an alternative to aforementioned conflict resolution rules. For example, if the resource allocation for a same set of resources is (HARD H HARD), the conditions 814 may indicate to the parent node 802 an expected behavior not to yield the resources for use by its children when the child node 804 has HD or FD capability. In another example, the conditions 814 may indicate to the parent node an expected behavior not to refrain from using released soft resources when communicating with the child node.

In another example, the first node may be a child node and the second node may be a parent node, and the one or more resource conditions may identify at least one expected behavior of the child node with respect to the allocated resources for communicating with the parent node. For instance, referring to FIG. 8, the conditions 814 may indicate to the child node 804 an expected behavior not to refrain from using unreleased (or reclaimed) soft resources when communicating with its own child nodes or the parent node 802.

Finally, at 1910, the central unit may receive a change request from the first node to modify the semi-static resource allocation. The at least one multiplexing capability may be enabled for the first node based on the modified semi-static resource allocation. For example, 1910 may be performed by receive change request component 2016. For instance, referring to FIG. 8, the central unit 806 may receive a change request 816, 818 respectively from the parent node 802 or child node 804 to modify at least one of the semi-static resource allocation 812 or the conditions 814 for use of resources. The change request may be received from a child node, a parent node, or both a child node and a parent node. In an aspect, the change request may include a request to enable or disable at least one of SDM FD or SDM HD.

Figure 20:
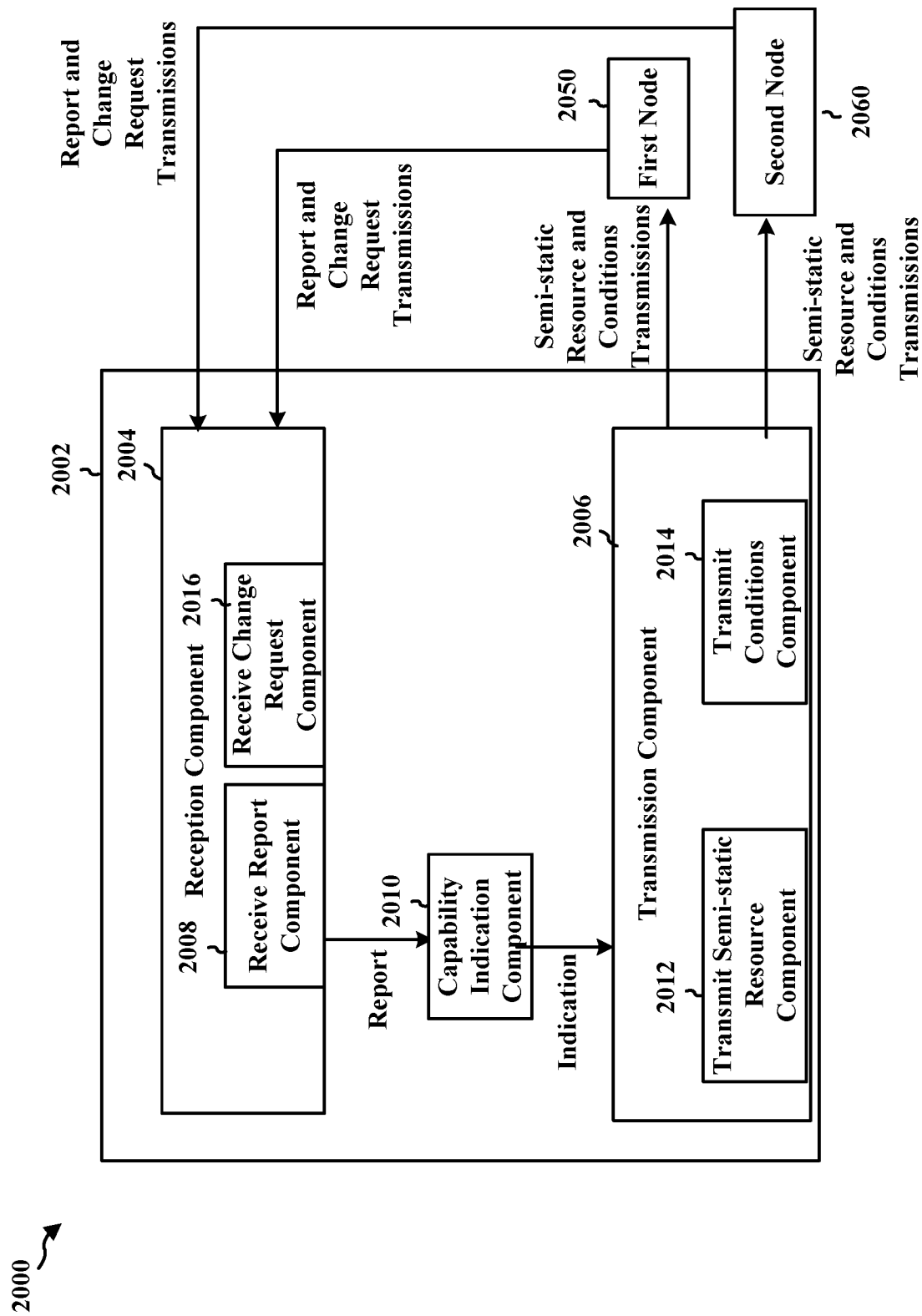
FIG. 20 is a conceptual data flow diagram illustrating the data flow between different means/components in an example apparatus.

FIG. 20 is a conceptual data flow diagram 2000 illustrating the data flow between different means/components in an example apparatus 2002. The apparatus may be a CU (e.g. CU 806) in communication with a first node 2050 and a second node 2060. The first node may be, e.g., parent node 802, and the second node may be, e.g., child node 804. Alternatively, the first node may be, e.g., child node 804, and the second node may be, e.g., parent node 802.

The apparatus 2002 includes a reception component 2004 that is configured to receive communications from the first node 2050 and second node 2060. For example, the reception component may receive reports and change requests from the first node and the second node. The apparatus also includes a transmission component 2006 that is configured to transmit communications to the first node and the second node. For example, the transmission component may transmit semi-static resource allocations and resource conditions to the first node and the second node.

The apparatus 2002 (e.g. the reception component 2004) includes a receive report component 2008 that is configured to receive a report from a first node, where the report includes at least one multiplexing capability of the first node or includes at least one multiplexing capability condition for the at least one multiplexing capability of the first node, e.g., as described in connection with 1902. The apparatus may include a capability indication component 2010 that is configured to transmit to a second node an indication of the at least one multiplexing capability or the at least one multiplexing capability condition (based on the report from receive report component 2008), e.g., as described in connection with 1904. The apparatus includes a transmit semi-static resource component 2012 that is configured to transmit to the first node a semi-static resource allocation based on the at least one multiplexing capability for communication of the first node with a second node, e.g., as described in connection with 1906. The semi-static resource allocation may also be transmitted based on the report from receive report component 2008. The apparatus may include a transmit conditions component 2014 that is configured to transmit, to the first node, one or more resource conditions for using allocated resources of the semi-static resource allocation, e.g., as described in connection with 1908. The apparatus may include a receive change request component 2016 that is configured to receive a change request from the first node to modify the semi-static resource allocation, e.g., as described in connection with 1910.

The apparatus may include additional components that perform each of the blocks of the algorithm in the aforementioned flowchart of FIG. 19. As such, each block in the aforementioned flowchart of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
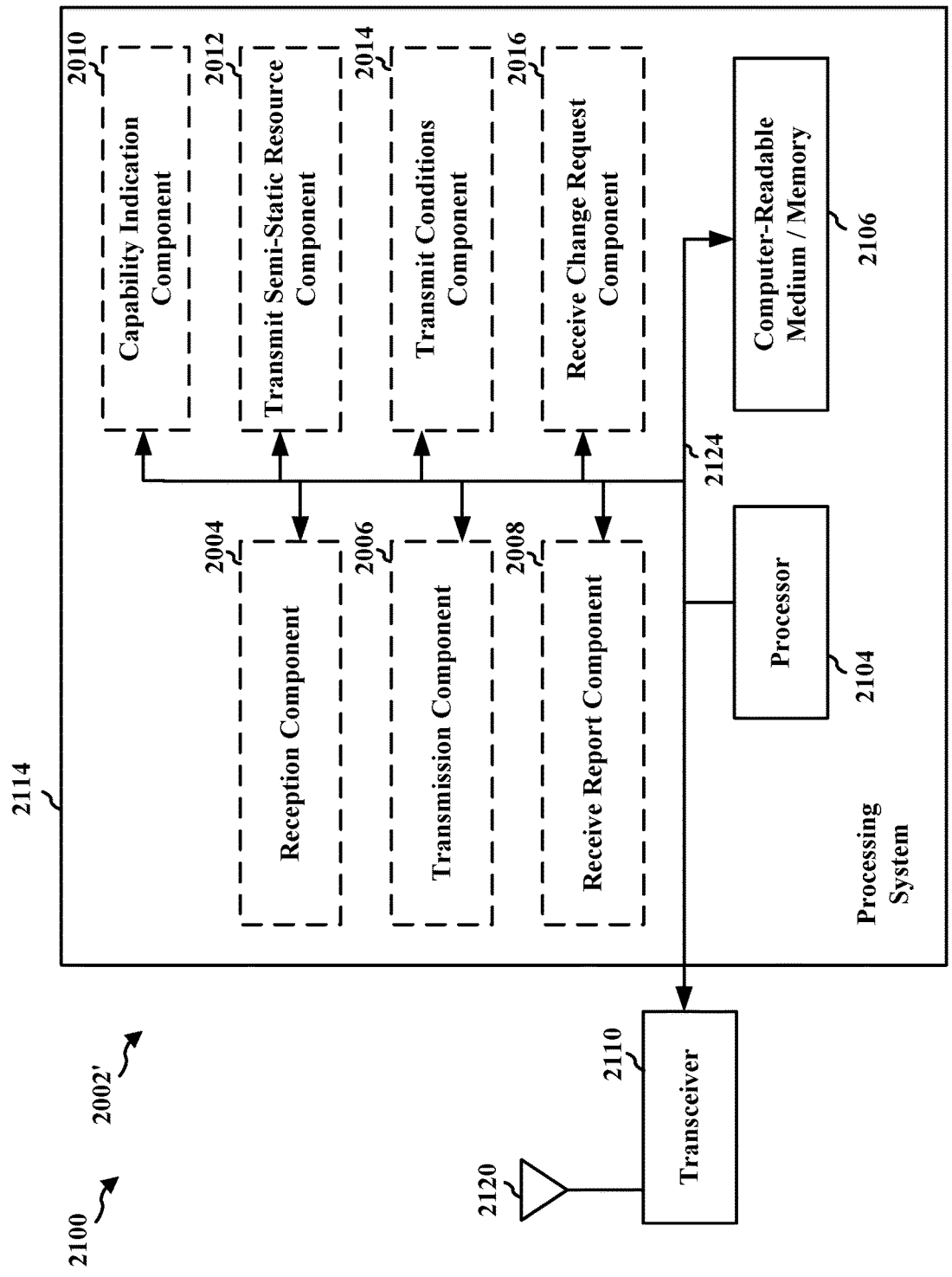
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006, 2008, 2010, 2012, 2014, 2016 and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2006, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006, 2008, 2010, 2012, 2014, 2016. The components may be software components running in the processor 2104, resident/stored in the computer readable medium/memory 2106, one or more hardware components coupled to the processor 2104, or some combination thereof. The processing system 2114 may be a component of a CU (e.g. CU 706, 806 of an IAB node 606) or the base station 310 and may include the memory 376 and/or at least one of the TX processor 316, the RX processor 370, and the controller/processor 375. Alternatively, the processing system 2114 may be the entire CU, IAB node, or base station (e.g., see 310 of FIG. 3).

In one configuration, the apparatus 2002/2002' for wireless communication includes means for transmitting to the first node a semi-static resource allocation based on at least one multiplexing capability of the first node for communication of the first node with a second node; and means for transmitting, to the first node, one or more resource conditions for using allocated resources of the semi-static resource allocation; wherein the communication of the first node with the second node is based on the one or more resource conditions; wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and wherein the at least one multiplexing capability is with respect to one or more transmission direction combinations of the first node.

In one configuration, the apparatus 2002/2002' may include means for transmitting to the second node an indication of the at least one multiplexing capability.

In one configuration, the apparatus 2002/2002' may include means for receiving a report from a first node, wherein the report includes the at least one multiplexing capability of the first node or includes at least one multiplexing capability condition for the at least one multiplexing capability of the first node, and wherein the semi-static resource allocation may be transmitted based on the report.

In one configuration, the apparatus 2002/2002' may include means for receiving a change request from the first node to modify the semi-static resource allocation; wherein the at least one multiplexing capability is enabled for the first node based on the modified semi-static resource allocation.

The aforementioned means may be one or more of the aforementioned components of the apparatus 2002 and/or the processing system 2114 of the apparatus 2002' configured to perform the functions recited by the aforementioned means. As described supra, the processing system 2114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 22:
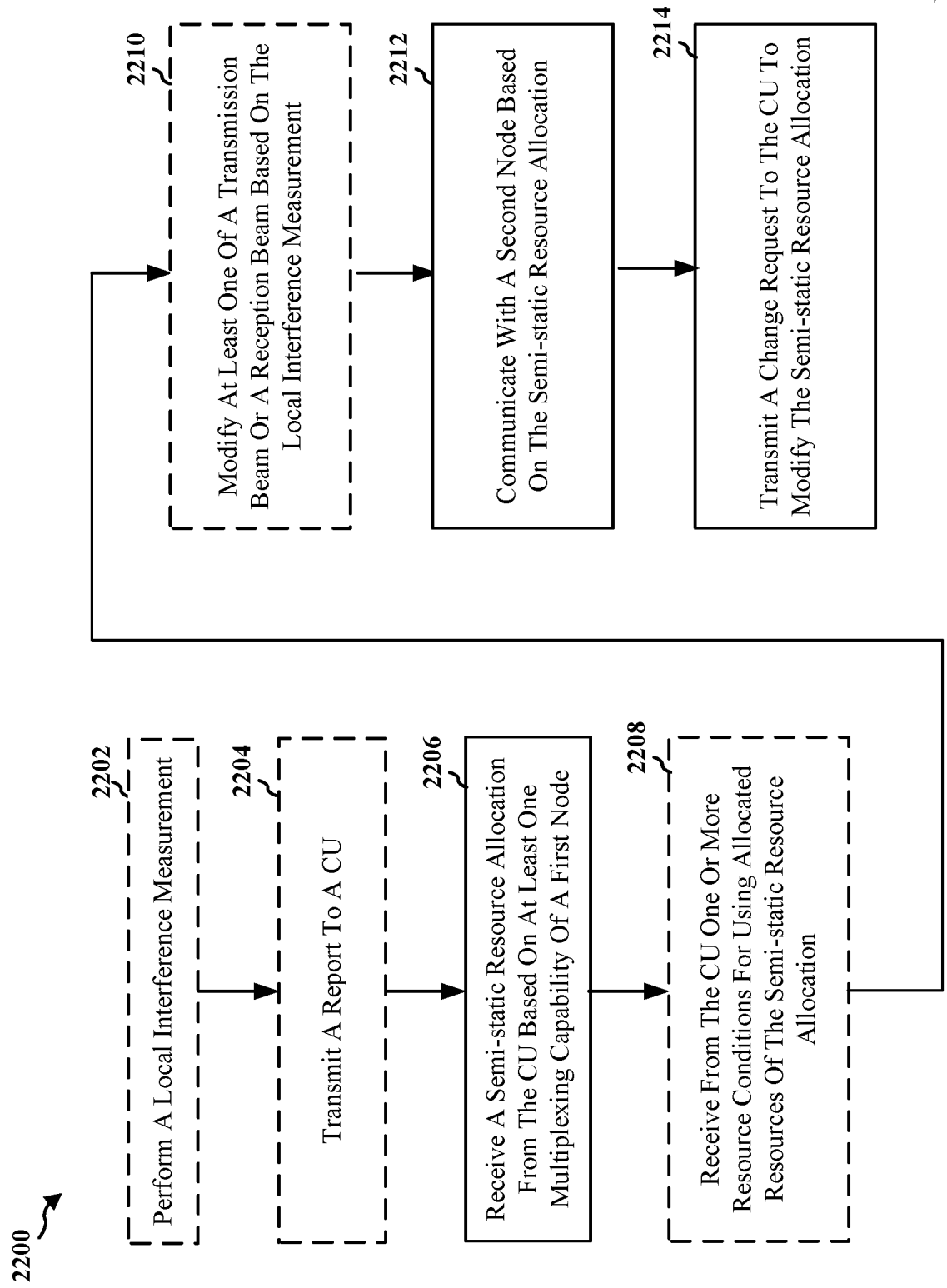
FIG. 22 is a flowchart of a method of wireless communication at a first node.

FIG. 22 is a flowchart 2200 of a method of wireless communication. The method may be performed by a first node, such as an IAB node or UE (e.g., the UE 104, 350, 514, the IAB node 402, 414, 416, 424, 426, 434, 436, 501, 503, 506, 506, 510, 512, 516, 520, 605, 902, 906, the parent node 702, 802, the child node 704, 804; the apparatus 2302/2302'; the processing system 2414, which may include the memory 360 and which may be the entire IAB node or UE 350 or a component of the IAB node or UE 350, such as the TX processor 368, the RX processor 356, and/or the controller/processor 359). The first node may communicate with a second node, such as another IAB node or UE. For example, the first node may be the parent node 702, 802, and the second node may be the child node 704, 804. Alternatively, the first node may be the child node 704, 804, and the second node may be the parent node 702, 802. Optional aspects are illustrated in dashed lines. The method allows the first node to perform more efficient communication with the second node based on a multiplexing capability of the first node using, e.g., SDM.

At 2202, the first node may perform a local interference measurement of one or more beams for communicating with the second node. For example, 2202 may be performed by interference measurement component 2308. For instance, referring to FIG. 8, a child node 804 may perform a local interference measurement 805. For example, the child node 804 may perform one or more of a self-interference measurement or a cross-beam interference measurement. Performing an interference measurement may include receiving a signal and determining the interference measurement based on the received signal.

At 2204, the first node may transmit a report to a CU, where the report includes at least one multiplexing capability of the first node or includes at least one multiplexing capability condition for the at least one multiplexing capability of the first node. For example, 2204 may be performed by transmission report component 2312. The at least one multiplexing capability comprises at least one of SDM or FDM, and the SDM includes at least one of SDM FD or SDM HD. For instance, referring to FIG. 8, the parent node 802 or the child node 804 may respectively transmit a report 808, 810 including a SDM FD or HD capability or conditions to a central unit 806. The report may be transmitted by a child node, a parent node, or both a child node and a parent node. In an aspect, reports transmitted by a child node may be optional.

The report may also include the local interference measurement. One or more of the reports may include, but are not limited to beam/channel quality measurements, CLI measurements, RRM measurements, traffic/load report, SDM FD or SDM HD capability and SDM FD or SDM HD conditions, e.g. what pairs of beams or pairs of links may be transmitted using an SDM associated with them, and when there may be any limitation on the link-budget (e.g., max TX or RX power). One or more of the reports may include a report of SI or cross-beam interference measurements.

The at least one multiplexing capability is also with respect to one or more transmission direction combinations of the first node. For example, the first node may include a MT and a DU, and the one or more transmission direction combinations may comprise at least one of MT transmission and DU transmission, MT transmission and DU reception, MT reception and DU transmission, or MT reception and DU reception. For instance, referring to FIG. 8, the report 808, 810 may indicate SDM or FDM capability of the parent node or child node with respect to transmission-direction combinations including MT-TX/DU-TX (the MT transmits while the DU transmits), MT-TX/DU-RX (the MT transmits while the DU receives), MT-RX/DU-TX (the MT receives while the DU transmits), and MT-RX/DU-RX (the MT receives while the DU receives).

In one example, the at least one multiplexing capability may be for SDM FD, and the one or more beams may comprise a transmission beam and a reception beam of the first node. For instance, referring to FIG. 8, for SDM (FD) operation, the child node 804 may measure self-interference for different combinations of TX/RX beams.

In another example, the at least one multiplexing capability may be for SDM HD, and the one or more beams may comprise a plurality of transmission beams of the first node or a plurality of reception beams of the first node. For instance, referring to FIG. 8, for SDM (HD) operation, the child node 804 may measure cross-beam interference, in which a transmission (or reception) over one beam of the child node may interfere with a transmission (or reception) over another beam of the child node.

The at least one multiplexing capability condition may comprise at least one of: one or more beams to be used for SDM; or a link budget of the first node. For example, referring to FIG. 8, if the SDM capability is conditional, the report 810 to the CU may include the SDM FD or SDM HD conditions of the child node (e.g. beams that may be used for SDM, link budget requirements, the links or beam pairs available for SDM, and/or the physical channels available for SDM).

At 2206, the first node receives a semi-static resource allocation from the CU based on the at least one multiplexing capability of the first node. For example, 2206 may be performed by receive semi-static resource component 2314. The semi-static resource allocation may also be received based on the report transmitted at 2204. For instance, referring to FIG. 8, the parent node 802 or the child node 804 may receive a semi-static resource allocation 812 from the central unit 806 for communicating with each other using SDM in response to report 808 and/or 810.

At 2208, the first node may receive, from the CU, one or more resource conditions for using allocated resources of the semi-static resource allocation. For example, 2208 may be performed by receive conditions component 2316. For instance, referring to FIG. 8, the parent node 802 or the child node 804 may receive conditions 814 for use of resources from the central unit 806. The conditions may be received by one or more nodes. The one or more nodes may be one or more child nodes and/or one or more parent nodes. At least one of the semi-static resource allocation or the conditions for use of resources may be based on the report.

The one or more resource conditions may indicate whether the allocated resources are conditional or unconditional for communicating with the second node. For instance, referring to FIG. 8, the conditions 814 may indicate whether a set of allocated time-domain resources may be used unconditionally or not for SDM Full-duplex or Half-duplex operation. Conditions 814 may include the directional conditions (D/U/F) described above, as well as additional conditions for conditional use. For example, in a case of conditional use, the CU 806 may further indicate as conditions 814 various constraints such as those on modulation coding scheme (MCS, e.g. the maximum MCS used over the allocated resources), transmit (Tx) power (e.g. the maximum Tx power that may be used), receive (Rx) power (e.g. the maximum Rx power that may be used), TX/RX beam(s) that may be used (e.g. the subset of beams or beam pairs/links that may be used), frequency-domain resources (e.g. the limited RBs that may be used over an indicated set of time domain resources in the semi-static resource allocation), reference signal configuration/resources (e.g. the specific tones or resources that DMRS or another reference signal may be transmitted), and timing reference (e.g. the Tx/Rx timing to be used for alignment with other simultaneous communications).

In one example, the first node may be a parent node and the second node may be a child node, and the one or more resource conditions may identify at least one expected behavior of the parent node with respect to the allocated resources for communicating with the child node. The allocated resources may comprise one of hard resources or soft resources. For instance, referring to FIG. 8, semi-static resource allocation 812 and/or conditions 814 may identify an expected behavior of the parent node 802 as an alternative to aforementioned conflict resolution rules. For example, if the resource allocation for a same set of resources is (HARD H HARD), the conditions 814 may indicate to the parent node 802 an expected behavior not to yield the resources for use by its children when the child node 804 has HD or FD capability. In another example, the conditions 814 may indicate to the parent node an expected behavior not to refrain from using released soft resources when communicating with the child node.

In another example, the first node may be a child node and the second node may be a parent node, and the one or more resource conditions may identify at least one expected behavior of the child node with respect to the allocated resources for communicating with the parent node. For instance, referring to FIG. 8, the conditions 814 may indicate to the child node 804 an expected behavior not to refrain from using unreleased (or reclaimed) soft resources when communicating with its own child nodes or the parent node 802.

At 2210, the first node may modify at least one of a transmission beam or a reception beam based on the local interference measurement. For example, 2210 may be performed by a modify beams component 2310. For instance, referring to FIG. 8, the parent node 802 or the child node 804 may modify, at 820 and 822 respectively, at least one of a transmit or a receive beam based on at least one of the semi-static resource allocation 812 or the conditions 814 for use of resources, where the semi-static resource allocation 812 or the conditions 814 may be indicated based on the report 810 sent to the CU 806 including the local interference measurement 805. For example, the parent node 802 or the child node 804 may modify beams by processing at least one of the semi-static resource allocation or the conditions for use of resources to determine a modification and implementing the modification to the at least one of a transmit or a receive beam.

At 2212, the first node communicates with a second node based on the semi-static resource allocation. The communication with the second node may also be based on the one or more resource conditions. For example, 2212 may be performed by establish FD component 2320. For instance, referring to FIG. 8, the parent node 802 or the child node 804 may establish a FD connection and communicate with each other at 824 or 826 using at least one of a hard resource or a soft resource based on at least one of the semi-static resource allocation 812 or the conditions 814 for use of resources received based on the report 810 to the CU 806.

Finally, at 2214, the first node transmits a change request to the CU to modify the semi-static resource allocation. For example, 2214 may be performed by transmit change request component 2318. For instance, referring to FIG. 8, the parent node 802 or the child node 804 may respectively transmit a change request 816, 818 to the CU 806 to modify at least one of the semi-static resource allocation 812 or the conditions 814 for use of resources. In an aspect, the change request may include a request to enable or disable at least one of SDM FD or SDM HD. The parent node and child node may subsequently communicate using the modified semi-static resource allocation (e.g. at 824 or 826).

Figure 23:
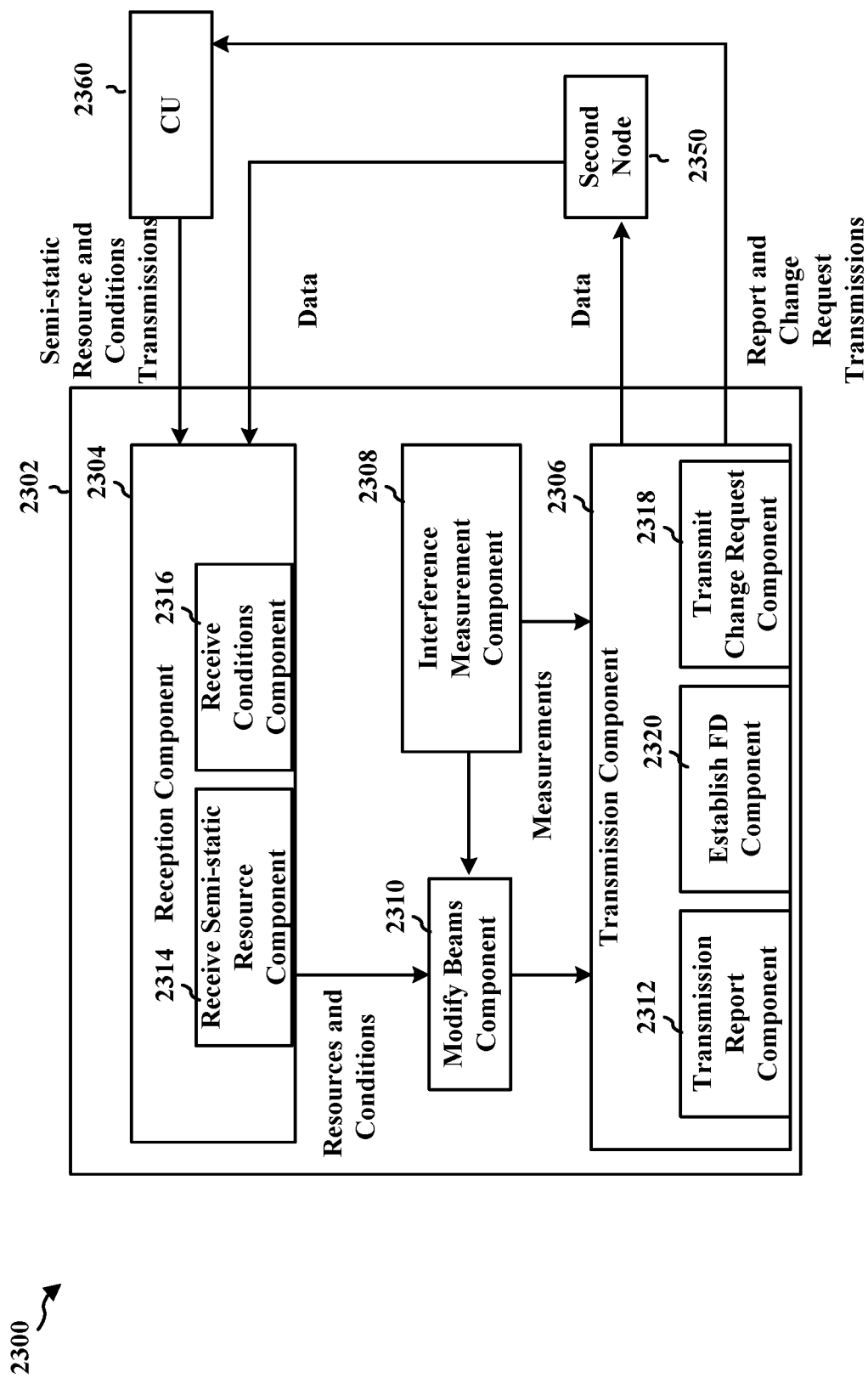
FIG. 23 is a conceptual data flow diagram illustrating the data flow between different means/components in an example apparatus.

FIG. 23 is a conceptual data flow diagram 2300 illustrating the data flow between different means/components in an example apparatus 2302. The apparatus may be a first node in communication with a second node 2350 and a CU 2360 (e.g. CU 806). The apparatus may be, e.g., parent node 802, and the second node may be, e.g., child node 804. Alternatively, the apparatus may be, e.g., child node 804, and the second node may be, e.g., parent node 802.

The apparatus 2302 includes a reception component 2304 that is configured to receive communications from the second node 2350 and CU 2360. For example, the reception component may receive semi-static resource allocations from the CU and data from the second node. The apparatus also includes a transmission component 2306 that is configured to transmit communications to the second node and CU. For example, the transmission component may transmit reports to the CU and data to the second node.

The apparatus 2302 may include an interference measurement component 2308 that is configured to perform a local interference measurement of one or more beams for communicating with the second node, e.g., as described in connection with 2202. The apparatus may include a modify beams component 2310 that is configured to modify at least one of a transmission beam or a reception beam based on the local interference measurement, e.g., as described in connection with 2210. The apparatus (e.g. the transmission component 2306) may include a transmission report component 2312 that is configured to transmit a report to the CU, where the report includes at least one multiplexing capability of the first node or includes at least one multiplexing capability condition for the at least one multiplexing capability of the first node, e.g., as described in connection with 2204. The apparatus (e.g. the reception component 2304) may include a receive semi-static resource component 2314 that is configured to receive a semi-static resource allocation from the CU based on the at least one multiplexing capability (e.g. included in the report from transmission report component 1112), e.g., as described in connection with 2206.

The apparatus 2302 (e.g. the reception component 2304) may include a receive conditions component 2316 that is configured to receive, from the CU 2360, one or more resource conditions for using allocated resources of the semi-static resource allocation, e.g., as described in connection with 2208. The apparatus (e.g. the transmission component 2306) may include a transmit change request component 2318 that is configured to transmit a change request to the CU to modify the semi-static resource allocation (received by receive conditions component 2316), e.g., as described in connection with 2214. The apparatus may include an establish FD component 2320 that is configured to communicate with the second node 2350 based on the semi-static resource allocation and on the one or more resource conditions (received by receive conditions component 2316), e.g., as described in connection with 2212.

The apparatus may include additional components that perform each of the blocks of the algorithm in the aforementioned flowchart of FIG. 22. As such, each block in the aforementioned flowchart of FIG. 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 24:
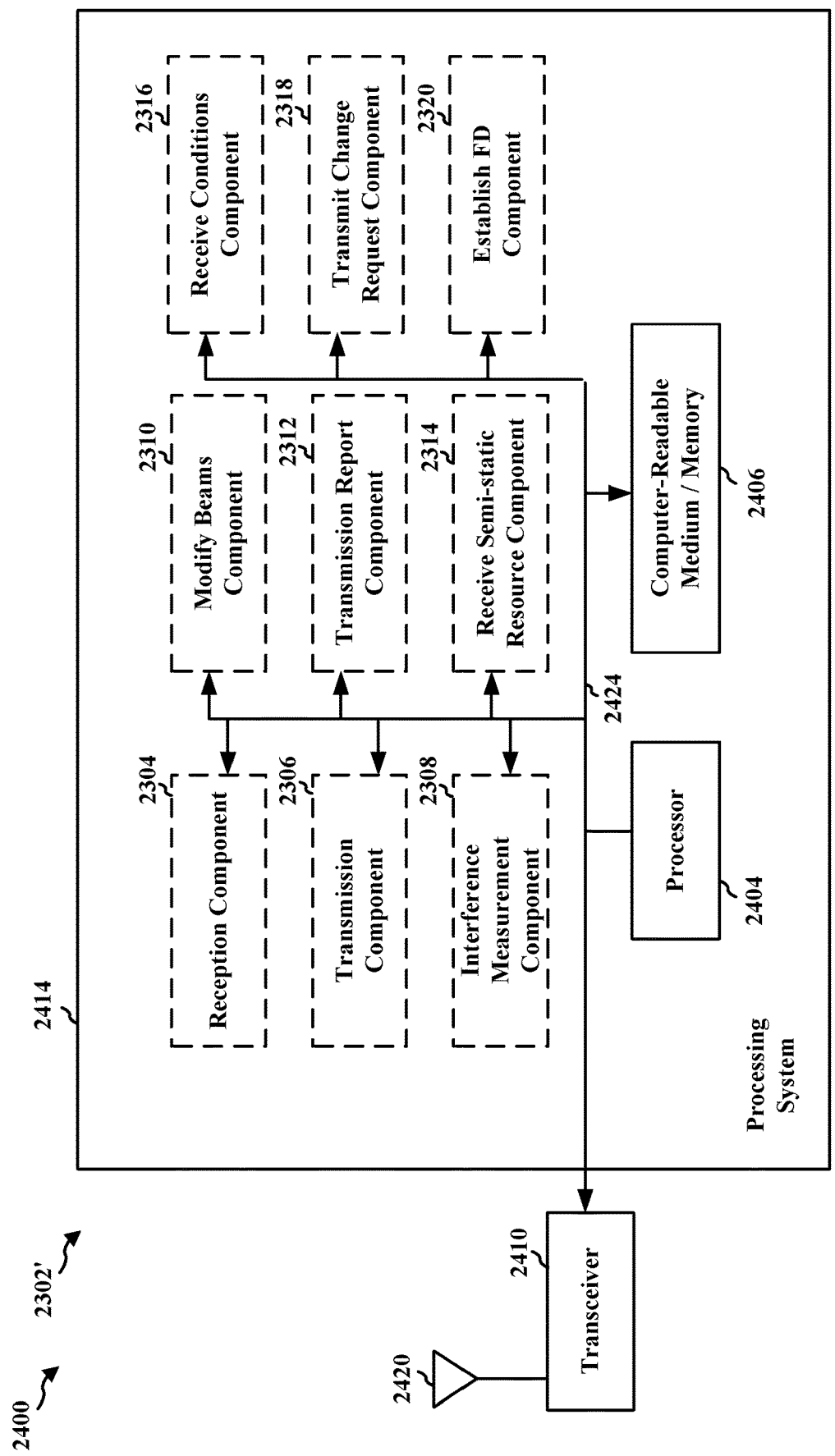
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware components, represented by the processor 2404, the components 2304, 2306, 2308, 2310, 2312, 2314, 2316, 2318, 2320 and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception component 2304. In addition, the transceiver 2410 receives information from the processing system 2414, specifically the transmission component 2306, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described supra for any particular apparatus. The computer-readable medium/memory 2406 may also be used for storing data that is manipulated by the processor 2404 when executing software. The processing system 2414 further includes at least one of the components 2304, 2306, 2308, 2310, 2312, 2314, 2316, 2318, 2320. The components may be software components running in the processor 2404, resident/stored in the computer readable medium/memory 2406, one or more hardware components coupled to the processor 2404, or some combination thereof. The processing system 2414 may be a component of an IAB node (e.g. IAB node 402) or the UE 350 and may include the memory 360 and/or at least one of the TX processor 368, the RX processor 356, and the controller/processor 359. Alternatively, the processing system 2414 may be the entire IAB node or UE (e.g., see 350 of FIG. 3).

In one configuration, the apparatus 2302/2302' for wireless communication includes means for receiving a semi-static resource allocation from a central unit (CU) based on at least one multiplexing capability of the first node; means for communicating with a second node based on the semi-static resource allocation; and means for transmitting a change request to the CU to modify the semi-static resource allocation; wherein the at least one multiplexing capability is enabled based on the modified semi-static resource allocation; wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and wherein the at least one multiplexing capability is with respect to one or more transmission direction combinations of the first node.

In one configuration, the apparatus 2302/2302' may include means for performing a local interference measurement of one or more beams for communicating with the second node; and wherein the report includes the local interference measurement.

In one configuration, the apparatus 2302/2302' may include means for modifying at least one of the transmission beam or the reception beam based on the local interference measurement.

In one configuration, the apparatus 2302/2302' may include means for transmitting a report to the CU, wherein the report may include the at least one multiplexing capability of the first node or may include at least one multiplexing capability condition for the at least one multiplexing capability of the first node, and wherein the semi-static resource allocation is received based on the report.

In one configuration, the apparatus 2302/2302' may include means for receiving, from the CU, one or more resource conditions for using allocated resources of the semi-static resource allocation; wherein the communicating with the second node may be based on the one or more resource conditions.

The aforementioned means may be one or more of the aforementioned components of the apparatus 2302 and/or the processing system 2414 of the apparatus 2302' configured to perform the functions recited by the aforementioned means. As described supra, the processing system 2414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 25:
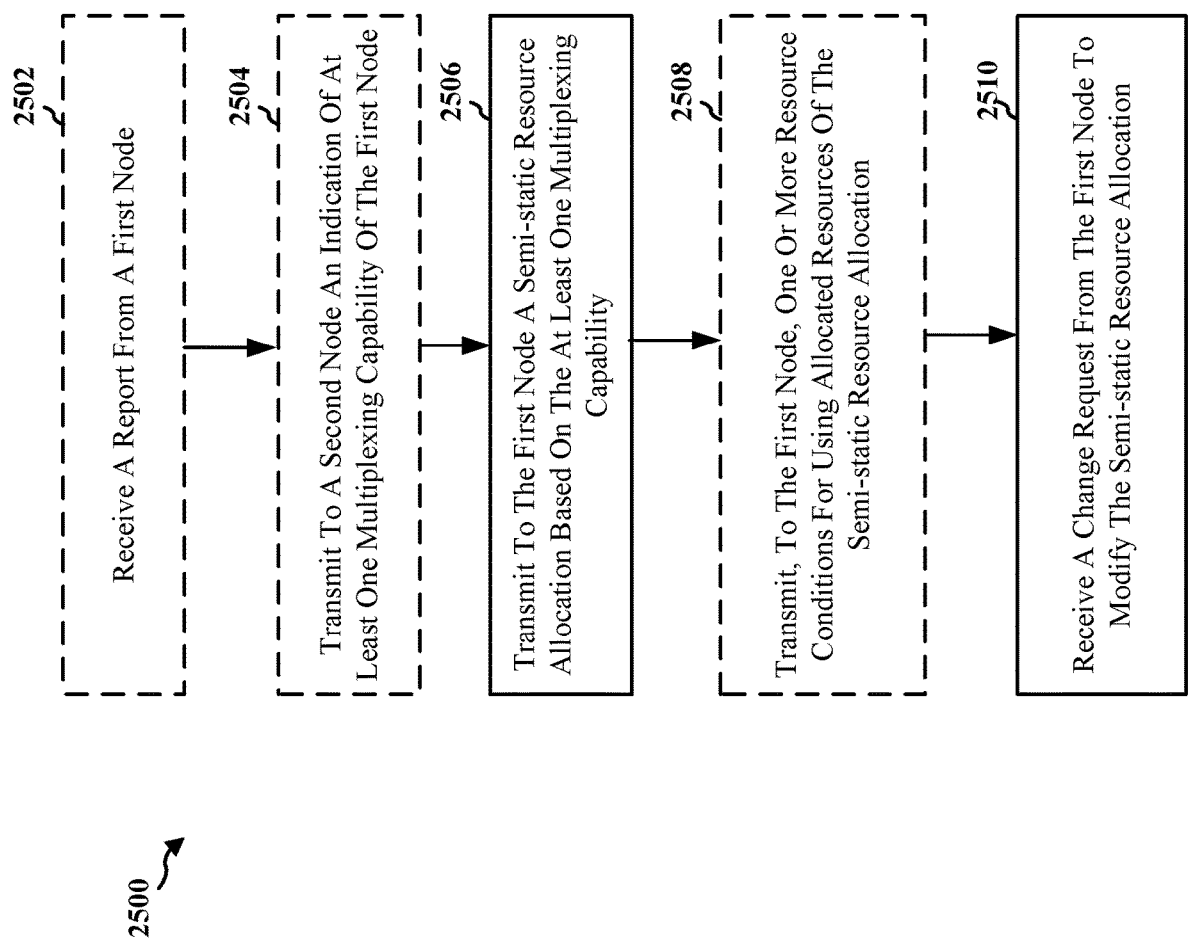
FIG. 25 is a flowchart of a method of wireless communication at a CU.

FIG. 25 is a flowchart 2500 of a method of wireless communication. The method may be performed by a central unit, such as an IAB node or base station (e.g., the base station 102/180, 310, the IAB node 402, 606, the central unit 706, 806; the apparatus 2602/2602'; the processing system 2714, which may include the memory 376 and which may be the entire central unit, IAB node or base station 310 or a component of the central unit, IAB node or base station 310, such as the TX processor 316, the RX processor 370, and/or the controller/processor 375). The central unit may communicate with a first node and a second node, such as an IAB node or UE. For example, the first node may be the parent node 702, 802, and the second node may be the child node 704, 804. Alternatively, the first node may be the child node 704, 804, and the second node may be the parent node 702, 802. Optional aspects are illustrated in dashed lines. The method allows the central unit to provide more efficient capability to the first node for communicating with the second node based on a multiplexing capability of the first node using, e.g., SDM.

At 2502, the central unit may receive a report from a first node, where the report may include at least one multiplexing capability of the first node or may include at least one multiplexing capability condition for the at least one multiplexing capability of the first node. For example, 2502 may be performed by receive report component 2608. For instance, referring to FIG. 8, the central unit 806 may receive a report 808, 810 respectively from a parent node 802 or a child node 804. The report may be received from a child node, a parent node, or both a child node and a parent node. In an aspect, reports from a child node may be optional. One or more of the reports may include, but are not limited to, beam/channel quality measurements, CLI measurements, RRM measurements, traffic/load report, SDM FD or SDM HD capability and SDM FD or SDM HD conditions, e.g. what pairs of beams or pairs of links may be transmitted using SDM, and any limitation on the link-budget (e.g., max TX or RX power). One or more of the reports may include a report of SI or cross-beam interference measurements.

At 2504, the central unit may transmit to a second node an indication of the at least one multiplexing capability. For example, 2504 may be performed by capability indication component 2610. For instance, referring to FIG. 8, when the CU 806 receives the report 810 from the child node 804, the CU may transmit to the parent node 802 an indication of the capability or conditions of the child node. The report 808 from the parent node 802 may similarly include SDM capability and/or conditions of the parent node, and the CU 806 may similarly transmit to the child node 804 an indication of the capability or conditions of the parent node.

At 2506, the central unit transmits to the first node a semi-static resource allocation based on at least one multiplexing capability of the first node for communication of the first node with a second node. The semi-static resource allocation may be transmitted based on the report received at 2502. The at least one multiplexing capability comprises at least one of SDM or FDM, and the SDM includes at least one of SDM FD or SDM HD. For example, 2506 may be performed by transmit semi-static resource component 2612. For instance, referring to FIG. 8, the central unit 806 may transmit a semi-static resource allocation 812 to one or more nodes including the parent node 802 or child node 804 to use for communicating using SDM in response to receiving report 808 and/or 810. The one or more nodes may be one or more child nodes 804 and/or one or more parent nodes 802. The semi-static resources may include, but are not limited to allocation information for time-domain resources.

The at least one multiplexing capability is also with respect to one or more transmission direction combinations of the first node. For example, the first node may include a MT and a DU, and the one or more transmission direction combinations may comprise at least one of MT transmission and DU transmission, MT transmission and DU reception, MT reception and DU transmission, or MT reception and DU reception. For instance, referring to FIG. 8, the report 808, 810 may indicate SDM or FDM capability of the parent node or child node with respect to transmission-direction combinations including MT-TX/DU-TX (the MT transmits while the DU transmits), MT-TX/DU-RX (the MT transmits while the DU receives), MT-RX/DU-TX (the MT receives while the DU transmits), and MT-RX/DU-RX (the MT receives while the DU receives).

The at least one multiplexing capability condition may comprise at least one of: one or more beams to be used for SDM; or a link budget of the first node. For example, referring to FIG. 8, if the SDM capability is conditional, the report 810 to the CU may include the SDM FD or SDM HD conditions of the child node (e.g. beams that may be used for SDM, link budget requirements, the links or beam pairs available for SDM, and/or the physical channels available for SDM).

At 2508, the central unit may transmit, to the first node, one or more resource conditions for using allocated resources of the semi-static resource allocation. The communication of the first node with the second node may be based on the one or more resource conditions. For example, 2508 may be performed by transmit conditions component 2614. For instance, referring to FIG. 8, the central unit 806 may transmit conditions 814 for use of resources to one or more nodes. The one or more nodes may be one or more child nodes 804 and/or one or more parent nodes 802. At least one of the semi-static resource allocation 812 or the conditions 814 for use of resources may be based on the report 808, 810.

The one or more resource conditions may indicate whether the allocated resources are conditional or unconditional for communication of the first node with the second node. For instance, referring to FIG. 8, the conditions 814 may indicate whether a set of allocated time-domain resources may be used unconditionally or not for SDM Full-duplex or Half-duplex operation. Conditions 814 may include the directional conditions (D/U/F) described above, as well as additional conditions for conditional use. For example, in a case of conditional use, the CU 806 may further indicate as conditions 814 various constraints such as those on modulation coding scheme (MCS, e.g. the maximum MCS used over the allocated resources), transmit (Tx) power (e.g. the maximum Tx power that may be used), receive (Rx) power (e.g. the maximum Rx power that may be used), TX/RX beam(s) that may be used (e.g. the subset of beams or beam pairs/links that may be used), frequency-domain resources (e.g. the limited RBs that may be used over an indicated set of time domain resources in the semi-static resource allocation), reference signal configuration/resources (e.g. the specific tones or resources that DMRS or another reference signal may be transmitted), and timing reference (e.g. the Tx/Rx timing to be used for alignment with other simultaneous communications).

In one example, the first node may be a parent node and the second node may be a child node, and the one or more resource conditions may identify at least one expected behavior of the parent node with respect to the allocated resources for communicating with the child node. The allocated resources may comprise one of hard resources or soft resources. For instance, referring to FIG. 8, semi-static resource allocation 812 and/or conditions 814 may identify an expected behavior of the parent node 802 as an alternative to aforementioned conflict resolution rules. For example, if the resource allocation for a same set of resources is (HARD H HARD), the conditions 814 may indicate to the parent node 802 an expected behavior not to yield the resources for use by its children when the child node 804 has HD or FD capability. In another example, the conditions 814 may indicate to the parent node an expected behavior not to refrain from using released soft resources when communicating with the child node.

In another example, the first node may be a child node and the second node may be a parent node, and the one or more resource conditions may identify at least one expected behavior of the child node with respect to the allocated resources for communicating with the parent node. For instance, referring to FIG. 8, the conditions 814 may indicate to the child node 804 an expected behavior not to refrain from using unreleased (or reclaimed) soft resources when communicating with its own child nodes or the parent node 802.

Finally, at 2510, the central unit receives a change request from the first node to modify the semi-static resource allocation. For example, 2510 may be performed by receive change request component 2616. For instance, referring to FIG. 8, the central unit 806 may receive a change request 816, 818 respectively from the parent node 802 or child node 804 to modify at least one of the semi-static resource allocation 812 or the conditions 814 for use of resources. The change request may be received from a child node, a parent node, or both a child node and a parent node. In an aspect, the change request may include a request to enable or disable at least one of SDM FD or SDM HD.

Figure 26:
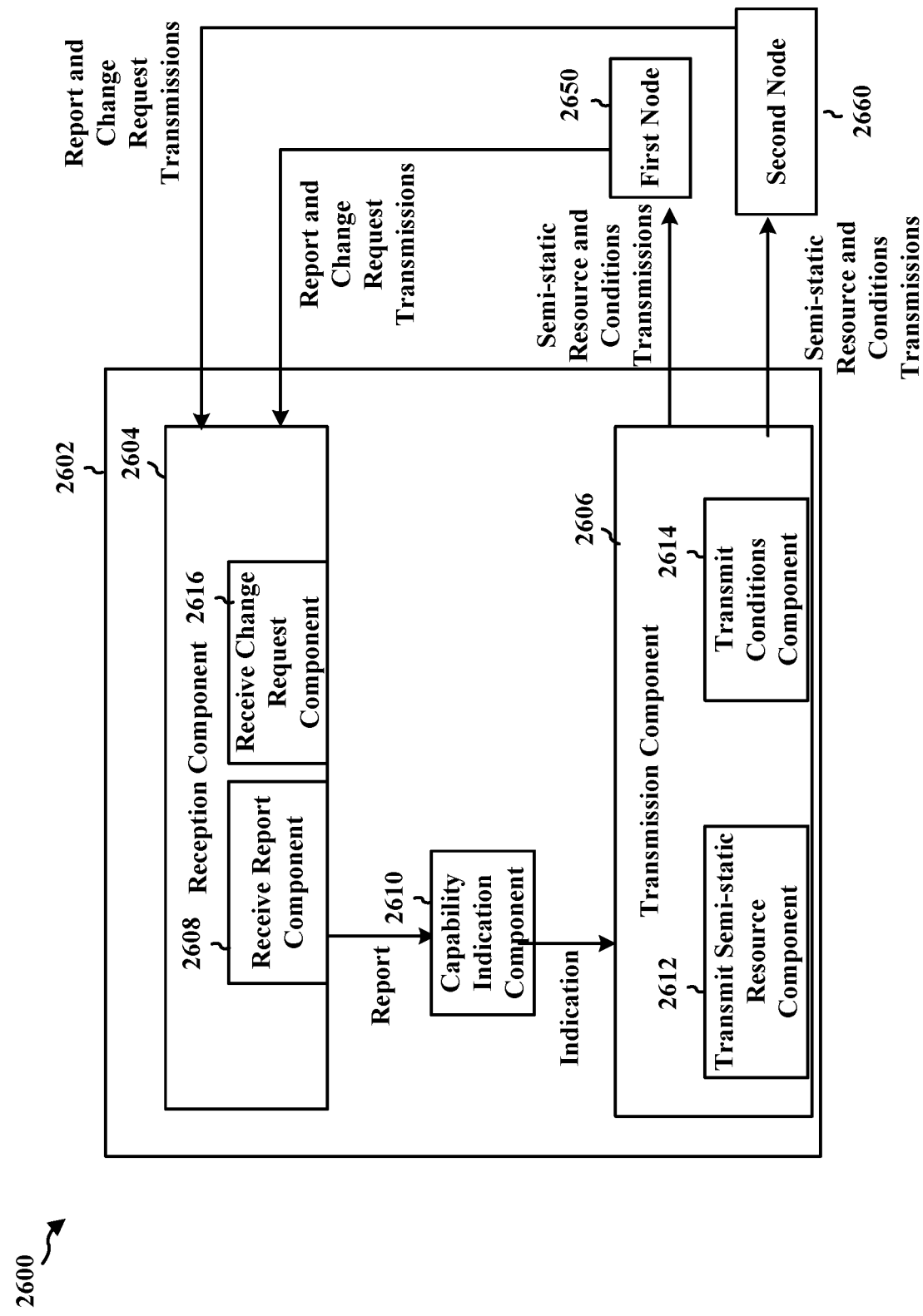
FIG. 26 is a conceptual data flow diagram illustrating the data flow between different means/components in an example apparatus.

FIG. 26 is a conceptual data flow diagram 2600 illustrating the data flow between different means/components in an example apparatus 2602. The apparatus may be a CU (e.g. CU 806) in communication with a first node 2650 and a second node 2660. The first node may be, e.g., parent node 802, and the second node may be, e.g., child node 804. Alternatively, the first may be, e.g., child node 804, and the second node may be, e.g., parent node 802.

The apparatus 2602 includes a reception component 2604 that is configured to receive communications from the first node 2650 and second node 2660. For example, the reception component may receive reports and change requests from the first node and the second node. The apparatus also includes a transmission component 2606 that is configured to transmit communications to the first node and the second node. For example, the transmission component may transmit semi-static resource allocations and resource conditions to the first node and the second node.

The apparatus 2602 (e.g. the reception component 2604) includes a receive report component 2608 that is configured to receive a report from a first node, where the report includes at least one multiplexing capability of the first node or includes at least one multiplexing capability condition for the at least one multiplexing capability of the first node, e.g., as described in connection with 2502. The apparatus may include a capability indication component 2610 that is configured to transmit to a second node an indication of the at least one multiplexing capability or the at least one multiplexing capability condition (based on the report from receive report component 2608), e.g., as described in connection with 2504. The apparatus includes a transmit semi-static resource component 2612 that is configured to transmit to the first node a semi-static resource allocation based on the at least one multiplexing capability for communication of the first node with a second node, e.g., as described in connection with 2506. The semi-static resource allocation may also be transmitted based on the report from receive report component 2608. The apparatus may include a transmit conditions component 2614 that is configured to transmit, to the first node, one or more resource conditions for using allocated resources of the semi-static resource allocation, e.g., as described in connection with 2508. The apparatus may include a receive change request component 2616 that is configured to receive a change request from the first node to modify the semi-static resource allocation, e.g., as described in connection with 2510.

The apparatus may include additional components that perform each of the blocks of the algorithm in the aforementioned flowchart of FIG. 25. As such, each block in the aforementioned flowchart of FIG. 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 27:
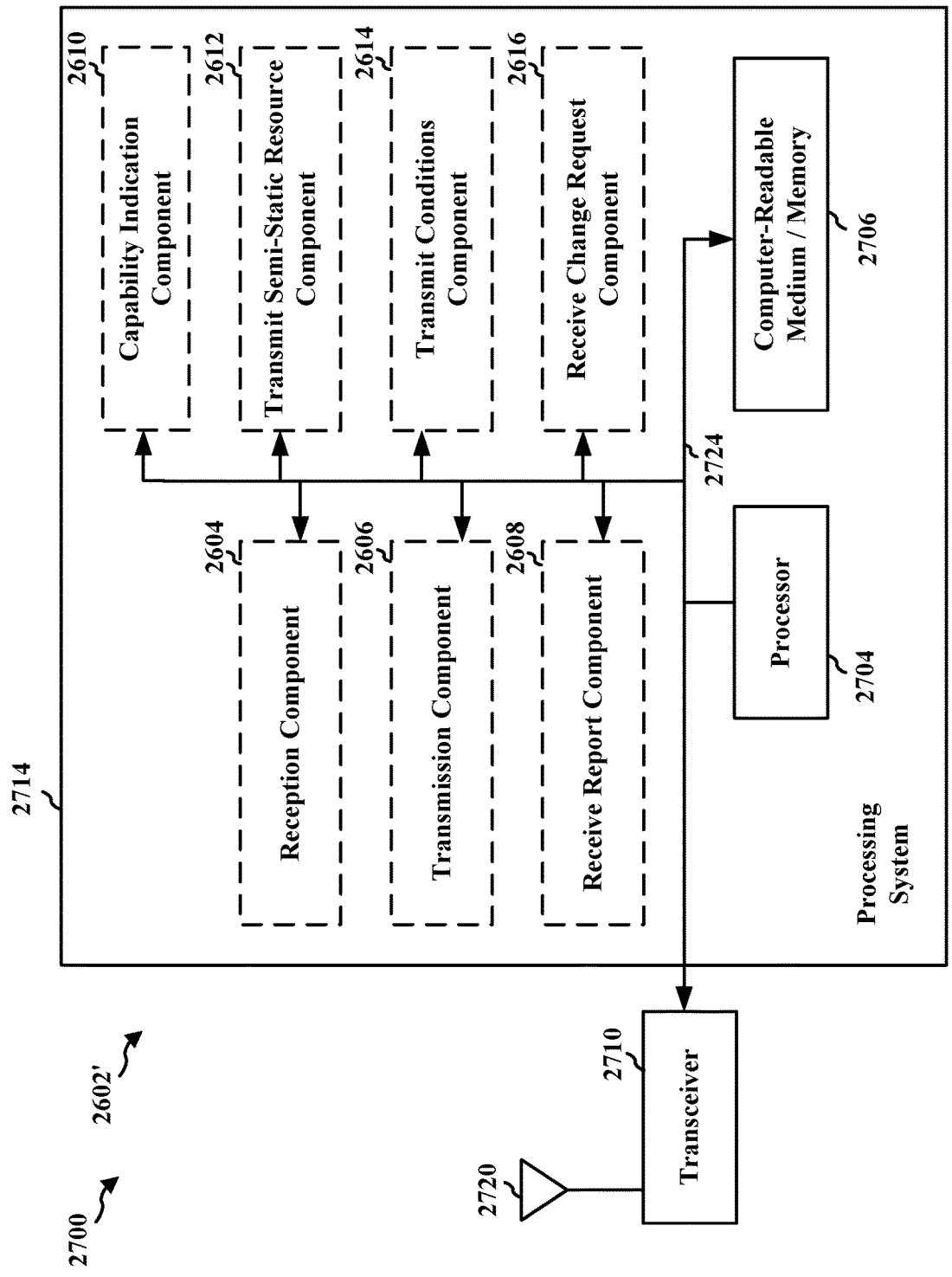
FIG. 27 is a diagram illustrating an example of a hardware implementation for an apparatus employing a processing system.

FIG. 27 is a diagram 2700 illustrating an example of a hardware implementation for an apparatus 2602' employing a processing system 2714. The processing system 2714 may be implemented with a bus architecture, represented generally by the bus 2724. The bus 2724 may include any number of interconnecting buses and bridges depending on the specific application of the processing system 2714 and the overall design constraints. The bus 2724 links together various circuits including one or more processors and/or hardware components, represented by the processor 2704, the components 2604, 2606, 2608, 2610, 2612, 2614, 2616 and the computer-readable medium/memory 2706. The bus 2724 may also link various other circuits such as timing sources, peripherals, voltage regulators, and power management circuits, which are well known in the art, and therefore, will not be described any further.

The processing system 2714 may be coupled to a transceiver 2710. The transceiver 2710 is coupled to one or more antennas 2720. The transceiver 2710 provides a means for communicating with various other apparatus over a transmission medium. The transceiver 2710 receives a signal from the one or more antennas 2720, extracts information from the received signal, and provides the extracted information to the processing system 2714, specifically the reception component 2604. In addition, the transceiver 2710 receives information from the processing system 2714, specifically the transmission component 2606, and based on the received information, generates a signal to be applied to the one or more antennas 2720. The processing system 2714 includes a processor 2704 coupled to a computer-readable medium/memory 2706. The processor 2704 is responsible for general processing, including the execution of software stored on the computer-readable medium/memory 2706. The software, when executed by the processor 2704, causes the processing system 2714 to perform the various functions described supra for any particular apparatus. The computer-readable medium/memory 2706 may also be used for storing data that is manipulated by the processor 2704 when executing software. The processing system 2714 further includes at least one of the components 2604, 2606, 2608, 2610, 2612, 2614, 2616. The components may be software components running in the processor 2704, resident/stored in the computer readable medium/memory 2706, one or more hardware components coupled to the processor 2704, or some combination thereof. The processing system 2714 may be a component of a CU (e.g. CU 706, 806 of an IAB node 606) or the base station 310 and may include the memory 376 and/or at least one of the TX processor 316, the RX processor 370, and the controller/processor 375. Alternatively, the processing system 2714 may be the entire CU, IAB node, or base station (e.g., see 310 of FIG. 3).

In one configuration, the apparatus 2602/2602' for wireless communication includes means for transmitting to the first node a semi-static resource allocation based on at least one multiplexing capability of the first node for communication of the first node with a second node; and means for receiving a change request from the first node to modify the semi-static resource allocation; wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and wherein the at least one multiplexing capability is with respect to one or more transmission direction combinations of the first node.

In one configuration, the apparatus 2602/2602' may include means for transmitting to the second node an indication of the at least one multiplexing capability.

In one configuration, the apparatus 2602/2602' may include means for receiving a report from a first node, wherein the report includes the at least one multiplexing capability of the first node or includes at least one multiplexing capability condition for the at least one multiplexing capability of the first node, and wherein the semi-static resource allocation may be transmitted based on the report.

In one configuration, the apparatus 2602/2602' may include means for transmitting, to the first node, one or more resource conditions for using allocated resources of the semi-static resource allocation; wherein the communication of the first node with the second node may be based on the one or more resource conditions.

The aforementioned means may be one or more of the aforementioned components of the apparatus 2602 and/or the processing system 2714 of the apparatus 2602' configured to perform the functions recited by the aforementioned means. As described supra, the processing system 2714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure support efficient SDM operation in IAB networks. For example, CU devices may provide for more efficient performance of SDM operations for communications between the CU and both parent nodes and child nodes by providing resource allocations and conditions for use of resources in response to reports by the parent node and/or child node. Similarly, the parent nodes and child nodes may more efficiently perform SDM operations for communications between the parent nodes and/or child nodes and the CU based on the resource allocations and by following the conditions for use of resources. The parent nodes and child nodes may also more efficiently perform SDM operations for communications between the parent nodes and/or child nodes and the CU by sending change requests to the CU when beams, link budget constraints, or other configurations change. The CU may similarly provide for more efficient performance of SDM operations for communications between the CU and both parent nodes and child nodes by sending new resource allocations in response to the change requests in support of SDM operations.

Moreover, by coordinating with the CU regarding FD/HD capabilities, an IAB node may avoid making assumptions about other node capabilities, such as half-duplex constraints. For example, knowledge of TDM, SDM FD, and SDM HD capabilities for a given IAB node may allow for greater spectral efficiency and/or greater capacity in wireless communication. Accordingly, the aspects described herein further provide for communication of TDM, SDM FD, and SDM HD capabilities between devices to take advantage of the greater spectral efficiency and/or greater capacity of a particular IAB node. With some coordination or full coordination between an IAB node and the CU, which may configure and manage semi-static resource allocations for the IAB node, IAB nodes and CUs may achieve efficient SDM(FD/HD) operation and improved resource utilization.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first node, comprising:
    receiving a semi-static resource allocation from a central unit (CU) based on at least one multiplexing capability of the first node;
    communicating with a second node based on the semi-static resource allocation;
    modifying at least one of a beamwidth or direction of at least one of a transmission beam or a reception beam based on a local interference measurement; and
    transmitting a change request to the CU to modify the semi-static resource allocation in response to the modifying of at least one of the beamwidth or direction of at least one of the transmission beam or the reception beam;
    wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and
    wherein the at least one multiplexing capability is with respect to one or more transmission direction combinations of the first node.

2. The method of claim 1, wherein the first node includes a mobile terminal (MT) and a distributed unit (DU), and wherein the one or more transmission direction combinations comprise at least one of MT transmission and DU transmission, MT transmission and DU reception, MT reception and DU transmission, or MT reception and DU reception.

3. The method of claim 1, further comprising:
    transmitting a report to the CU, wherein the report includes the at least one multiplexing capability of the first node or includes at least one multiplexing capability condition for the at least one multiplexing capability of the first node;
    wherein the semi-static resource allocation is received based on the report.

4. The method of claim 3, further comprising:
    performing the local interference measurement of one or more beams for communicating with the second node; and
    wherein the report includes the local interference measurement.

5. The method of claim 4, wherein the at least one multiplexing capability is for SDM FD, and the one or more beams comprise the transmission beam and the reception beam of the first node.

6. The method of claim 4, wherein the at least one multiplexing capability is for SDM HD, and the one or more beams comprise a plurality of transmission beams of the first node or a plurality of reception beams of the first node.

7. The method of claim 3, wherein the at least one multiplexing capability condition comprises at least one of:
    one or more beams to be used for SDM; or
    a link budget of the first node.

8. The method of claim 1, further comprising:
receiving, from the CU, one or more resource conditions for using allocated resources of the semi-static resource allocation;
wherein the communicating with the second node is based on the one or more resource conditions.

9. The method of claim 8, wherein the one or more resource conditions indicate whether the allocated resources are conditional or unconditional for communicating with the second node.

10. The method of claim 8, wherein the first node is a parent node and the second node is a child node, and wherein the one or more resource conditions identify at least one expected behavior of the parent node with respect to the allocated resources for communicating with the child node.

11. The method of claim 10, wherein the allocated resources comprise one of hard resources or soft resources.

12. The method of claim 8, wherein the first node is a child node and the second node is a parent node, and wherein the one or more resource conditions identify at least one expected behavior of the child node with respect to the allocated resources for communicating with the parent node.

13. A method of wireless communication at a central unit (CU), comprising:
transmitting to a first node a semi-static resource allocation based on at least one multiplexing capability of the first node for communication of the first node with a second node; and
receiving a change request from the first node to modify the semi-static resource allocation, wherein the change request is received in response to at least a modification of at least one of a beamwidth or direction of at least one of a transmission beam or a reception beam based on a local interference measurement;
wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and
wherein the at least one multiplexing capability is with respect to one or more transmission direction combinations of the first node.

14. The method of claim 13, wherein the first node includes a mobile terminal (MT) and a distributed unit (DU), and wherein the one or more transmission direction combinations comprise at least one of MT transmission and DU transmission, MT transmission and DU reception, MT reception and DU transmission, or MT reception and DU reception.

15. The method of claim 13, further comprising:
transmitting to the second node an indication of the at least one multiplexing capability.

16. The method of claim 13, further comprising:
receiving a report from the first node, wherein the report includes the at least one multiplexing capability of the first node or includes at least one multiplexing capability condition for the at least one multiplexing capability of the first node; and
wherein the semi-static resource allocation is transmitted based on the report.

17. The method of claim 16, wherein the at least one multiplexing capability condition comprises at least one of:
one or more beams to be used for SDM; or
a link budget of the first node.

18. The method of claim 13, further comprising:
transmitting, to the first node, one or more resource conditions for using allocated resources of the semi-static resource allocation;
wherein the communication of the first node with the second node is based on the one or more resource conditions.

19. The method of claim 18, wherein the one or more resource conditions indicate whether the allocated resources are conditional or unconditional for the communication of the first node with the second node.

20. The method of claim 18, wherein the first node is a parent node and the second node is a child node, and wherein the one or more resource conditions identify at least one expected behavior of the parent node with respect to the allocated resources for communicating with the child node.

21. The method of claim 20, wherein the allocated resources comprise one of hard resources or soft resources.

22. The method of claim 18, wherein the first node is a child node and the second node is a parent node, and wherein the one or more resource conditions identify at least one expected behavior of the child node with respect to the allocated resources for communicating with the parent node.

23. An apparatus for wireless communication, the apparatus being a first node, comprising:
means for receiving a semi-static resource allocation from a central unit (CU) based on at least one multiplexing capability of the first node;
means for communicating with a second node based on the semi-static resource allocation;
means for modifying at least one of a beamwidth or direction of at least one of a transmission beam or a reception beam based on a local interference measurement; and
means for transmitting a change request to the CU to modify the semi-static resource allocation in response to a modification of at least one of the beamwidth or direction of at least one of the transmission beam or the reception beam;
wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and
wherein the at least one multiplexing capability is with respect to one or more transmission direction combinations of the first node.

24. The apparatus of claim 23, wherein the means for transmitting is further configured to:
transmit a report to the CU, wherein the report includes the at least one multiplexing capability of the first node or includes at least one multiplexing capability condition for the at least one multiplexing capability of the first node;
wherein the semi-static resource allocation is received based on the report.

25. The apparatus of claim 24, further comprising:
means for performing the local interference measurement of one or more beams for communicating with the second node; and
wherein the report includes the local interference measurement.

26. The apparatus of claim 25, wherein the at least one multiplexing capability is for SDM FD, and the one or more beams comprise the transmission beam and the reception beam of the first node.

27. The apparatus of claim 23, wherein the means for receiving is further configured to:

receive, from the CU, one or more resource conditions for using allocated resources of the semi-static resource allocation;

wherein the communicating with the second node is based on the one or more resource conditions.

28. An apparatus for wireless communication, the apparatus being a central unit (CU), comprising:
means for transmitting to a first node a semi-static resource allocation based on at least one multiplexing capability of the first node for communication of the first node with a second node;
means for receiving a change request from the first node to modify the semi-static resource allocation, wherein the change request is received in response to at least a modification of at least one of a beamwidth or direction of at least one of a transmission beam or a reception beam based on a local interference measurement;
wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and
wherein the at least one multiplexing capability is with respect to one or more transmission direction combinations of the first node.

29. The apparatus of claim 28, wherein the means for transmitting is further configured to transmit to the second node an indication of the at least one multiplexing capability.

30. The apparatus of claim 28, wherein the means for receiving is further configured to:
receive a report from the first node, wherein the report includes the at least one multiplexing capability of the first node or includes at least one multiplexing capability condition for the at least one multiplexing capability of the first node; and
wherein the semi-static resource allocation is transmitted based on the report.

31. The apparatus of claim 28, wherein the means for transmitting is further configured to:
transmit, to the first node, one or more resource conditions for using allocated resources of the semi-static resource allocation;
wherein the communication of the first node with the second node is based on the one or more resource conditions.

32. An apparatus for wireless communication, the apparatus being a first node, comprising:
a memory; and
at least one processor coupled to the memory and configured to:
receive a semi-static resource allocation from a central unit (CU) based on at least one multiplexing capability of the first node;
communicate with a second node based on the semi-static resource allocation;
modify at least one of a beamwidth or direction of at least one of a transmission beam or a reception beam based on a local interference measurement; and
transmit a change request to the CU to modify the semi-static resource allocation in response to a modification of at least one of the beamwidth or direction of at least one of the transmission beam or the reception beam;
wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and
wherein the at least one multiplexing capability is with respect to one or more transmission direction combinations of the first node.

33. The apparatus of claim 32, wherein the first node includes a mobile terminal (MT) and a distributed unit (DU), and wherein the one or more transmission direction combinations comprise at least one of MT transmission and DU transmission, MT transmission and DU reception, MT reception and DU transmission, or MT reception and DU reception.

34. The apparatus of claim 32, wherein the at least one processor is further configured to:
transmit a report to the CU, wherein the report includes the at least one multiplexing capability of the first node or includes at least one multiplexing capability condition for the at least one multiplexing capability of the first node;
wherein the semi-static resource allocation is received based on the report.

35. The apparatus of claim 34, wherein the at least one processor is further configured to:
perform the local interference measurement of one or more beams for communicating with the second node; and
wherein the report includes the local interference measurement.

36. The apparatus of claim 35, wherein the at least one multiplexing capability is for SDM FD, and the one or more beams comprise the transmission beam and the reception beam of the first node.

37. The apparatus of claim 35, wherein the at least one multiplexing capability is for SDM HD, and the one or more beams comprise a plurality of transmission beams of the first node or a plurality of reception beams of the first node.

38. The apparatus of claim 34, wherein the at least one multiplexing capability condition comprises at least one of:
one or more beams to be used for SDM; or
a link budget of the first node.

39. The apparatus of claim 32, wherein the at least one processor is further configured to:
receive, from the CU, one or more resource conditions for using allocated resources of the semi-static resource allocation;
wherein the communicating with the second node is based on the one or more resource conditions.

40. The apparatus of claim 39, wherein the one or more resource conditions indicate whether the allocated resources are conditional or unconditional for communicating with the second node.

41. The apparatus of claim 39, wherein the first node is a parent node and the second node is a child node, and wherein the one or more resource conditions identify at least one expected behavior of the parent node with respect to the allocated resources for communicating with the child node.

42. The apparatus of claim 41, wherein the allocated resources comprise one of hard resources or soft resources.

43. The apparatus of claim 39, wherein the first node is a child node and the second node is a parent node, and wherein the one or more resource conditions identify at least one expected behavior of the child node with respect to the allocated resources for communicating with the parent node.

44. An apparatus for wireless communication, the apparatus being a central unit (CU), comprising:
- a memory; and
- at least one processor coupled to the memory and configured to:
  - transmit to a first node a semi-static resource allocation based on at least one multiplexing capability of the first node for communication of the first node with a second node; and
  - receive a change request from the first node to modify the semi-static resource allocation, wherein the change request is received in response to at least a modification of at least one of a beamwidth or direction of at least one of a transmission beam or a reception beam based on a local interference measurement;
  - wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and
  - wherein the at least one multiplexing capability is with respect to one or more transmission direction combinations of the first node.

45. The apparatus of claim 44, wherein the first node includes a mobile terminal (MT) and a distributed unit (DU), and wherein the one or more transmission direction combinations comprise at least one of MT transmission and DU transmission, MT transmission and DU reception, MT reception and DU transmission, or MT reception and DU reception.

46. The apparatus of claim 44, wherein the at least one processor is further configured to:
- transmit to the second node an indication of the at least one multiplexing capability.

47. The apparatus of claim 44, wherein the at least one processor is further configured to:
- receive a report from the first node, wherein the report includes the at least one multiplexing capability of the first node or includes at least one multiplexing capability condition for the at least one multiplexing capability of the first node; and
- wherein the semi-static resource allocation is transmitted based on the report.

48. The apparatus of claim 47, wherein the at least one multiplexing capability condition comprises at least one of:
- one or more beams to be used for SDM; or
- a link budget of the first node.

49. The apparatus of claim 44, wherein the at least one processor is further configured to:
- transmit, to the first node, one or more resource conditions for using allocated resources of the semi-static resource allocation;
- wherein the communication of the first node with the second node is based on the one or more resource conditions.

50. The apparatus of claim 49, wherein the one or more resource conditions indicate whether the allocated resources are conditional or unconditional for the communication of the first node with the second node.

51. The apparatus of claim 49, wherein the first node is a parent node and the second node is a child node, and wherein the one or more resource conditions identify at least one expected behavior of the parent node with respect to the allocated resources for communicating with the child node.

52. The apparatus of claim 51, wherein the allocated resources comprise one of hard resources or soft resources.

53. The apparatus of claim 49, wherein the first node is a child node and the second node is a parent node, and wherein the one or more resource conditions identify at least one expected behavior of the child node with respect to the allocated resources for communicating with the parent node.

54. A non-transitory computer-readable medium storing computer executable code, the code when executed by a processor cause the processor to:
- receive a semi-static resource allocation from a central unit (CU) based on at least one multiplexing capability of a first node;
- communicate with a second node based on the semi-static resource allocation;
- modify at least one of a beamwidth or direction of at least one of a transmission beam or a reception beam based on a local interference measurement; and
- transmit a change request to the CU to modify the semi-static resource allocation in response to a modification of at least one of the beamwidth or direction of at least one of the transmission beam or the reception beam;
- wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and
- wherein the at least one multiplexing capability is with respect to one or more transmission direction combinations of the first node.

55. A non-transitory computer-readable medium storing computer executable code, the code when executed by a processor cause the processor to:
- transmit to a first node a semi-static resource allocation based on at least one multiplexing capability of the first node for communication of the first node with a second node; and
- receive a change request from the first node to modify the semi-static resource allocation, wherein the change request is received in response to at least a modification of at least one of a beamwidth or direction of at least one of a transmission beam or a reception beam based on a local interference measurement;
- wherein the at least one multiplexing capability comprises at least one of Spatial Division Multiplexing (SDM) or Frequency Division Multiplexing (FDM), and wherein the SDM includes at least one of SDM Full Duplex (SDM FD) or SDM Half-Duplex (SDM HD); and
- wherein the at least one multiplexing capability is with respect to one or more transmission direction combinations of the first node.

* * * * *